(12) United States Patent
McDermott et al.

(10) Patent No.: US 8,842,967 B2
(45) Date of Patent: Sep. 23, 2014

(54) METHODS AND SYSTEMS FOR USE IN PROVIDING PLAYBACK OF VARIABLE LENGTH CONTENT IN A FIXED LENGTH FRAMEWORK

(75) Inventors: Jeff McDermott, Castaic, CA (US);
Bruce Randall, Tiburon, CA (US);
Sherry Kao, Pasadena, CA (US)

(73) Assignee: Deluxe Media Inc., Burbank, CA (US)

( * ) Notice: Subject to any disclaimer, the term of this patent is extended or adjusted under 35 U.S.C. 154(b) by 1299 days.

(21) Appl. No.: 12/479,474

(22) Filed: Jun. 5, 2009

(65) Prior Publication Data

US 2010/0142915 A1    Jun. 10, 2010

Related U.S. Application Data

(60) Provisional application No. 61/059,613, filed on Jun. 6, 2008.

(51) Int. Cl.
| | |
|---|---|
| *H04N 5/91* | (2006.01) |
| *H04N 5/93* | (2006.01) |
| *H04N 21/4722* | (2011.01) |
| *G11B 27/034* | (2006.01) |
| *H04N 21/462* | (2011.01) |
| *H04N 21/426* | (2011.01) |
| *G11B 27/30* | (2006.01) |
| *G11B 27/036* | (2006.01) |
| *H04N 21/482* | (2011.01) |

(52) U.S. Cl.
CPC ....... *H04N 21/4825* (2013.01); *H04N 21/4722* (2013.01); *G11B 27/034* (2013.01); *G11B 2220/2537* (2013.01); *H04N 21/4622* (2013.01); *H04N 21/42646* (2013.01); *G11B 27/3027* (2013.01); *G11B 27/30* (2013.01); *G11B 27/036* (2013.01)
USPC ......................................................... 386/239

(58) Field of Classification Search
None
See application file for complete search history.

(56) References Cited

U.S. PATENT DOCUMENTS 7,310,353 B1 * 12/2007 Bourlas et al. ................ 370/473
2001/0013123 A1    8/2001 Freeman
(Continued)

FOREIGN PATENT DOCUMENTS

| CA | 2727020 A1 | 12/2009 |
|---|---|---|
| EP | 1768402 | 3/2007 |

(Continued)

OTHER PUBLICATIONS

Netblender Inc.; The BD Touch—Connect SDK; published at www.netblender.com/technology/bdtouch_sdk.asp; Jun. 2008; pp. 1; NetBlender Inc.; Alexandria, VA, USA.

(Continued)

*Primary Examiner* — Hung Dang
*Assistant Examiner* — Sunghyoun Park
(74) *Attorney, Agent, or Firm* — Fitch, Even, Tabin & Flannery LLP

(57) ABSTRACT

The present embodiments methods and systems for use in providing supplemental content to be played back with a portable storage medium through a playback device that conforms to a fixed length content framework, by receive request for supplemental content from a playback device; identifying the supplemental content; retrieve supplemental content; accessing a predefined clip template defined prior to receiving the request; processing the supplemental content and generating a plurality of clips of supplemental content that have a playback length that is a fraction of a playback length of the supplemental content; and forward supplemental content clips to the requesting playback device.

10 Claims, 29 Drawing Sheets

(56) References Cited

U.S. PATENT DOCUMENTS

| | | | |
|---|---|---|---|
| 2002/0042920 | A1 | 4/2002 | Thomas et al. |
| 2004/0133661 | A1 | 7/2004 | Yoon et al. |
| 2006/0031785 | A1* | 2/2006 | Raciborski .................. 715/859 |
| 2007/0250573 | A1 | 10/2007 | Rothschild |
| 2008/0092164 | A1* | 4/2008 | Agarwal et al. ............... 725/40 |
| 2008/0274687 | A1* | 11/2008 | Roberts et al. .............. 455/3.06 |
| 2010/0135637 | A1 | 6/2010 | McDermott et al. |

FOREIGN PATENT DOCUMENTS

| | | | |
|---|---|---|---|
| EP | 2294575 | | 3/2011 |
| WO | WO2006/087676 | * | 8/2006 |
| WO | WO-2006087676 | | 8/2006 |
| WO | 2009/149364 A2 | | 12/2009 |

OTHER PUBLICATIONS

Netblender Inc.; Connect; NetBlender BD Connect Overview & Core API Document; Version 00.09.12 Beta; Jun. 2008; pp. 1-29, NetBlender Inc.; Alexandria, VA, USA.

Netblender Inc.; Introducing BD Touch; published at www.netblender.com/technology/bdtouch_home.asp; Jun. 2008; pp. 1; NetBlender Inc.; Alexandria, VA, USA.

European Patent Office; Supplementary European Search Report Corresponding to European Patent Application No. 0975922.7; Mailed Aug. 19, 2011; 6 Pages.

Canadian Intellectual Property Office; Office Action corresponding to Canadian Application No. 2,727,020; Mailed Dec. 13, 2011; 3 Pages.

Australian Patent Office; Examiner's First Report corresponding to Australian Patent Application No. 2009256066; Mailed Feb. 12, 2012; 2 pages.

International Search Report and Written Opinion from the International Searching Authority for App. No. PCTUS2009046433 mailed Jan. 18, 2010.

McDermott, Jeff, U.S. Appl. No. 12/702,260, filed Feb. 8, 2010.

USPTO; Restriction Requirement issued in U.S. Appl. No. 12/702,260; Mailed Nov. 8, 2012; 10 Pages.

JPO; Office Action Issued in Japanese Patent Application No. 2011-512696; Mailed Mar. 5, 2013; 12 Pages.

USPTO; Non-final office action from U.S. Appl. No. 12/702,260 mailed Jun. 18, 2013.

USPTO; Notice of Allowance from U.S. Appl. No. 12/702,260 mailed Sep. 24, 2013.

* cited by examiner

METHODS AND SYSTEMS FOR USE IN PROVIDING PLAYBACK OF VARIABLE LENGTH CONTENT IN A FIXED LENGTH FRAMEWORK

PRIORITY CLAIM

This application claims the benefit of U.S. Provisional Application No. 61/059,613, filed Jun. 6, 2008, entitled METHODS AND SYSTEMS FOR USE IN PROVIDING PLAYBACK OF VARIABLE LENGTH CONTENT IN A FIXED LENGTH FRAMEWORK, which is incorporated herein by reference in its entirety.

FIELD OF THE INVENTION

The present invention relates generally to recorded content, and more particularly to accommodating variable length content associated with a recording medium.

BACKGROUND

Next generation digital media formats, such as Blu-ray Disc and HD-DVD Disc, generally require that data is prepared and stored on a disc in such a manner to describe content that is stored on the disc. Typically, this information is stored in a read only manner that does not support the direct modification of such descriptive data. As such, content played back from the disc is immediately dated when it is recorded to the disc. Further, some data or content stored on the disc rapidly can become outdated or obsolete.

SUMMARY OF THE EMBODIMENT

The present invention advantageously addresses the needs above as well as other needs through the provision of methods and systems for use in providing supplemental content to be played back with a portable storage medium through a playback device that conforms to a fixed length content framework. Some methods receive a request for supplemental content from a playback device; identify the supplemental content; retrieve supplemental content; access a predefined clip template defined prior to receiving the request; process the supplemental content and generating a plurality of clips of supplemental content that have a playback length that is a fraction of a playback length of the supplemental content; and forward supplemental content clips to the requesting playback device.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
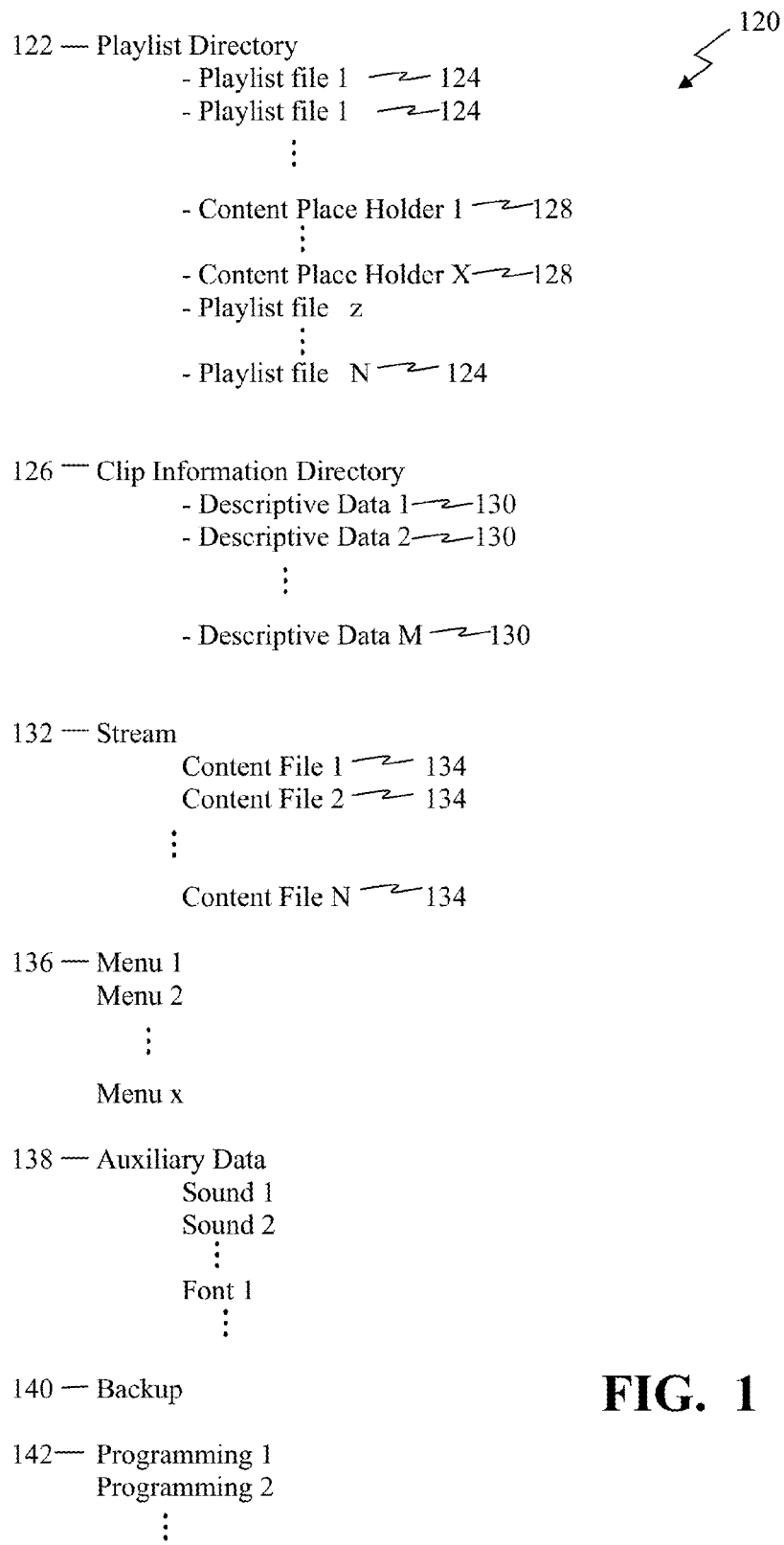
FIG. 1 depicts a simplified diagram of a file structure according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods, systems and apparatuses for use in accommodating the playback of variable length content within fixed length frameworks and/or standards. These fixed length frameworks generally require that content, such as multimedia content, to be played back through these frameworks be fixed in length, playback duration and/or be associated with a index, and that the fixed length, duration or index be predefined prior to initiating playback of content from the medium or content played back in association with the content on the medium. For example, some fixed length frameworks provide for the playback of content from a portable, digital storage medium. Content to be played back in association with the portable storage medium must be know and the length and typically the data size of the content generally has to be known prior to allowing playback of content from the portable storage medium or playback of content associated with the portable storage medium to be initiated. The present embodiments, however, provide systems and methods for accommodating and allowing the playback of content within these frameworks when the length and/or playback duration is not recorded on the medium, and does not have to be known at the time playback of content on the medium or playback of content associated with the medium is initiated.

Portable digital recording and/or storage mediums are used to record content. In many instances, portable digital recording mediums are recorded with multimedia content allowing users to purchase the mediums and gain access to the multimedia content. Often the multimedia content is recorded in accordance with a predefined standard so that the multimedia content can be accurately played back through multiple different types of players that recognize and conform to the given standard.

The recording of the multimedia content on to the medium, however, requires the content to be known at the time content is to be recorded on to the medium. Some advanced or next generation frameworks, standards and/or formats, such as but not limited to Blu-ray Disc and HD DVD Disc, allow supplemental data and/or content not recorded on the medium to be played back in cooperation with the content recorded on the medium (e.g., accessed over a distributed communication network, such as the Internet). To accomplish this cooperation of playback many of the standards or formats, such as Blu-ray Disc and HD DVD Disc, require that the format, descriptive data and/or information about the content be prepared and recorded on a medium along with the multimedia content, such that this descriptive data defines or describes the multimedia content that is stored on the medium as well as all content that is not recorded on the medium but is to be played back in cooperation with the medium. In some standards the descriptive data is referred to, for example, as clip or chunk information. To simplify the description of the embodiments of the invention described below, the descriptive data will be referred to below as clip information. It will be appreciated by those skilled in the art that the clip information is not restricted to a single standard or framework, can comprise substantially any relevant information about content and should not be interpreted to limit the scope of the claims.

The clip information generally is required according to many standards and frameworks to be fixed at the time content is recorded to the medium, and further to specifically define the parameters of content recorded on the medium and corresponding supplemental content not record on the medium at the time content is recorded to the medium. This fixed clip information typically defines a data size (e.g., number of bytes or bits of data), a length or playback duration and other file specifications. In some instances, the clip information or index can define playback durations and can further index or reference portions or points within a content stream where playback can be started within a particular clip, which can be used in some instances to implement seeking over the content stream, such as a random access seek. The clip information is typically stored on the medium in a read only manner that does not support the direct modification of such clip information. Further, a playback device typically needs to have and know all of the clip information prior to initiating playback of content from the medium and/or supplemental content associated with the medium.

As a result, supplemental content that is to be played back in cooperation with the medium has to be known prior to recording and/or burning the medium so that clip information about the supplemental content can be recorded on the medium. Further, this fixes the supplemental content from changing as the clip information typically includes specific information and parameters of the supplemental content including the data size (e.g., in bytes) as well as the length or playback duration at the time clip information and/or content is burned to the medium.

Some present embodiments, however, allow for a variation from this fixed supplemental content by supplying new or revised clip information to the playback device prior to beginning play back of multimedia content and supplemental content associated with the medium. As described above, however, the playback devices that conform with the fixed length standards, however, generally have to know all of the clip information for all of the content, whether recorded on the medium or supplemental content retrieved from a secondary or remote storage, prior to beginning playback of content relative to the medium. As a result, upon receiving revised clip information, for example from a remote source supplying supplemental content to be played back in cooperation with a medium at the playback device, the playback device typically has to implement a shutdown, reboot, restart or closing of an application and its associated memory context in order to effectively reload the content and clip information and any corresponding application. The reloading of the content and clip information makes the clip information for the content on the medium as well as the revised clip information available upon initiation of playback relative to the medium. Additionally, the reloading allows the revised clip information to be appropriately associated with and applied with the content recorded on the medium prior to playback of content from the medium or the associated supplemental content. This reloading is often slow and dramatically affects performance and a user's experience. For example with regard to the Blu-ray Standard, a Blu-ray disc (BD) environment would need to reload a file system when updating the clip information which underpins the playback applications. As such, these applications typically also have to reload as well. The file system similarly is reloaded because the new clip information has to effectively be virtually mapped to a specific file directory and file name that is accessible by the playback engine layer in the BD system. This remapping typically also requires a file system reload, some times referred to as a virtual file system (VFS) update.

Many frameworks or standards do not allow arbitrary content to be downloaded without having previous knowledge of the layout and mapping of the content. Further with many standards specifications, the content made available to the user relative to a medium is predefined and declared during the initial start-up or prior to initiating playback of content relative to the portable storage medium. This is a significant drawback to content owners distributing content as well as to consumers in attempting to access and playback supplemental content not recorded on the medium that may be available and cooperated with the content recorded on the medium.

As such, fixed length frameworks have at least three significant drawbacks in providing supplemental content that is not predefined on the medium or that is not fixed in length at the time the content is accessed to be played back. First, the clip information of the multimedia content and any supplemental content to be cooperated with the multimedia content has to be known before beginning playback. Second, the playback device has to be restarted upon receiving the revised and actual clip information in those instances where the clip information is not recorded on the medium. Third, the clip information of the multimedia content and supplemental content has to remain static after playback begins. This can significantly limit the benefits of providing supplemental content and can significantly adversely affect a user's playback experience.

Some embodiments, provide methods, playback devices, data structures, and systems for use in providing alternative methods of delivering variable length supplemental content, for example over a network connection, to a playback device that employs a fixed length content framework or standard that requires a pre-deterministic structure of clip information. Further, some embodiments advantageously provide for the cooperated playback of content recorded on a read only medium with supplemental content, such as dynamically delivered content, having variable lengths. This dynamically delivered content does not have to have a fixed length, can be supplied during playback of content from the medium without requiring a shutdown of the playback device, and further in some instances can include user generated content and/or live or substantially live content with an unknown length to be played back in cooperation with the portable storage medium.

Typically, the supplemental content complies with one or more formatting standards compatible with the playback device, and often has similar audio and/or video attributes (e.g. VC-1 video, DD+ audio, 8-bit RLE sub-pictures, and the like) as the content(s) recorded on the medium. For example, supplemental content can be, but is not limited to, dynamically created content (e.g., user generated videos, audio recordings, images, commentary of content played back from a medium, etc.), variable length audio/video clips or chunks (e.g., music videos, mp3 files, movies, television programs, etc.), theatrical trailers, live hosted events, secondary content to be displayed with or in place of content from the storage medium (e.g., secondary video/audio content delivered as "picture-in-picture" content), content conforming with a fixed length of a feature on a medium (e.g., a movie), and other such variable length content, where the length or playback duration is not known at the time content is burned or recorded to the medium or even at the time playback of content relative to the medium is initiated. Further in some embodiments, the portable storage medium can be a container or shell that complies with fixed length standards, but does not include any content or only a minimal amount of content, and instead is used as a key or access to other supplemental content retrieved from a separate storage medium (e.g., received from a remote storage device) that is played back through the playback device in cooperation with the medium.

In some implementations, a content designation place holder is recorded on the medium defining that supplemental content not recorded on the medium can be obtained and cooperated for playback. Place holder clip information is further recorded on the medium specifically associated with the content place holder. This place holder clip information when recorded to the medium defines a size, length, playback duration, duration timing, playback timing and/or other parameters for the supplemental content, where the supplemental content does not have to be known at the time the content place holder and place holder clip information is recorded on the medium. Further, the place holder clip information is defined with a data size and/or playback duration that is greater than an expected data size, duration, duration length, playback time or the like of supplemental content that may be later provided to the playback device to be played back in cooperation with the content recorded and/or defined on the portable storage medium. The present embodiments, therefore, allow supplemental content not recorded on a portable storage medium to be played back in cooperation with the portable storage medium without knowing what the supplemental content is prior to burning the medium and without requiring the playback device to be restarted in accordance with fixed length frameworks after playback of content associated with the medium has commenced.

For example, with some recording medium specifications the medium has recorded thereon a file structure that includes a listing directory or playlist defining the content to be played back relative to the medium. FIG. 1 depicts a simplified diagram of a file structure 120 according to some embodiments. The file structure 120 includes one or more listing directories or playlists 122 that include content designation or playlist files 124 and can optionally include place holders 128, one or more a clip information directories or listings 126 that include clip information files 130, and a stream directory 132 with content files 134 configured to be played back and/or rendered through a playback device (e.g., video content, audio content, audio/video (A/V) content, text, graphics, images, and other relevant such content). In some instances the file structure 120 can additionally include menu directory and/or files 136; auxiliary data directory 138 containing, for example, sound data files, graphics files, font files and/or other such data; backup directory 140; programming, code and/or executables 142; and other relevant content, code, executables and/or data.

As introduced above, the listing directory or playlist 122 defines content to be played back in accordance with the medium. The playlist 122 includes content designations, such as playlist files 124 that reference content 134 in the stream directory 132 to be played back, and can further include content place holders 128 that represent or designate a playback of content not recorded on a portable storage medium with the file structure 120 but intended to be played back in cooperation with respect to the medium. The content place holders 128, in some instances, trigger implementation programming 142 defined on the medium to initiate access to the supplemental content (e.g., accessible from a secondary memory storage). Further, the place holder 128 or corresponding clip information 130 can designate a link or reference to access the supplemental content not recorded on the portable storage medium. For example, the place holder 128 may define an Internet link to a remote server from which supplemental content can be retrieved. The place holder 128 and/or clip information 130, in some embodiments, may further define access rights or identify where access rights can be retrieved. Alternatively, the access rights can be determined by a remote source and are not related to the clip information.

The clip information listing or directory 126 includes the clip information and/or files 130. Each clip information 130 corresponds to one of the content designations 124 or one of the place holders 128. The clip information 130 defines the indexes, parameters, attributes, characteristics, timing information, settings and the like of content 134 referenced by the corresponding playlist file 124, or the potential supplemental content referenced by the corresponding place holders 128. Further, clip information 130 corresponding to place holders 128 can, in some instances, include a link, mapping or other designation of where and/or how the supplemental content can be accessed.

The place holder 128 and corresponding clip information 130 associated with the place holder, in some embodiments, defines a duration, data size, playback timing, number of frames and/or other such relevant parameter for the corresponding supplemental content. Further, these designations of timing, duration, data size and the like are defined to be in excess of substantially any expected supplemental content that is expected to be associated with the corresponding place holder 128, or are specified to allow a repeat or looping in accordance with the clip information as fully described below. This allows substantially any potential supplemental content having a duration, length and/or the like that is less than or equal to the designated duration or length specified in the place holder clip information, or that can be played back in accordance with the repeat playback, to be played back and/or utilized with the associated place holder. Further, an actual duration, length or data size of the supplemental content does not need to be known prior to beginning playback of content from the medium or supplemental content being played back in cooperation with the portable storage medium.

In some implementations, such as with the Blu-ray BD-ROM and the like, one or more of the place holders 128 can be defined by a combination of clip information files 130, playlist files 124, titles and content protection system (CPS) files. The supplemental content that is acquired is data that matches up with the place holder information. Further, the remote location from which the supplemental content can be received can be determined by application software 142 running from the media. For example, this application software 142 can query, from over a distributed communication network, the content owner provided network service to determine a source from which the supplemental content can be retrieved and/or downloaded. Access rights can be defined in the CPS files, and in some instances these access rights are defined at the granularity of titles. CPS files can either pre-exist on the medium (e.g., a disc) or be updated over the network. In some instances, updating the CPS files may initiate a virtual file system (VFS) update and/or implement a title shut down and restart.

In some embodiments, a program or programming 142 recorded on the medium, as described further below, is activated upon the completion of playback of supplemental content accessed in response to a place holder 128 to override or terminate the duration designated by the place holder clip information 130, and returns playback control to the playback device to continue playback as defined, in some instances, by the playlist directory 122. In some instances, the programming or code 142 is recorded on the medium, and this programming can be activated prior to and/or upon accessing supplemental content for playback designated by a place holder 128. This programming includes a return control programming function, as described above and further below, that overrides or terminates the place holder duration specified by the place holder clip information 130 corresponding to the active place holder 128 upon completion of playback of the supplemental content, and returns control of the playback to the playback device and/or a user interface upon completion of the playback of the supplemental content. This effectively terminates the playback of the supplemental content and returns to control back to a user interface and/or the playback device.

Programming 142 can further be initiated, in some implementations, to implement a communication with a remote server or storage device to determine what supplemental content is available. In some instances, the medium contains information, metadata, XML documents or predefined communication scheme or rule set that allows the player to contact, communicate with and pull information from a server. Supplemental content can be returned from the server and the playback device aided by programming 142, initiates playback of the supplemental content. In some embodiments, upon receiving information back from the server, programming 142 implemented by the playback device controls a user interface to display a listing of available content through the server and allows a user to interact with the playback device by selecting from the listing.

Figure 2:
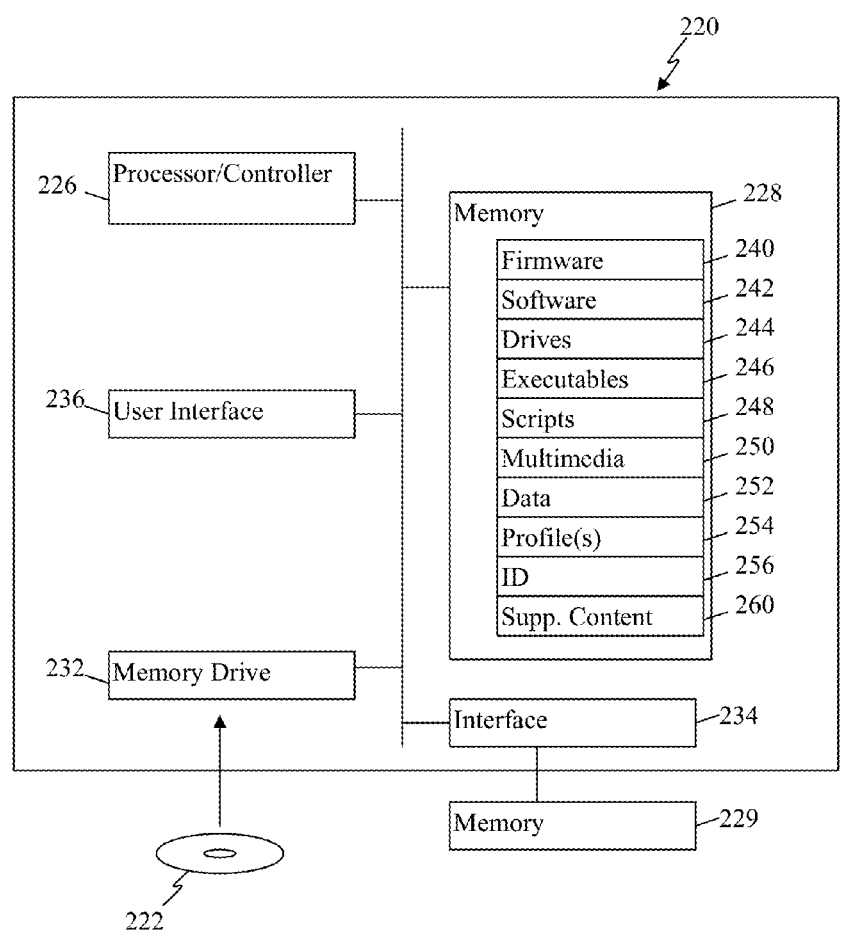
FIG. 2 depicts a simplified block diagram of a playback device according to some embodiments.

FIG. 2 depicts a simplified block diagram of a playback device 220 according to some embodiments that can playback content from a portable storage medium 222, such as a Blu-ray Disc (BD), in cooperation with supplemental content. The playback device includes one or more processors or controllers 226, memory and/or digital storage 228-229, one or more medium drives 232 including a portable storage medium drive to allow direct access to a portable storage medium 222, one or more ports or communication interfaces 234, one or more user interfaces 236 and other relevant components such as internal communication links and/or buses (not shown), and the like.

The media playback device 220 can be substantially any relevant playback device capable of playing content back from a storage medium and typically a portable storage medium. The processor(s) 226 can be one or more microprocessors, minicomputers or other such processing devices or combinations of devices programmed to provide the described functionality. In some embodiments the processor 226 includes video and/or audio processing functionality, such as decoders, encoders and the like; however, the video and/or audio processing functionality can be implemented through separate devices within the playback device cooperated with the processor 226, and/or implemented through hardware, software or a combination thereof.

The memory 228 is a memory internal to the playback device, is coupled with the processor 226 and typically includes one or more processor and/or computer-readable mediums accessed by at least the processor 226. The memory 228 can include volatile and/or nonvolatile media, such as RAM, ROM, EEPROM, buffer memory, flash memory or other memory technology. Further, the memory 228 can store firmware 240, software 242, network or communication drives 244, executables 246, scripts 248, multimedia content 250, data 252, profiles and/or account information 254, network device ID and/or address 256, supplemental content 260 and the like. Similarly, memory 229 can be a separate or external memory coupled with a communication interface 234 to allow for the retrieval and/or recording of data, content, executables, scripts, multimedia content, profiles and/or account information, supplemental content and the like. Memory drive 232 is a portable storage memory drive that receives the portable storage medium 222 and allows content to be retrieved from and/or recorded to the portable storage medium. The portable storage medium 222 can be substantially any portable computer readable medium, such as a disc, flash memory and other such memory.

The communication interfaces 234 provide interfaces, ports, connections, antenna and the like through which the playback device 220 can communicate with other remote devices and/or communication networks. These communication interfaces can include interfaces such as, but not limited to, a parallel port, an IEEE 1394 serial port, a game port, a USB port, an IR interface, RF interfaces, antenna or other such interfaces. The one or more user interfaces 236 allows the user to interact with the playback device 220 and can include substantially any relevant interface, such as a display, keyboard, mouse, physical buttons, an optical or radio communication interface for communicating with one or more remote controls, speakers, and other such user interfaces.

Figure 3:
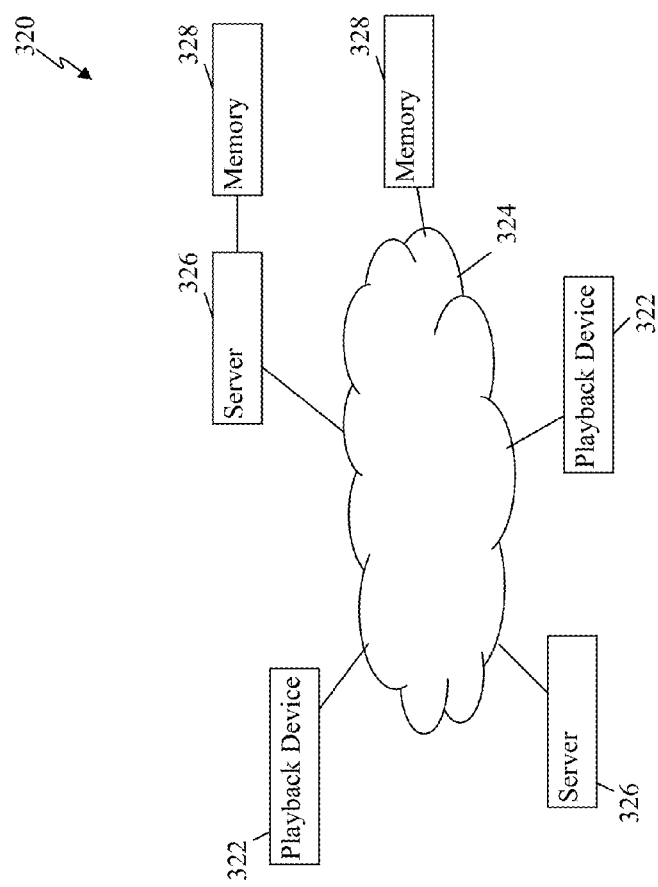
FIG. 3 depicts a simplified block diagram of a system according to some embodiments that enables the accommodation of variable length content in a fixed length framework and/or standard.

FIG. 3 depicts a simplified block diagram of a system 320 according to some embodiments that enables the accommodation of variable length content in a fixed length framework and/or standard. The system 320 includes one or more playback devices 322, a communication network 324, one or more servers 326, and optionally one or more remote memory storage devices 328.

In some embodiments, the playback devices 322 can be similar to the playback device 220 of FIG. 2 and coupled with the communication network 324. The servers 326 similarly couple with the communication network to communicate with one or more of the playback devices 322, other servers 326, the remote memory storage 328 or other devices communicationally coupled with the communication network 324. The communication network 324 can be substantially any communication network, such as but not limited to the Internet, an Intranet, a LAN and/or other relevant communication networks.

The server 326, at least in part, receives requests from and returns or authorizes access to supplemental content to a playback device 322 to be played back. The supplemental content can be supplied directly from the server 326 or the playback device can be routed by the server 326 to a remote memory storage 328. In some instances, the server 326 can additionally verify authorization to access the supplemental content, verify a user, maintain a user profile and utilize the user profile in some instances in determining to which supplemental content a user can be provided access, maintain logs and/or records of access to content, manage the storage of supplemental content and other such functions. Further, in some embodiments, the server can format supplemental content prior to distributing the supplemental content to a playback device 322. This formatting as fully described below can include generating clip information, segmenting content, encrypting content and other such formatting, in addition to packaging content to be communicated over the communication network 324.

Figure 4:
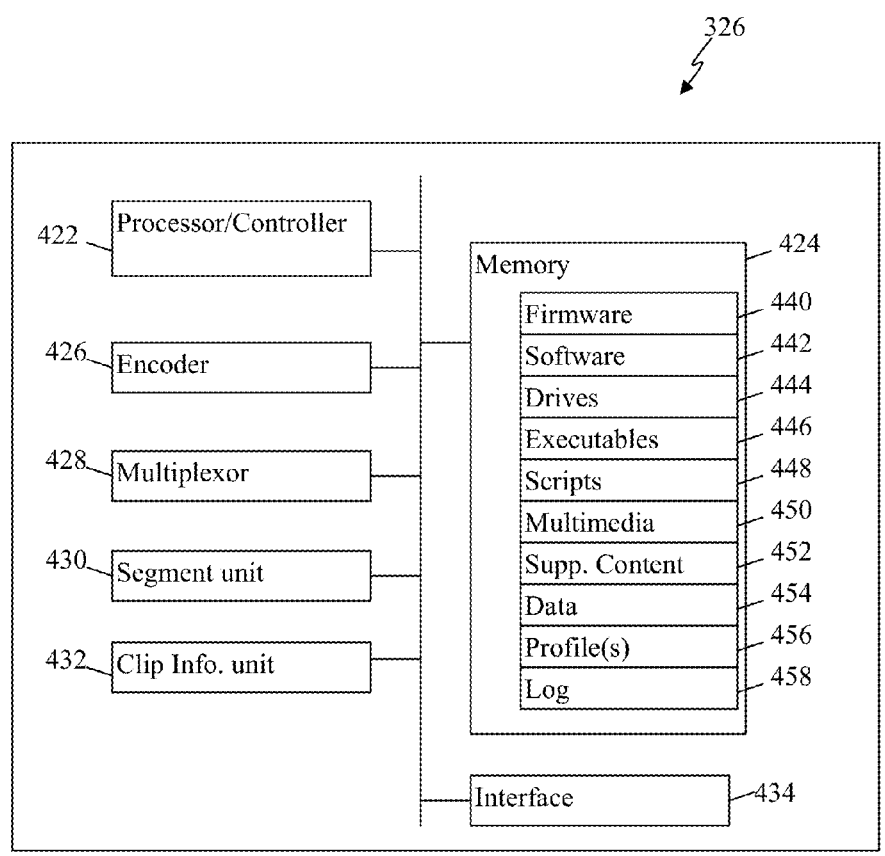
FIG. 4 depicts a simplified block diagram of a server that distributes supplemental content to a playback device, or to remote memory storage devices.

FIG. 4 depicts a simplified block diagram of a server 326 that distributes supplemental content to a playback device 322, or to remote memory storage devices 328. The server 326 typically includes one or more processors or controllers 422, memory and/or digital storage 424, one or more encoders 426, one or more multiplexors 428, one or more segmenting units 430, clip information generator 432 and one or more ports or communication interfaces 434. The server 326 can optionally also include one or more user interfaces 436 (e.g., display, keyboard, mouse, physical buttons, wireless communication interface and other such user interfaces).

The processor(s) 422 can be one or more microprocessors, minicomputers or other such processing devices or combinations of devices. In some embodiments the processor 422 includes video and/or audio processing functionality, such as decoders, encoders 426, multiplexor(s) 428 and the like. In some embodiments, some or all of the encoder 426, multiplexor 428, segmenting unit 430 and clip information generator 432 are implemented by the processor 422 through software to provide video and/or audio processing functionality. Additionally or alternatively, this multimedia processing functionality can be implemented through separate devices within the server 326 or external to the server. Further, the video and/or audio processing can be implemented through hardware, software or a combination thereof.

The memory 424 can be substantially any type of memory, including but not limited to volatile and/or nonvolatile media, such as RAM, ROM, EEPROM, buffer memory, flash memory or other memory technology. Further, the memory 424 can store firmware 440, software 442, network or communication drives 444, programming and executables 446, scripts 448, multimedia content 450, supplemental content 452, data 454, profiles and/or account information 456, logs and/or history data 458 and the like. The communication interfaces 434 provide interfaces, ports, connections, antenna and the like through which the server 326 can communicate with other remote devices and/or communication networks 324.

As described above, the playback device, e.g., playback device 220 of FIG. 2, in accessing and playing back content relevant to a portable storage medium detects a place holder 128 and retrieves place holder clip information 130 associated with that place holder. The playback device 220 identifies a source for supplemental content (e.g., local memory 228, external memory 229, and remote source, such as a server 326), and in some instances identifies the supplemental content, which in some implementations can be designated relative to the place holder 128 and place holder clip information 130. In many instances the identification of the supplemental content is unknown until a source for the supplemental content is accessed and the source for the content identifies the supplemental content or provides the user with a listing of available supplemental content. This allows the supplemental content to be updated or changed at any time.

Upon identifying the source of the supplemental content the playback device 220 accesses the source and retrieves actual clip information and supplemental content associated with the medium. The playback device can initiate playback of the supplemental content in cooperation with the portable storage medium 222. In some instances, the actual duration of the supplemental content extracted from the actual clip information acts, at least in part, to override the place holder duration designated in the place holder clip information 130. In other instances the duration designated in the place holder clip information 130 is maintained but overridden upon completion of playback of the supplemental content. Again as described above, the place holder clip information 130 can include a hypothetical or potential playback duration (and/or other relevant parameter, such but not limited to playback timing, frame number, number of frames, or other such parameters). This potential playback duration typically is specified to be greater than actual durations of one or more expected, anticipated or potential supplemental content. Once the supplemental content is played back the termination of the actual duration of the supplemental content is detected inducing a termination of the playback duration (e.g., through a media stop command) and returning control to the playback device 220.

Figure 5:
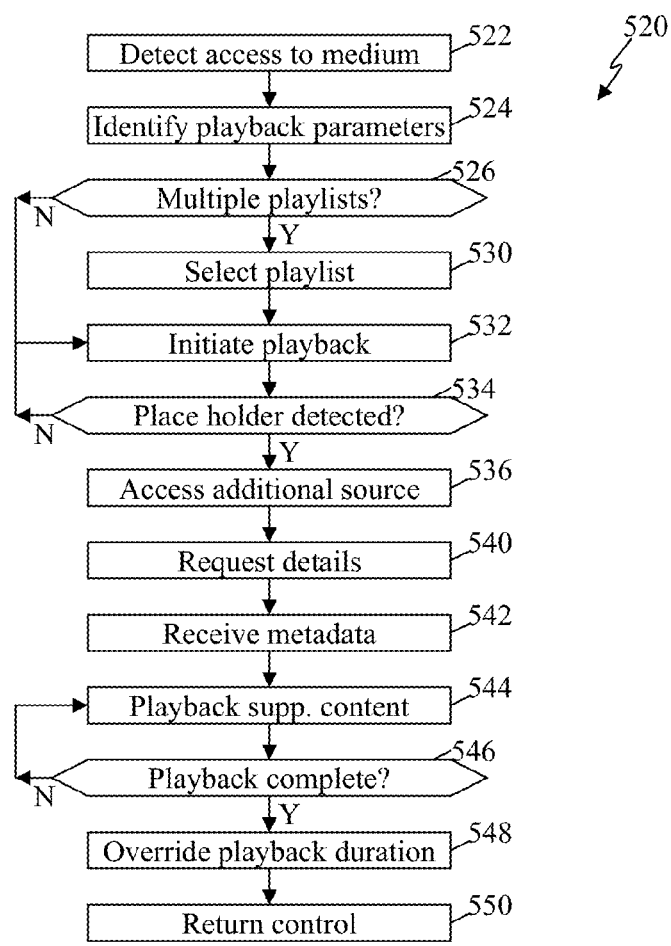
FIG. 5 depicts a simplified flow diagram of a process for use in playing back supplemental content that does not have a fixed duration in association with a portable storage medium through a playback device that complies with a fixed length framework.

FIG. 5 depicts a simplified flow diagram of a process 520 for use in playing back supplemental content that does not have a fixed duration in association with a portable storage medium 222 through a playback device that conforms with a fixed length framework. As such, the playback device needs to have all of the clip information for the content prior to initiating played back. In step 522, the process detects access to a portable storage medium 222. For example, this detection can include detecting the insertion of the portable medium 222 into the playback device 220. In step 524, playback parameters of the playback device are identified and/or determined. As introduced above and further described below, the playback parameters define relevant capabilities of the playback device (e.g., processing capabilities, buffer size, decoding rates and the like), whether the playback device is communicationally coupled with a secondary data storage or a network 324, network connection parameters when the playback device 220 is coupled with the network 324 (e.g., communication bandwidth) and other such relevant parameters.

Step 526 is entered to determine whether multiple playlists are defined on the portable storage medium. When only a single playlist is defined the process skips to step 532 to initiate playback. Alternatively, the process continues to step 530 to select an appropriate playlist based on the identified relevant playback parameters. The selection further takes into consideration whether the playback device is connected with a communication network 324. Again, the playlist defines the playback of the content on the medium and in some instances supplemental content that can be played back in association with the medium 222. Further, the playlist includes the designated clip information 130 regarding the content to be played back in relation to the portable storage medium 222.

In step 532, playback is initiated based on the single playlist or the playlist selected in step 530. In step 534 it is determined whether a place holder 128 is detected in the playlist directory 122 designating that supplemental content not recorded on the portable storage medium 222 is to be played back in cooperation with the portable storage medium. Often the playback device detects the place holders in advance of when content associated with the place holder 128 is to be played back. Further, it is desired in some implementations that the place holder is detected with sufficient time to access the additional source (e.g., server 326) and at least begin acquiring the supplemental content to be played back so that the playback continues with limited, and preferably no delay relative to playback of content recorded on the portable storage medium.

When a place holder 128 is detected step 536 is entered where the additional source for the supplemental content is identified, whether local memory 228-229 of the playback device 220 or a remote source (e.g., a server 326 or memory storage device 328 accessed over the network 324), and access to the additional source is utilized to access the additional source. In some instances, the place holder clip information 130 corresponding to the identified place holder 128 defines the source of supplemental content. In other embodiments, however, the access to a source may be defined with the place holder 128, defined on the playback device, designated in some other portion of the medium or other source. The location of the supplemental content can, in some instances, be defined within a programmed application (either directly in source code or within associated resources), obtained by querying network services to dynamically determine the location and the like. Further, the location could either be defined on a network (e.g., URL), defined locally (e.g., device local storage) and/or potentially synthesized content. For example, in some applications the programmed application may be capable of dynamically creating some types of content directly (e.g., images, audio and the like) and writing them to local storage for playback.

In step 540 details of supplemental content and the communication of the supplemental content is requested from the additional source. In some instances, programming 142 on the portable storage medium is implemented to request details of packaging and/or the supplemental content to be downloaded, streamed, progressively played back or otherwise obtained at the playback device for playback. Further, the additional source 326, in some instances evaluates some or all of the playback parameters and/or determines relevant parameters, and based on this evaluation identifies supplemental content, formatting and/or a template to be used in forwarding the supplemental content. The process 520 continues to step 542 where information, data and/or metadata is received at the playback device 220 from the additional source 326 defining parameters of the supplemental content and/or the communication of the supplemental content. For example, the information can include metadata for audio/video supplemental content including information for downloading the supplemental content (e.g., XML data defining parameters of audio/video content and audio/video package to be downloaded to the playback device), information for receiving streamed supplemental content (e.g., XML data defining parameters of audio/video content and network URL describing location of content to be streamed), information for employing progressive playback (e.g., data defining parameters of audio/video content and network URL describing location of content to be downloaded), information defining actual playback duration or timing of the supplemental content, commands, and other such relevant information.

In step 544 playback of the supplemental content is initiated. It is noted that the playback of the supplemental content can be initiated prior to receiving all of the supplemental content, for example through streaming and/or progressive downloads as further described below. In step 546 it is determined whether playback of the supplemental content has completed. This determination can be based on an actual playback duration supplied in metadata, a command (e.g., media stop command) or other such determination. In those instances where playback has not completed the process returns to step 544 to continue playback. Alternatively, step 548 is entered where the playback duration designated in the playlist 122 and associated with the relevant place holder is overridden to designate a termination of playback relative to the place holder 128.

In step 550, control of playback is returned to the playback device relative to the playlist directory 122, for example, to provide a graphical user interface, continue playback relative to the playlist or other relevant actions. In some embodiments, programming 142 is implemented from the portable storage medium 222 that provides functionality to return control back to the playlist, a graphical user interface or a user interface (UI) after a duration and playback of the supplemental content. Such functionality can include a timer set to a duration specified in metadata passed from the additional source (e.g., server 326) describing an actual duration of the supplemental content, a command such as "MediaStop" which is issued at the duration of the supplemental content (e.g., as specified in metadata passed from the server), or other such functionality. Once the duration of elapsed time of the supplemental content is exceeded, a stop command is issued or other such indication of completion of playback of the supplemental content is detected, playback control can be transferred back to the play back device or to a user interface (e.g., a Title UI).

Figure 6:
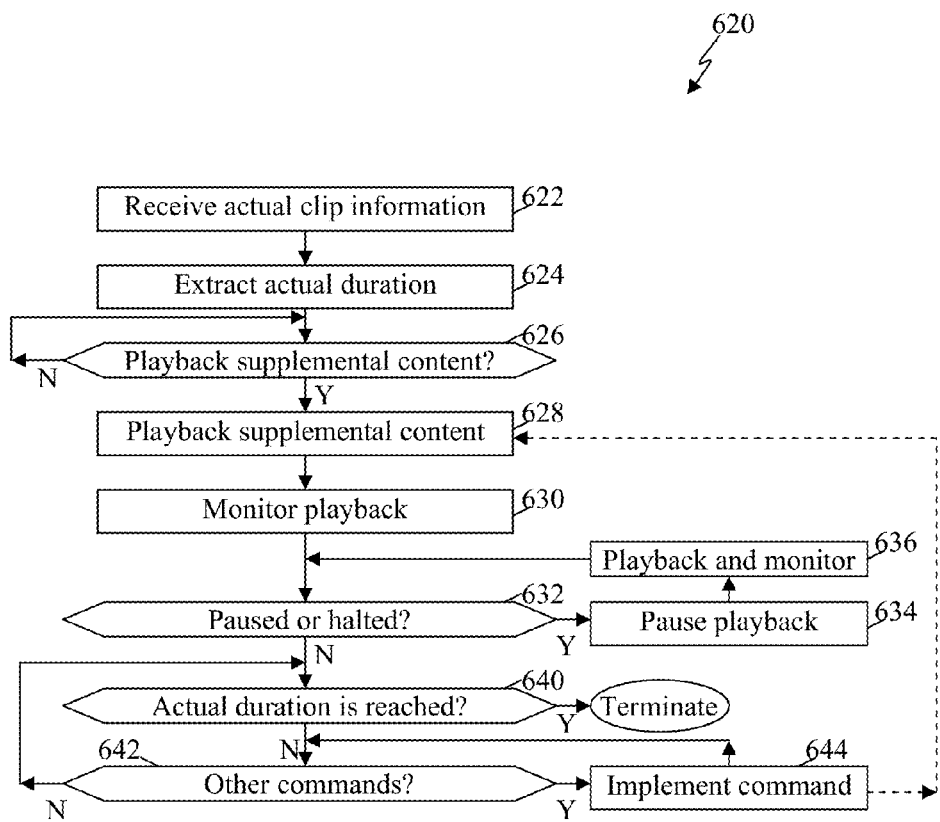
FIG. 6 depicts a simplified flow diagram of a process according to some embodiments that implements steps of the process of FIG. 5 in initiating playback and detecting the expiration of the actual playback duration of supplemental content.

FIG. 6 depicts a simplified flow diagram of a process 620 according to some embodiments that implements steps 544 and 546 of the process 520 of FIG. 5 in initiating playback and detecting the expiration of the actual playback duration indicating that the supplemental content has completed its play back. In step 622, actual supplemental content clip information is received from the source of the supplemental content. In step 624, an actual duration, playback timing or the like of the supplemental content is extracted from the supplemental content clip information.

In step 626, it is determined whether playback of the supplemental content is to be implemented. In some instances, the supplemental content is retrieved prior to initiating playback so that the supplemental content is available at a time playback is to begin to avoid delays in playback and provide a continuous playback of content. When it is determined that a trigger or timing to initiate the playback of the supplemental content has not been received, the process 620 continues to loop back to step 626 awaiting a time or instructions to initiate playback. In step 628, playback of the supplemental content is initiated. In step 630, a counter or clock is activated or playback timing is tracked in accordance with the actual duration, time code or playback timing of the supplemental content.

The process 620 then continues to step 632 to determine whether the playback of the supplemental content is paused or halted. In some instance, a user or the playback device 220 may initiate an alternate action. For example, a user may issue a pause command or other command, the play back device may detect that still other supplemental content is to be cooperated in playback during the playback of the current supplemental content, and other conditions or factors may result in a pause of the playback of the supplemental content. In those instances where a pause is detected, step 634 is entered where the process pauses the playback of the supplemental content and pauses the clock or counter associated with the actual duration of the supplemental content. Playback is continued in step 636 when the pause terminates, the clock or counter is reactivated and the process returns to step 632.

In step 640, it is determined whether the clock or counter has reached the defined actual duration of the supplemental content, a designated playback timing is reached or a stop command is detected signifying that the supplemental content has completed its playback. When it is determined that the playback has not completed, the process 620 continues to step 642 to determine whether other commands are to be implemented (e.g., skip forward, pause, stop, display a menu, change content streams, and other such commands that may be issued by the playback device, a remote server, a user or the like). When other commands are to be implemented appropriate actions in accordance with the playback device are implemented in step 644, which might include advancing the playback timing, playback clock or counter; switching content streams; initiating playback of a different content stream; or other such actions. In some instances, following the implementation of the command the process returns to step 642. In other instances, the process 620 may optionally return to step 628 to continue the playback and/or initiate playback of a different content stream. When other commands are not to be implemented the process returns to step 640 to determine whether the playback of the supplemental content is complete. In those instances where the playback of the supplemental content is complete the process 620 terminates and returns to step 548 of process 520 to trigger the playback device to terminate the content place holder duration designated in the corresponding place holder clip information 160.

In some embodiments as described above and further below, the content place holder duration and/or playback timing specified in the clip information 130 of the clip information listing 126 associated with an identified place holder(s) 128 designates a duration or playback that is larger or longer than an actual duration of expected or potential supplemental content. For example, the supplemental content associated with a place holder 128 can be a movie trailer to be played back in association with a movie recorded on the medium 222. By designating the place holder 128 on the medium instead of recording a trailer on the medium, an up-to-date and current movie trailer of a soon to be released movie, for example that includes an actor that is in the movie recorded on the medium 222, can be played back instead of an old movie trailer that was relevant at the time the contents 162 (e.g., the movie) were recorded to the medium 222. Because the duration of the future movie trailer is unknown at the time of recording the content 134 to the medium, the place holder allows the playback device to access the supplemental content, which may be produced at a much later date than when the content 134 is recorded on the medium 222. Further, the actual duration of the current movie trailer is obtained from the additional source (e.g., server 326) and used to return control to the playback device upon completing the playback of the supplemental content, which occurs within the place holder duration specified in the place holder clip information 130. For example, the place holder clip information 130 may designate a duration for supplemental content to be on the order of one hour, while the actual playback duration of a movie trailer may be about 60 seconds. As such, the movie trailer can be played back within the specified one hour duration and upon completion of playback of the supplemental content movie trailer, the duration specified in the clip information 130 is overridden and control is returned to the playback device.

In some implementations as described above and further described below, supplemental content to be provided to the playback device 220 is broken down or segmented into a series or sequence of multiple segments, chunks or clips, and the segments, chunks or clips of content are then forwarded, typically sequentially, to the playback device. This reduces memory and/or buffer requirements of playback devices, allows for the playback of relatively long content and allows for progressive playback in that the playback device can initiate playback of a segment while one or more other segments are being received.

Further, each segment of supplemental content has corresponding actual clip information that, as described above, is information (e.g., an informational file) that describes details of the content file of the segment of supplemental content. Many fixed length standards and/or frameworks, however, have to know or receive all of the clip information files for all of the clips or segments for content on the medium as well as any supplemental content prior to beginning playback of content relevant to the medium, whether content recorded on the medium or accessed from a secondary source and associated with the medium 222.

Some embodiments employ a predefined clip template that is expressed or defined prior to segmenting the supplemental content into clips or segments. Further in some instances, the clip template can be defined on the portable storage medium 222 at the time the content 134 is recorded to the medium. The clip template can be used to dictate how the supplemental content is to be segmented into clips of supplemental content. The supplemental content, as such, is broken up to conform to the predefined clip template. Further, the clip template defines the clip information for each clip prior to the supplemental content being segmented into clips. Additionally in some instances, the clip template is used in encoding and formatting the supplemental content. By applying the clip template, the clip information for each clip of supplemental content is known prior to breaking down the supplemental content into clips.

Utilizing a clip template allows the clip information for each clip to be recorded on the portable storage medium 222 or forwarded to a playback device 220 prior to playback, and in some instances prior to generating the clips of supplemental content. As a result, the supplemental content does not have to be known or even exist at the time the clip information is recorded to the medium 222 or supplied to the playback device. Further, because the supplemental content does not have to exist at the time the clip information is recorded to the medium or provided to the playback device 220, live events can be distributed to playback devices as the supplemental content, and/or supplemental content with undefined lengths can be playback at a playback device 220 while the playback device still conforms with a fixed length standard or framework.

Additionally or alternatively, the number of clips available to supplemental content may be limited. For example, many specifications or standards limit the number of clips that can be included in a playlist and/or on a medium. As a specific example, the Blu-ray Standard, at least in some instances, limits the number of clips in a playlist to 999 clips, while further limiting the number of clips on a Blu-ray compliant disc to 4000. As such, supplemental content with an unknown content length may result in a number of clips that would exceed the number of clips within a playlist and/or allowed on a medium. As a result, some embodiments utilize a replay, looping or repeating playback of clips. Specifically, a defined number of clips can be specified to be repeatedly played back until halted by a command or termination of content. As such, a playlist with a limited number of clips can be defined and the supplemental content can be configured according to a repeating of the number of clips when the supplemental content has a duration that exceeds a single playback sequence of the limited number of clips.

Further still, because the predefined clip templates can be defined prior to the supplemental content being created or recorded, some embodiments are configured to include multiple clip templates defined to accommodate differing capabilities of the playback device 220 and/or communication links, accommodate different supplemental content with varying amounts of data, accommodate different encoding/decoding bit rates and other such factors. For example, a portable storage medium 222 can include multiple playlist 122 and associated clip information listing 126, where each playlist corresponds to a different clip template to accommodate differing playback devices, parameters and/or conditions.

Furthermore, a clip template can be configured for supplemental content at a bit rate that is in excess of any expected bit rate of supplemental content that is to be segmented based on the clip template. As the supplemental content is broken up into clips as defined by the clip template the supplemental content may not fill or fully occupy the available data size of some if not all the clips defined by the clip template. Some embodiments compensate for the smaller data size of the supplemental content by padding clips of supplemental content generated in accordance with a clip template with null data or data that is ignored by the playback device 220. Further, the supplemental content has a profile (e.g., number of bits relative to playback timing), and the padding can be incorporated to shift or move parts of the profile so that they align with the predefined place holder clip information. For example a series of zero bits, a predefined pattern of bits, a null packet or other such configuration can be incorporated into the data of relevant clips where appropriate to maintain timing.

Moreover, because the supplemental content is being delivered in segments and/or chunks of data that match the place holder clip information the segment boundaries may not align to an actual playback duration. As such, in some instances, a segment containing an end of playback may be padded out to the full segment length to stay in compliance with the place holder clip information and/or timing. For example, the padding can be in the form of null packets of data and/or additional padding following a series of packets within a clip. As one example, some implementations provide that integer numbers of packets are to be incorporated into each clip that is to receive padding, and in those instances where an integer number of packets does not complete fill a clip yet a subsequent packet would exceed the clip boundaries, padding data can be incorporated to fill in the remainder of a clip. Further as described fully below, the padding or null data can be defined relative to the supplemental content but not incorporated into the content. Instead, the playback device, by identifying triggers or instructions and/or utilizing a mapping, incorporates the padding or null data at the playback device. This allows for a reduced data size of the supplemental content to be transmitted to the playback device.

Figure 7:
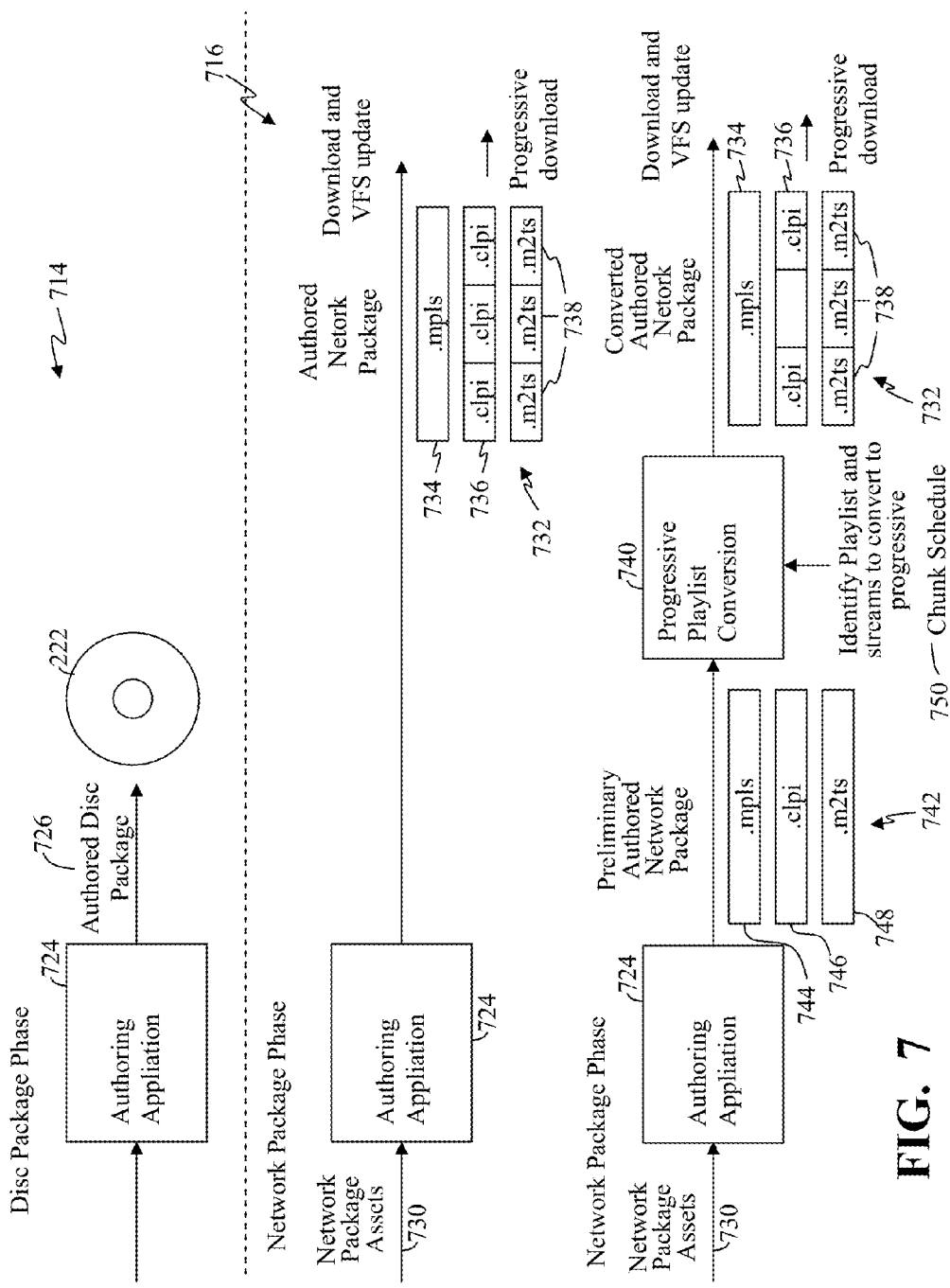
FIG. 7 depicts a simplified block diagram of a graphical representation of a process for authoring a storage medium and supplemental content that can be obtained for playback in cooperation with the authored storage medium.

FIG. 7 depicts a simplified block diagram of a graphical representation of a process for authoring a storage medium 222 and supplemental content 722 that can be obtained for playback in cooperation with the authored storage medium 222. In some embodiments, the authoring is implemented in two phases, a storage medium package phase 714, and a supplemental content or network package phase 716. An authoring application 724, such as Sony Blu-Print™, is employed to configure one or more file structure 120 (see FIG. 1) into an authored package 726 that is recorded to the storage medium 222 in the storage medium phase 714.

In the supplemental content package phase 716, supplemental content 730 to be accessed (e.g., by a playback device 322 from over a distributed network 324) and played back in cooperation with the storage medium 222 is further configured, in some embodiments, through the authoring application 724 or other relevant application to separate out or chunk the supplemental content into chunks of content and generate an authored supplemental content package 732 comprising a series of chunks of content 738 (.m2ts). In some instances, the supplemental content is divided or chunked in accordance with a selected chunk schedule 750. The authored supplemental content package 732 includes a playlist file (.mpls) 734, clip information files (.clpi) 736 and transport stream clips of supplemental content (.m2ts) 738, where the single playlist file 734 points to the plurality of clip information files 736 and associated transport stream clips 738. The playlist file 734 and clip information files 736, in some implementations, can be forwarded to the playback device 220 prior to initiating playback while the clips of supplemental content 738 can be downloaded prior to or at the time of playback through the playback device, for example, through streaming, a progressive download (which in some instances can emulate streaming of content) or other such methods.

Some authoring applications 724, however, cannot conveniently generate and/or format supplemental content that can be readily downloaded and/or progressively downloaded. Similarly, some authoring applications 724 are incapable of accurately generating the authored supplemental content package that complies with a predefined clip template. In these instances, a conforming application (or series of applications) is employed to conform a preliminary authored supplemental content package 742 generated from the authoring application.

The preliminary authored supplemental content package 742 includes a playlist file 744, a clip information file 746 and a transport stream of supplemental content 748. The conversion application 740 chunks or clips the clip information file 746 and transport stream of supplemental content 748 in accordance with a chunk schedule producing the authored supplemental content package 732 with the playlist file 734 that points to the plurality of chunked clip information files 736 and associated transport stream clips 738. The playlist file 734 and clip information files 736, in some instances, can be configured in one complete download that is utilized during an update on the playback device 322, and when a user actually goes to playback content the transport streams of supplemental content clips 738 can be downloaded.

Figure 8:
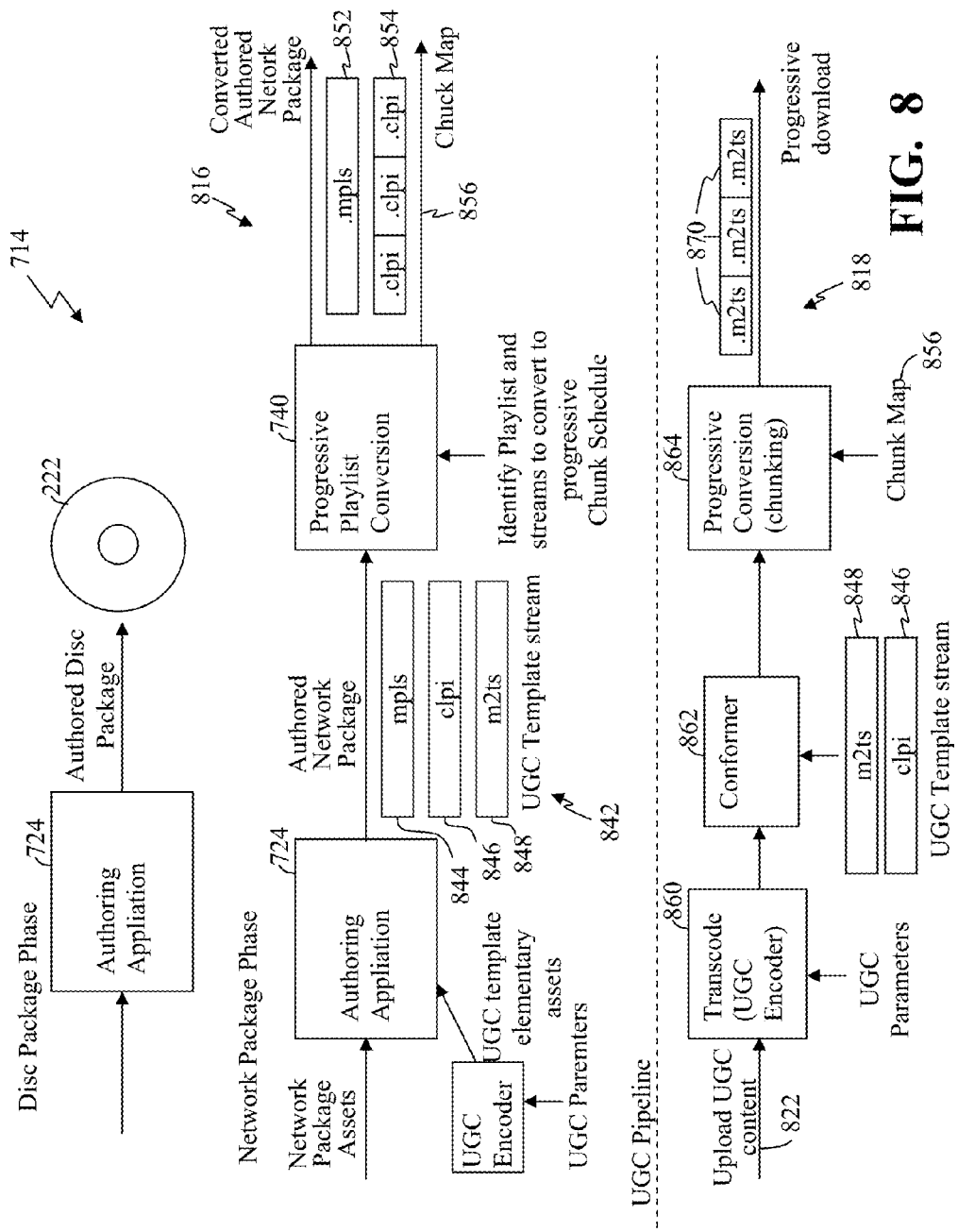
FIG. 8 depicts a simplified block diagram of a graphical representation of a process for authoring a storage medium and supplemental content.

FIG. 8 depicts a simplified block diagram of a graphical representation of a process for authoring a storage medium 222 and supplemental content 822 that conforms to a predefined clip template. The conforming with a predefined clip template, in part, allows the supplemental content to be conformed to a clip template that corresponds with a playlist on the authored storage medium 222 or at the playback device 220. As such, the supplemental content does not have to be known or created at the time the authored storage medium 222 is authored or the playlist is supplied to the playback device. Further, the conforming allows supplemental content to be played back in association with an authored storage medium even when the supplemental content does not have a defined length, such as user generated content (UGC), live content and the like, which can be streamed or downloaded to the playback device 220 for playback in cooperation with the authored storage medium 222. The process can include three phases, the storage medium package phase 714, a network package phase 816 and a content formatting phase 818.

The network packaging phase 816 is used to generate place holders that are to be supplied to the playback device 322 for use in playing back the supplemental content 822. During the network packaging phase 816 the authoring application 724 is used to generate preliminary authored supplemental content package 842 that effectively defines a template that dictates the conforming of the supplement content 822, and that can include a playlist file 844, a template clip information file 846 and a supplemental content template transport stream 848 that is to be utilized in configuring the supplemental content 822. The conversion application 740 is used to generate a converted playlist file 852 including the place holders that point to the plurality of place holder clip information files 854. Further, the conversion application 740 generates a clip or chunk mapping 856 that is also used in configuring the supplemental content 822.

The content formatting phase 818 transcodes 860 the supplemental content (e.g., captured video and/or audio content uploaded to some web server) to put the supplemental content 822 into a correct or desired elemental video and audio format. Using the template clip information 846 and template transport stream 848 generated in the network packaging phase 816 the transcoded supplemental content is conformed through a conformer 862 so that the supplemental content matches up with the place holder clip files 854 that are already onto the playback device 220 or are to be downloaded onto the playback device 220. In some instances, the supplemental content 822 is incorporated into the template transport stream 848 where relevant, replacing portions of the content within the template transport stream while un-replaced portions are defined by null data or replaced by null data as fully described below.

A conversion application 864 is then implemented while applying the chunk mapping 856 generated in the network packaging phase 816 to drive the clipping or chunking of supplemental content transport stream on the fly at the right appropriate points to divide it up into the clips of supplemental content 870. These clips or chunks 870 can then be immediately forwarded over the network to the playback device 322, or can be stored for later downloading.

Figure 9:
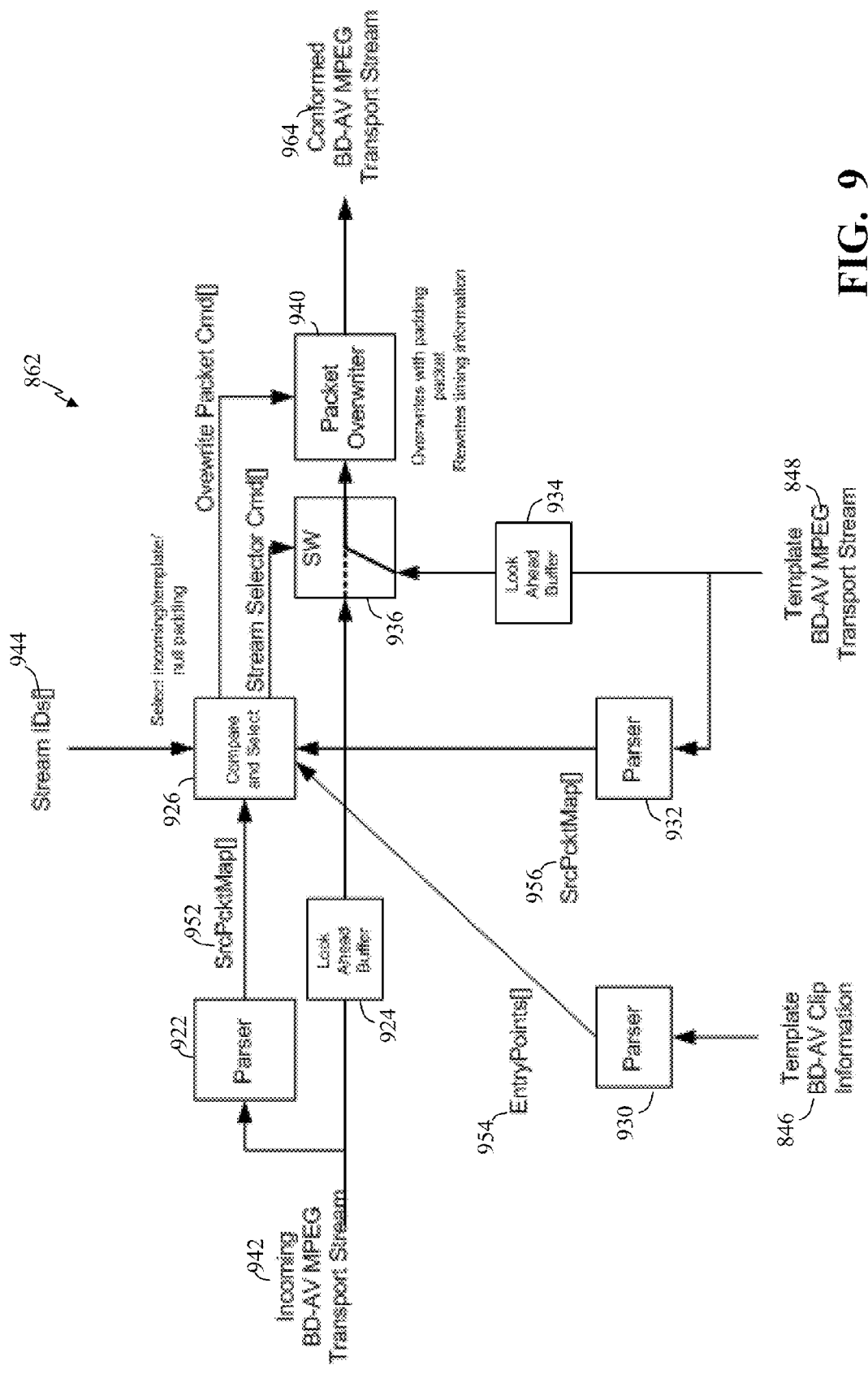
FIG. 9 depicts a simplified block diagram of a conformer according to some embodiments.

FIG. 9 depicts a simplified block diagram of a conformer 862 according to some embodiments. The conformer 862 includes a first parser 922, a first look ahead buffer 924, a compare and selection unit 926, a second parser 930, a third parser 932, a second look ahead buffer 934, a stream selector switch 936, and a packet overwriter 940. Inputs to the conformer 862 can include the transcoded transport stream 942 as transcoded by the transcoder 860, a stream identifier (ID) parameter 944, the template clip information 846 and the template transport stream 848. Further, the conformer 862 generates the conformed supplemental content transport stream 964.

The incoming transcoded supplemental content transport stream 942 and the template transport stream 848 are applied in parallel to the first and second look ahead buffers 924, 934, respectively, to build up a navigational map of the incoming streams. These mappings provide maps of the streams and these mappings are supplied to the selection unit 926 prior to the corresponding portions of the streams so that the selections can be determined prior to actually implementing the selections as described more fully below. At least in part, these mappings provide flow through models of the template transport stream 848 and the incoming transcoded supplemental content transport stream 942.

Further, the incoming transcoded supplemental content transport stream 942 and the template transport stream 848 are respectively applied to the first parser 922 and the third parser 956 to extract metadata and/or parameters from the streams and to generate respective source packet maps 952 and 956. These parameters are included in each of the transport streams 942, 848, but are often difficult to access and/or work with because the streams are generally highly compressed. As a result, the transport stream is parsed to extract the parameters needed. The source packet maps can include a series of parameters that represent the individual packets that are used to build up the actual stream, and can include parameters such as, but not limited to, what the byte positions are; what the current times of those byte positions are; the presentation times; encoding times; for those packets that include payload whether the payload is audio, video and/or other content; whether the stream ID corresponds with a stream ID parameter 944 of interest; and other relevant parameters.

Once the source packet maps 952, 956 are generated (typically built on the fly) they are supplied to the selection unit 926 to be utilized, at least in part, as the basis to determine which packets of the template transport stream 848 are to be kept and which are to be replaced. As described above, prior to actually implementing a selection relative to the streams, the packet maps arrive at the selection unit 926 prior to applying a selection algorithm to an associated packet. The selection unit 926 evaluates a stream ID to make sure that a stream being evaluated is a stream of interest (based on received stream ID parameter 944), information in template clip information file 846, the entry points 954 extracted by the second parser 930 from the template clip information file 846 that define seekable points that the player can seek to within the particular stream as these seek points should be honored, and timing on the stream as it is received to maintaining the timing in an attempt to keep the timing the same (e.g., any particular presentation times of the map between the template transport stream 848 and the incoming supplemental content transport stream 942).

As the supplemental content transport stream 942 flows through the conformer 862 and the selection unit 926, based on the selection decisions made, drives the stream selector 936 to select between a packet of a template transport stream 848, a packet of the incoming supplemental content transport stream 942, or inserting a null packet through the packet overwriter 940. In some instances the conformer 862 further overwrites the presentation and decoding time stamps that were specified in the incoming supplemental content transport stream 942 with time stamps that are aligned to the time base of the template transport stream 848. The conformed supplemental content transport stream 964 is then forwarded to be further chunked and downloaded to the playback device 322 as described above and further below.

In some implementations, the conformer uses the template transport stream 848 to provide master timing. Packets in the template transport stream 848 with a stream ID specified by the inputted stream IDs[ ] parameter 944 array are replaced with either packets with the same stream ID from the incoming supplemental content transport stream 942 or null padding packets. Decisions regarding when to replace a packet from the template transport stream 848 with a packet from the incoming supplemental content transport stream 942 versus a padding packet are based, at least in part, on timing comparisons between the template transport stream 848 and the incoming supplemental content transport stream 942. In some content formats or standards, such as Blu-ray ROM, a packet format is overlaid onto the general MPEG-2 transport stream format, defining a specialized form of a transport packet that is included called a source packet that contains an arrival time stamp. This packet is effectively a transport stream packet, that in some instances, has an extra four bytes in front of it that contains copy protection status of that packet and an arrival time stamp of that packet as it came into the multiplexor (parameter of Interest). This arrival time stamp can further aid in the comparison and selection of a packet, and can be used with both streams to align the streams to make sure that when the packet replacement is being implemented that the packet being replaced corresponds with a similar packet being inserted. The template clip information file 846 further specifies presentation time entry points 954 that are to be honored during the packet replacement process to maintain compliance with the clip information placeholders on the playback device 322.

Figure 10:
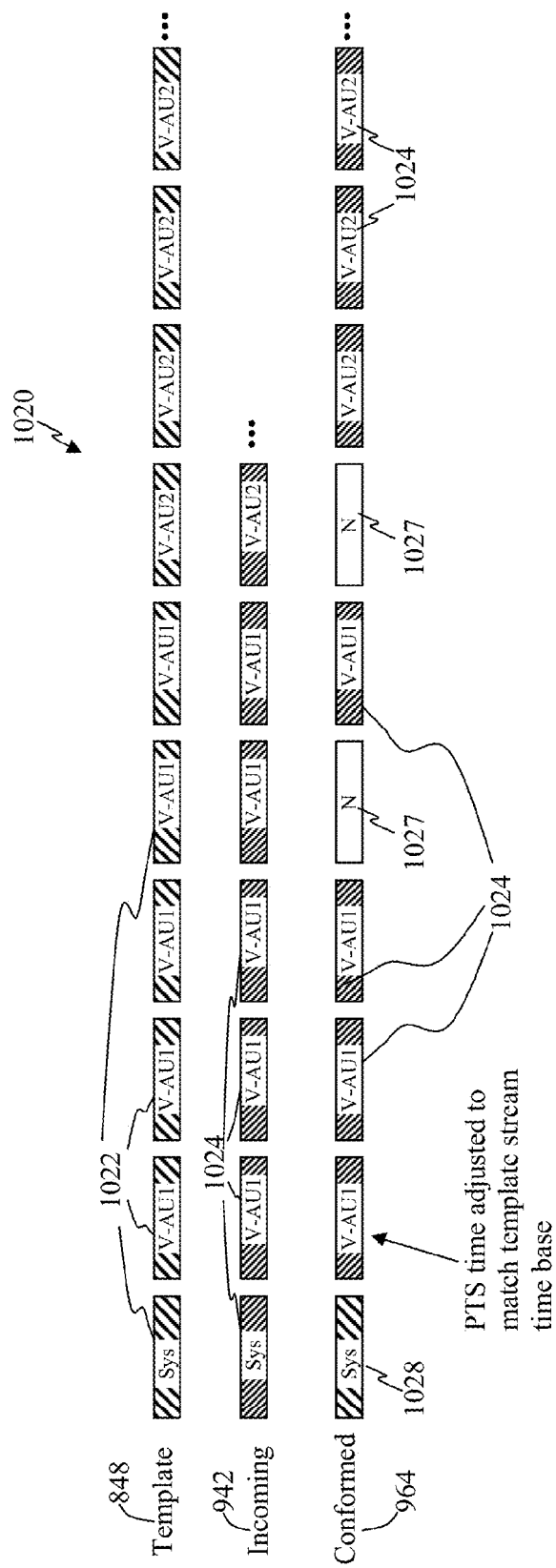
FIG. 10 depicts a simplified block diagram of a graphical representation of a selection process in accordance with the selection unit of the conformer of FIG. 9 in accordance with the template clip information file.

FIG. 10 depicts a simplified block diagram of a graphical representation of a selection process 1020 in accordance with the selection unit 926 of the conformer 862 in accordance with the template clip information file 846. Shown are a series of packets 1022 of a template transport stream 848, a series of packets 1024 of an incoming supplemental content transport stream 942, and the resulting series of packets 1024, 1027-1028 of the conformed supplemental content transport stream 964. Based on the selections implemented by the selection unit 926, in accordance with the timing, packets are selected or padding or null packets 1027 are incorporated to produce the conformed supplemental content transport stream 964. The resulting conformed supplemental content transport stream includes some packets 1022 from the template transport stream 848 (which might include one or more system packets 1028 and other such overhead packets), packets 1024 from the incoming supplemental content transport stream 942 and some inserted null or padding packets 1027. The null packets provide padding bits between packets of content to, in part compensate, for the difference in actual content versus the template, to maintain timing, satisfy buffering requirements and/or conform with predefined clip information.

When incorporating the incoming packets of supplement content transport stream 942 in compliance with the template clip information 846, the decoding time stamp (DTS) and presentation time stamp (PTS) timing can be adjusted to match the template transport stream 848. Further, in some instances, a packet arrival time stamp is taken from the template transport stream 848.

In some embodiments, when encoding the supplemental content transport stream the configuration parameters of the incoming video stream should be set to be similar to or the same as configuration parameters for the template transport stream 848 with the exception of at least bit rate. Additionally, positioning and/or durations of GOP (Groups of Pictures) and/or group of video access unit (GOVU) of the supplemental content transport stream 942 should correspond with, and in some instance be identical to the GOP/GOVU of the template transport stream 848 to allow presentation time stamps between the template transport stream 848 and the incoming supplemental content transport stream 942 to be appropriately compared.

Furthermore, the total number of bits between entry point presentation times in the incoming supplemental content transport stream 942 is less than the total number of bits between corresponding entry point presentation times in the template transport stream 848. If not, the incoming supplemental content stream transport stream 942 will not fit into the template transport stream 848 and/or adjustments to the supplement content transport stream 942 would likely have to be employed (e.g., re-encoding at least a portion of the supplemental content transport stream to comply with bit constraints). For example, some implementations may use a factor of 1.5 in setting a mean average bit rate between the supplemental content transport stream 942 and the template transport stream 848. This factor may, in some instances, be adjusted or tuned, and may also be impacted by peak bit rates. Further, the granularity of entry points can be spaced to improve chances of fitting (e.g., the entry point granularity can be greater than 1 second apart, or in some instances greater than 2 seconds apart).

The selection unit 926 in selecting packets is driven by the template transport stream 848. For each packet from the template transport stream, the type of the packet is determined. In some implementations, system type packets (which are generally overhead, describe the stream or the like) are maintained in the conformed transport stream 964 and selected by the selection unit 926, null packet are generally replaced with packets from the supplemental content transport stream 942 (e.g., audio, video, private style data, etc.). As described above, the time is further evaluated, and in those instances where timing between the template transport stream 848 and the supplemental content transport stream 942 do not match, a null packet can be selected and inserted.

Before selecting a packet the stream ID designated in the packet is evaluated to confirm that the stream ID corresponds with a stream ID parameter 944. As the information flows into the selection unit 926, additional information in the packet are evaluated, such as a time stamp. In some instances, the packet is searched for a presentation time stamp, which is the timing associated with a give packet designated when it is expected to be presented on a display or through speakers during playback. A comparison is performed on the presentation time stamp of the template transport stream 848 and the presentation time stamp of the supplemental content transport stream 942. For example, for a packet of the template transport stream 848 the selection unit 926 determines whether a corresponding packet, corresponding in presentation timing and having a matching stream ID to the stream ID parameter 944 being sought, can be identified in the supplemental content transport stream 942. Once a packet from the supplemental content transport stream 942 is identified that has a matching stream ID to a stream ID parameter 944, the presentation time is evaluated to determine whether the packet corresponds in presentation time with the template transport stream 848 and should be incorporated into the conformed supplemental content transport stream 964. In some embodiments, the selection is dictated, at least in part, confirming that the presentation times match, and if the presentation time align, then issuing a selection command to let the packet of the supplemental content transport stream 942 flow through to the output. Alternatively when the presentation time do not align, a null packet is inserted because there is an insufficient bit rate in the incoming supplemental content transport stream 942 to match the template transport stream 848.

Referring back to FIG. 8, once generated the conformed supplemental content transport stream 964 is further processed through the conversion application 864 applying the chunk mapping 856 to generate clips or chunks 870 of supplemental content. The converted corresponding playlist 852 contains many play items pointing to a separate clip, and in some embodiments, each of those clips represent the granularity of the progressive downloads. In some instances, the chunking is performed in line. As packets are delivered from the conformer 862 they flow into the conversion application or component 864 that progressively converts the stream in accordance with the chunk map 856. The clip information 854 can be utilized, in some implementations, to generate the corresponding clips 870 of supplemental content. For example, the clip information can dictate how many packets are in each clip, defined the start time and end time of each clip. As introduced above, a mapping 856 can be generated to provide a convenient set of data to work with, and can be used by the conversion application 864 when generating the clips 870 by taking the conform supplemental content transport stream 964 and specifying which packet goes into which clip for which amount of time and/or this many bytes into the clip, designate an ending of the clip and closing the clip.

As described above, in some embodiments, integer numbers of packets are incorporated into clips of supplemental content 870. In those instances where an integer number of packets cannot be incorporated into a clip to fill the clip, a maximum number of packets are incorporated without exceeding the bounds of the clip and the remainder of the clip is filled with null or padding data, to at least in part maintain timing. Some embodiments, when generating the clips honor align unit constraints, and as such have to include an integer number of packets into each clip. In those instances where an integer number of packets cannot be incorporated into a clip to fill the clip, a number of packets are incorporated into the packet relative to an end time and the remainder of the clip is padded out with null or padding data to comply with the integer multiple of the align unit.

For example, BD-ROM provides that each clip be integer divisible by 32 packets (6144 bytes). So if a segmented clip boundary does not meet that parameter, then null padding packets are added, typically, at the end of the clip. Further, the null packets incorporate the BD-ROM specialized arrival time stamp. This time stamp advances at a rate less than or equal to the quoted transport stream mux bit rate from null packet to null packet. This places a further restriction over choosing viable clip boundaries because a big enough time gap should be provided between the end arrival time stamp of clip N and the beginning arrival time stamp of clip N+1 to insert a series of null packets where the arrival time clock advances at a rate of the quoted stream transport stream mux rate.

Figure 11:
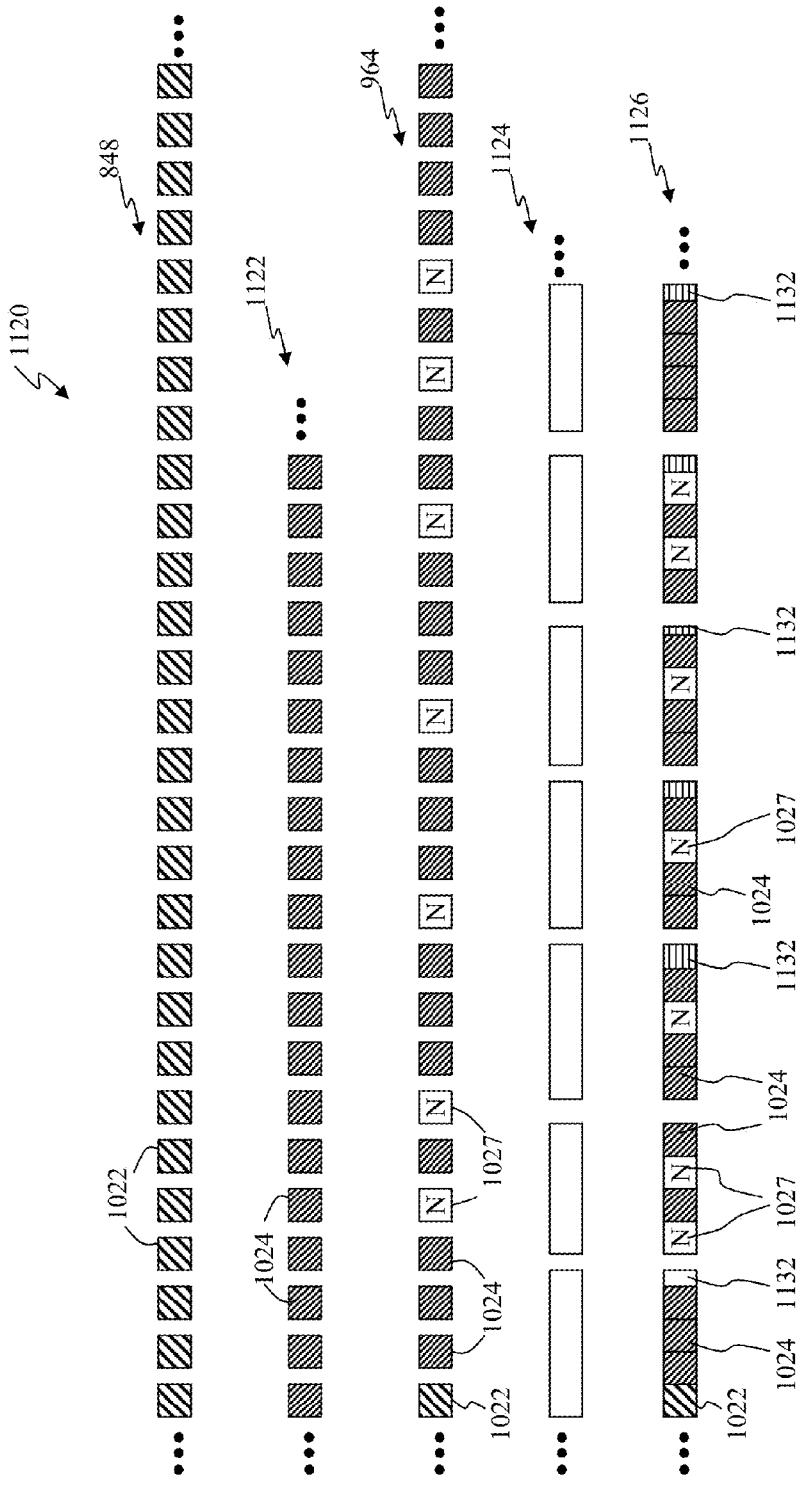
FIG. 11 depicts a simplified block diagram of a graphical representation of a process for segmenting a stream of supplemental content in accordance with a predefined clip template to generate clips of supplemental content.

FIG. 11 depicts a simplified block diagram, according to some embodiments, of a graphical representation of a process 1120 for segmenting a stream of supplemental content 1122 in accordance with a predefined clip template 1124 to generate clips of supplemental content 1126 conformed to the clip template 1124. The stream of supplemental content 1122 is divided into packets 1024 and can be substantially any relevant supplemental content, for example, audio and video (A/V) data. As described above with reference to FIGS. 7-10, the packets 1024 of supplemental content are transcoded, when needed, and conformed based on a template transport stream 848. A conformer 862 generates a conformed supplemental content transport stream 964 that may include template transport stream packets 1022, supplemental content packets 1024 and/or null packets 1027. Based on the clip template 1124, the conformed supplemental content transport stream 964 is then segmented by breaking up the supplemental content into the clips of supplemental content 1126. Each clip of supplemental content 1126 includes one or more packets 1022, 1024, 1027. Further, padding bits, packet(s) or data 1132 may be incorporated into one or more of the clips of supplemental content 1126 when an integer number of packets 1022, 1024, 1027 does not fill the clip. The profile of the resulting plurality of clips 1126 of supplemental content conforms to the predefined clip template 1124. As such the clips of supplemental content can be mapped to the clip information at the playback device, and in some instances is provided to satisfy buffering requirements.

A dummy or hypothetical content stream can be used in generating the predefined clip template 1124 and relevant clip information. This dummy stream is not distributed to playback devices, and instead is used to create the clip template and clip information file that has sufficient overhead or head room to allow substantially any expected supplemental content stream 1122 to be segmented in accordance with the profile of the clip template. A dummy stream can be encoded, for example, at a bit rate in excess of a bit rate of anticipated supplemental content to establish clips with data in excess of supplemental content data when encoded at a bit rate compatible with playback devices. This establishes at least in part the excess data size in the clip template so that the clips of supplemental content can correspond to the clip template and thus the clip information associated with the clip template.

Multiple different clip templates can be generated and one of the multiple clip templates can be selected, for example, depending on one or more factors such as, an expected or known playback device, communication link bandwidth and other such parameters. The different clip templates produce different data streams at different bit rates, total bandwidths and the like that can be tailored based on different communication link bandwidths and/or speeds, playback device processing capabilities and bandwidth and other such factors. The portable storage medium 222 can include multiple different playlists with each playlist being associated with different playback parameters, such as communication links bandwidth and/or speed, playback device processing capabilities, other parameters or combinations of such parameters. In some embodiments, the programming 142 on the medium 222 further includes programming that can cause the playback device 220 to implement an application to determine network bandwidth, device processing capabilities and/or other such parameters, and to select a playlist 122 and relevant clip information recorded on the medium based on the determined parameters. This selection can be forwarded to the server 326 or other remote device that can identify a predefined clip template that corresponds with the selected playlist 122 and forward supplemental content conforming to the identified predefined clip template.

Further in some instances, the supplemental content is encoded and/or multiplexed (e.g., interleaving video and audio supplemental content together) to meet a particular set of buffer model requirements in attempts to ensure that the encoded stream of supplemental content can be played back through one or more particular playback devices and/or devices that comply with a particular playback standard or framework, such as a Blu-ray, HD DVD or other such compliant player. The encoding and/or multiplexing interleaves content in attempts to ensure that the playback device will not overrun or underrun its buffers.

A dummy or hypothetical content stream can be used and encoded, for example, at a relatively very high bit rate specification. This very high bit rate is selected to be greater than a bit rate expected for the supplemental content (for example, greater than bit rate for user generated content). The predefined clip template is generated based on this encoded high bit rate effectively creating a container into which supplemental content can be configured. By using the predefined clip template it is known where the packets and the like are going to be positioned along the stream.

Actual supplemental content, such as user generated content, is generated at a lower bit rate, and often at a much lower bit rate than the hypothetical content stream used in generating the predefined clip template. When the encoded supplemental content stream 1122 is broken down into the clips 1126 the clip template 1124 provides leeway and flexibility to adjust the content 1130 within clips 1126 because the amount of data of the supplemental content 1130 being incorporated into a clip as defined by the clip template 1124 is less than (and in some instances significantly less than) the data size allotted for the clip by the clip template 1124. The supplemental content within the clip 1124 is adjusted to align the supplemental content 1130 with the clip template, in some embodiments, by incorporating null or dummy data 1132 (e.g., preselected series of bits, string of one (1) bits or other such null data). The series of null or dummy data 1132 are skipped by or unrecognized by the playback device 322 in playing back the clips 1126 of the supplemental content (e.g., MPEG compatible decoding devices typically skip MPEG-2 13818-1 null packets).

As described above, the predefined clip template 1124 can be used to dictate, at least in part, the encoding and/or multiplexing to generate a stream of supplemental content clips 1126 that conforms with the predefined clip template 1124. As such, the encoded supplement content stream includes padding 1132 (e.g., dummy or null data or bits) aligning the content 1130 so that the clips 1126 of supplemental content are in compliance with the predefined clip template and correspond with clip information on a medium 222 or otherwise provided to the playback device.

The padding 1132 of a supplemental content stream, in some instances, can be implemented by incorporating the dummy bits or data within the content stream at different layers in a hierarchy of a transport stream specification. For example, padding can be incorporated at the elementary layer and/or at the packet layer. As a further example, MPEG2 transport streams includes packets, and each packet is identified for storing one of video, audio, sub-pictures, graphics or the like. The padding may be incorporated by inserting null data, for example, into sub-picture data when it is known or determined that the packets need to be realigned. The null packets can be incorporated at strategic points so that the stream conforms to the predefined clip information of the clip template. For example, null sub-picture data could be incorporated into the stream where the null data is never accessed, available or displayed by the playback device. Some content streams can include and/or allow one or more secondary streams to be included in the multiplexing. As such, some embodiments additionally or alternatively incorporate some or all of the padding, for example at the packet layer, using another secondary stream as the padding.

In some embodiments, a hybrid strategy can be employed where initially the supplemental content stream is encoded and multiplexed attempting to comply with a predefined clip template while erring on the side of caution. The encoded content stream can then be further adjusted by incorporating further padding to more accurately and/or precisely meet the predefined clip template. This hybrid application may be utilized in some instances where tighter bit rate demands are needed, for example, when there is limited memory space, attempting to reduce a download size and other such instances.

It is noted that the incorporation of padding or dummy data 1132 results in increased data sizes of clips of supplemental content and the transporting of additional redundant data. Attempts can be employed, in some instances, to try and further reduce the data size prior to transmission of the clips to the playback device. As the supplemental content is passed through a multiplexor it typically is already compressed and incorporation of padding, as described above, is added to satisfy the buffer requirements and mapping to the predefined clip template information. Further reductions in data size, however, may be obtained by passing the clips of supplemental content through a second level of compression. The subsequent content clips can then be decompress at the playback device before being recorded to the local storage of the playback device or otherwise utilized by the playback device. In some embodiments, a decompression application can be run from programming 142 on the portable storage medium 222.

Additionally or alternatively, the padding can be excluded from the clips of supplemental content. The clips without padding can be forwarded to the playback device 220 and the playback device can then implement processing of the clips to incorporate padding into the clips. The padding at the playback device can be incorporated, for example, by implementing, at the playback device, programming 142 (e.g., Java code) from the portable storage medium, stored on the playback device and/or received from a separate source (e.g., through BD-Live™ applications). The programming 142 can identify where the padding is to be incorporated based on a mapping or other indications in the content stream or provided separate from the content stream, and used to rebuild the content stream at the playback device 220 with the appropriate padding as needed.

Some embodiments may define the padding at the server 326 or other processing facility by defining or added, through a run-length compressed format, additional start codes that define padding data that runs a specified length. The playback device 220 when playing back the clips detect the start codes and extend the content in accordance with the defined start code and specified length. Another method of designating to a playback device where padding is to be incorporated is to provide a padding mapping or packet mapping to the playback device. The padding or packet mapping can define the padding for an entire content, or a packet mapping can define padding for just a portion of the content, such as for a single clip, a grouping of clips or some other portion of the content. Based on the packet mapping the playback device can incorporate the padding into the content prior to playback, and in many instances prior to writing the content to local storage for use in playing back the content in accordance with the Blu-ray specification. This mapping can be forwarded as a separate file or set of data, for example, prior to receiving the content over separate channel or received with the content, such as in a header or otherwise prior to or with the content.

Allowing the playback device to incorporate the padding into the content stream can greatly reduce the amount of data that has to be communicated to the playback device (e.g., downloaded), and can reduce the redundancies that occur due to the padding. For example, because of the variations in video content, the instantaneous encoding bit rate can dramatically vary, when encoding with a variable encoding rate. A video stream may have a nominal or average bit rate of 4 Mbits/sec., however, at any given point during the stream the encoding rate may jump, for example to 9 Mbits/sec. because of rapid scene changes, and similarly may drop to as low as 1 Mbits/sec. In order to allow and compensate for such fluctuations, a clip template would be selected that had an adequate capacity to deal with the incoming video that is being conformed to the clip template. As such, the selected clip template would have a high bit rate, and thus, would result in a large amount of padding (e.g., large numbers of padding packets) over a majority of the conformed content stream. Providing a packet mapping or defining within the content stream where the padding is to be incorporated will allow the content stream to be transmitted without the transmission and communication of large amounts of redundant and null data. The playback device, instead, can incorporate the padding as defined within the stream (e.g., through start codes and defined padding lengths or numbers of packets) or through the packet mapping. Incorporating the padding into the content stream at the playback device additionally allows a clip template to be selected that can accommodate a larger range of encoding bit rates.

Figure 12:
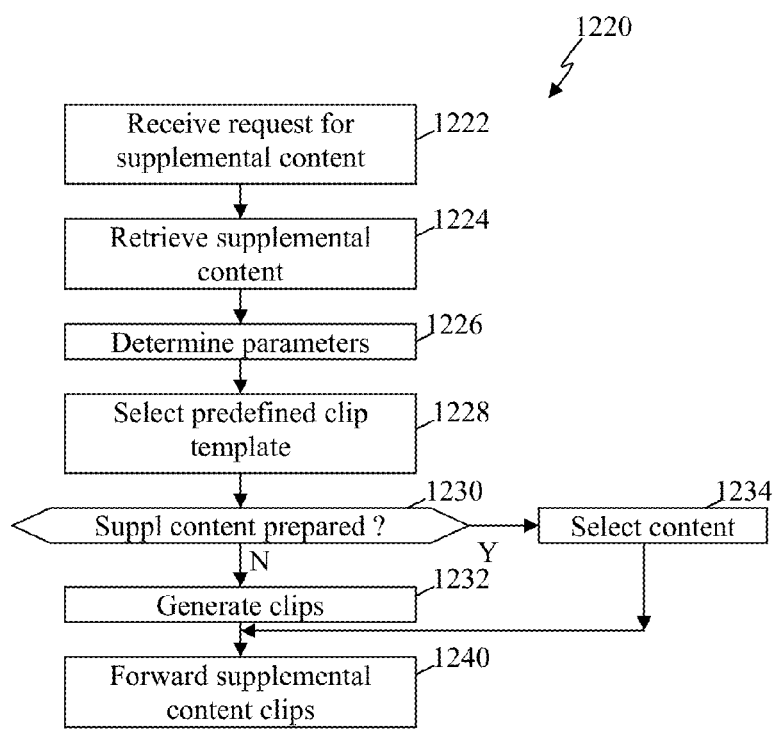
FIG. 12 depicts a simplified flow diagram of a process of segmenting supplemental content into clips of supplemental content.

FIG. 12 depicts a simplified flow diagram of a process 1220 of segmenting supplemental content 1130 into clips of supplemental content 1126. The segmenting can occur prior to receiving the request (e.g., pre-recorded content segmented according to one or more templates and/or encoding rates), or segmented at the time of request and/or with live content. In optional step 1222, a request to playback supplemental content is received over the network 324 from a playback device 322. In step 1224, the supplemental content is identified and retrieved. In some instances the supplemental content is retrieved as it is generated, for example, recording a live performance, production, event or the like. In step 1226, the relevant parameters and/or characteristics of the playback device and/or communication link are determined or a clip template is identified, for example a clip template specified by the playback device. As described above, the programming 142 in some instances provides code that induces the playback device 322 to determine its playback, processing and/or buffering capabilities. Further, the playback device 220 and/or programming 142 on the medium can cause a selection of a playlist that corresponds with a predefined clip template and/or clip information recorded on the portable storage medium and associated with the place holder 128. The communication link can further affect the data flow to the playback device and can be used in adjusting the generation of the clips of supplemental content 1126, selecting an encoding rate relative to the selected clip template, and/or selecting supplemental content that has been segmented and prepared in advance and stored.

In step 1228, a predefined clip template 1124 is identified and selected in accordance with the relevant parameters or designated template. In step 1230, it is determined whether supplemental content has been prepared in advance and is available. In those instances where the supplemental content has been prepared in accordance with the clip template and encoded according to the relevant parameters, the process skips to step 1234. The process continues to step 1232, when the supplemental content has not been prepared, where the supplemental content stream 1122 is encoded and/or multiplexed in accordance with the selected clip template 1124 and the identified parameters (e.g., bit rates, communication bandwidth, etc.) to generate the supplemental content clips 1126 that include the supplemental content 1130 and in some instances includes the padding data 1132 where appropriate. Alternatively, the supplemental content clips 1126 are generated without the padding data 1132, but instead include start codes or other designators that, when detected by a playback device, will be used by the playback device to generate the padding data 1132 and incorporate the padding data 1132 at the playback device as described above and fully described below. In yet other implementations, a packet mapping or null data mapping is generated in cooperation with the supplemental content clips 1126, to be used by the playback back device in generating the padding data 1132 and incorporating the padding at the playback device.

In step 1234, a prepared set of supplemental content is selected based on the identified template and other relevant parameters, such as network bandwidth and the like. In step 1240, the supplemental content clips 1126, and mapping where appropriate, are forwarded to the playback device 220.

The process 1220 can be implemented any number of times, and in some instances simultaneously, for multiple different relevant parameters. For example, multiple playback devices 220 may be accessing a source for supplemental content (e.g., a live event such as a director's commentary) and multiple streams of supplemental content clips can be generated for different playback devices having different parameters. Further in some instances, steps 1222, 1224 and 1226 are skipped and multiple different clip templates are selected in step 1230 and used in step 1232 to generate multiple different streams of content clips. When playback devices request to access the content one of the multiple different streams of content clips can be selected in accordance with playback parameters and/or communication parameters.

Figure 13:
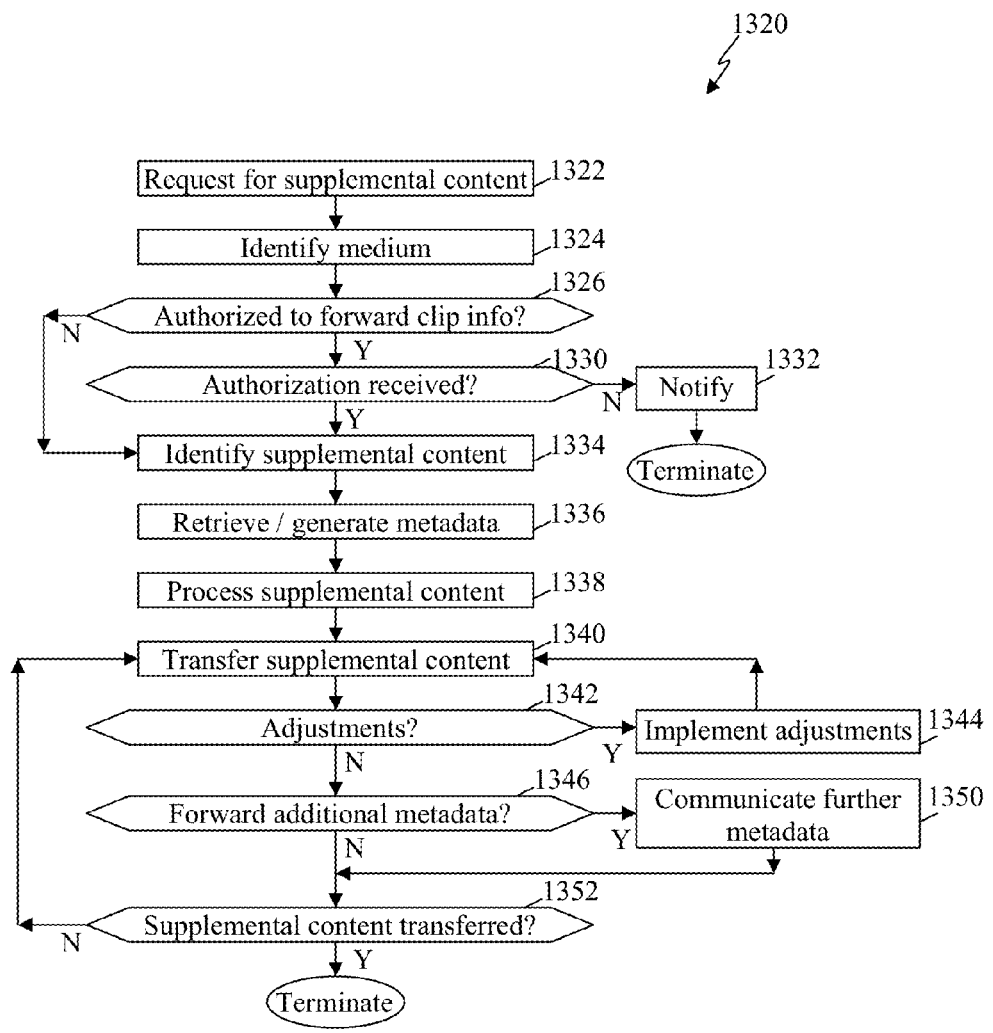
FIG. 13 depicts a simplified flow diagram of a process implemented by a content source or supplier that can format supplemental content associated with a portable storage medium.

FIG. 13 depicts a simplified flow diagram of a process 1320 implemented by a content source or supplier that can format supplemental content 452 associated with a portable storage medium 222, and in some instances forward the formatted supplemental content to a requesting playback device 220. For example, the content source can be a local or external memory 228 of a playback device 220, remote server 326 or remote memory storage device 328 coupled with and communicating with the playback device over a distributed communication network 324, such as the Internet, or other such source. Further, the process 1320 can be implemented by a content supplier that formats the content and distributes the formatted content to sources to be accessed by playback devices 220. The formatting can include, but is not limited to, formatting for appropriate communication when relevant, encrypting or applying other protection to the supplemental content, compressing the content, segmenting the supplemental content in accordance with one or more clip templates when the content has not yet been broken down into the segments, re-segmenting according to other parameters, and other relevant formatting. In some embodiments, the process 1320 can be utilized in cooperation with the process 1220 of FIG. 12.

In step 1322, the content source (e.g., server 326) receives a request for supplemental content to be played back in association with a medium 222 at a playback device 220. In step 1324, the medium 222 at the playback device is identified, and in some embodiments, authenticated. The authentication can be through substantially any authentication process as are known in the art. In step 1326, it is determined whether authorization to forward the supplemental content is needed. In those instances where authorization is not needed the process skips to step 1334. Alternatively, step 1330 is entered to determine whether authorization is received. The authorization may be based on information provided by the playback device 220, a user profile, a verification of payment received, authorization from a third party device (e.g., a third party server associated with an owner of content of the supplemental content and/or content recorded on the medium), a password, and/or other such authorizations. In those instances where authorization is not verified the process issues a notification, in step 1332, to the playback device and terminates.

In step 1334, the requested supplemental content 452 is identified, typically based on the identity of the medium 222 and/or content recorded on the medium. Other factors can also be taken into account in identifying the supplemental content. For example, the template; encoding parameters, such as when multiple streams are available that are encoded at different rates; a user profile can be considered when determining the supplemental content to supply, such as, identifying supplemental content appropriate for a user's age, identifying prior supplemental content previously received, a level of service for which a user has paid (e.g., a basic level versus a premium service), and the like; a level of authorization can be evaluated (e.g., a user may have paid a lower fee for a first supplemental content, while a higher fee could have been paid to obtain one or more alternate or further supplemental content); capabilities of the playback device can be considered (e.g., whether the device can received streamed content, providing high definition video content when the playback device is capable of utilizing such content, etc.); network characteristics (e.g., network bandwidth); and other such factors.

Once the supplemental content has been identified, the process 1320 continues to step 1336 to retrieve and/or generate metadata and/or actual supplemental content information (e.g., actual playback duration, actual playback timing and other such relevant metadata), and forward the metadata when available to the requesting playback device. In optional step 1338, processing and/or formatting of the supplemental content is performed when processing is needed. This processing can include generating the clips of supplemental content (e.g., implementing process 1120 and/or 1220 described above with reference to FIGS. 11 and 12), encrypting, formatting and/or packaging the clips for communication based on a communication protocol and other such processing. As described above, in some instances the clips of supplemental content may be prepared in advance according to one or more templates and/or encoded according to one or more different encoding rates and/or schemes. When the supplemental content has been preprocessed, step 1338 can be skipped or the processing in step 1338 may be limited, for example limited to formatting according to a specific communication channel, encrypting or other such processing. In step 1340, a transfer of the supplemental content is initiated. In those instances where padding data is to be generated and incorporated into the supplemental content at the playback device 220, the transfer of the supplemental content in step 1340 can include forwarding a packet mapping or other such indications to the playback device, when the padding information is not incorporated directly into the content stream, so that padding can be generated at the playback device at the appropriate locations within the content stream.

In step 1342, the transfer of the supplemental content is monitored to determine whether adjustments are to be made. These adjustments can be based on changes to the communication link, instructions from the playback device or other such changes. When adjustments are to be made step 1344 is entered to implement appropriate adjustments, and the process 1320 returns to step 1340 to continue the transfer as adjusted in accordance with determined appropriate adjustments. The adjustments can vary depending on conditions of the communication link and/or bandwidth, actions by the user, and/or other such factors. In some instances, the adjustment can include a stream switching. By employing a single template and encoding the same supplemental content using the single template while applying two or more different encoding rates to produce a plurality of different streams of the same content at different rates, a stream switch to a lower or higher bit rate can be implemented without altering the playback or requiring the playback device 220 to reboot, restart, implement an update (e.g., an update to the virtual file system (VFS)) or other such updates; or a switch to a completely different supplemental content can be implemented where the different supplemental content is conformed to the single template.

The process 1320 continues to step 1346 to determine whether additional metadata, commands, supplemental content information and/or actual clip information is to be forwarded to the playback device. For example, additional metadata may be known based on completing an encoding of the supplemental content, a media stop command may be communicated, packet mapping designating at least padding locations and amounts of padding to be inserted by the playback device and be defined, or other such information. Step 1350 is entered when further metadata, other relevant information or command(s) are to be forwarded, and the further metadata, other relevant information or command(s) is communicated to the playback device. In step 1352, it is determined whether that the supplemental content has been completely transferred. When the transfer is not complete, the process 1320 returns to step 1340 to continue the transfer. Alternatively, the process 1320 terminates.

Figure 14:
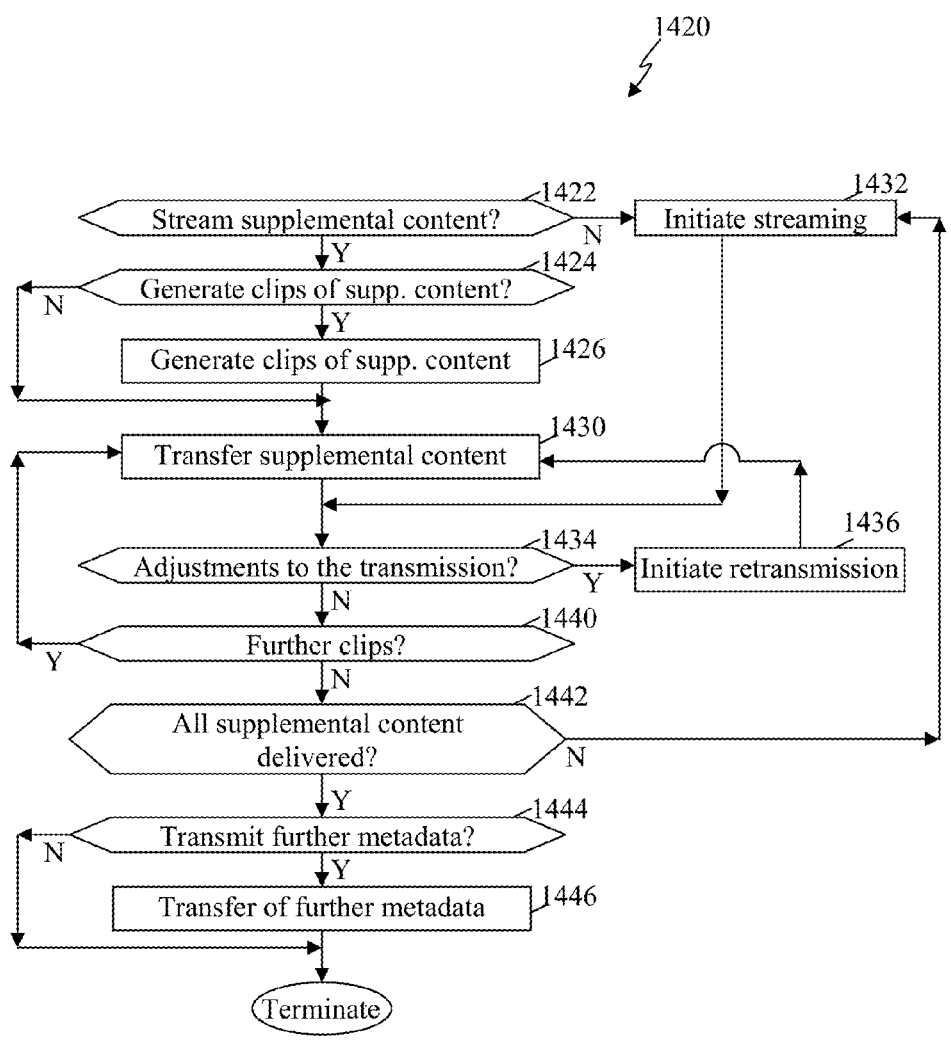
FIG. 14 depicts a simplified flow diagram of a process of distributing supplemental content from remote sources to a playback device.

FIG. 14 depicts a simplified flow diagram of a process 1420 of distributing supplemental content from remote sources (e.g., a server 326 or remote digital storage 328) to a playback device 220. In some embodiments the process 1420 can be incorporated as part of the process 1320 described above. In step 1422, it is determined whether the supplemental content is to be downloaded or streamed to the playback device. In those instances where the identified supplemental content is to be downloaded to the playback device, step 1424 is entered to determine whether one or more clips or segments of the supplemental content are to be generated. In some instances, the supplemental content may have already been broken down into a plurality of clips or segments 1126 of supplemental content to be forward. Step 1426 is entered when clips of the supplemental content are to be generated and based on one or more parameters the supplemental content is processed to initiate the generation of clips of supplemental content. The parameters can include buffer size of the playback device 220, bandwidth of the communication network, processing speed and/or capabilities of the playback device, playback rates and/or bit rates of the playback device and content being played back, the amount of supplemental content to be forwarded, identified predefined clip template and other such relevant parameters. The process 1420 continues to step 1430 following step 1426 and when it is determined in step 1424 that the supplemental content does not have to be broken down into clips, where transfer of a clip or file of supplemental content is initiated. Similarly, step 1432 is entered when the content is to be streamed where the streaming of the content is initiated.

In step 1434, the process determines whether adjustments to the transmission (e.g., transmission rates) or retransmission of a clip or a portion of the streamed content is to be implemented. The adjustments and/or retransmissions can be based on feedback received from the receiving device or error conditions detected. In step 1436, retransmission is initiated. In step 1440, it is determined whether further clips are to be transmitted. When further clips are to be transferred the process 1420 returns to step 1430 to initiate the transfer of a subsequent clip of supplemental content. Alternatively the process continues to step 1442 where it is determined whether all of the supplemental content has been delivered to the playback device. In those instances where further supplemental content is to be forwarded the process returns to step 1432 to continue to deliver the supplemental content. When it is determined that all of the supplemental content has been forwarded step 1444 is entered to determine whether further metadata or other relevant information is to be forwarded to the playback device. Step 1446 is entered to initiate the transfer of further metadata or other relevant information in those instances where further metadata or other relevant information is to be transferred.

As described above, in some implementations the null or padding data is not incorporated into the supplemental content at the content source and is not communicated, for example over a network 324, to a playback device. Instead, the supplemental content is conformed to a selected template and data defining the placement of where the padding packets 1027 and/or padding data 1132 is to be incorporated and an amount of padding to be incorporated is identified. A separate padding or packet mapping is generated or padding designations are incorporated into the content stream, such that the packet mapping and/or padding designations identify where padding is to be incorporated and how much padding is to be incorporated. The playback device utilizes this packet mapping or padding designations to incorporate the padding at the playback device to be stored in local memory at the playback device prior to being played back. By not implementing the padding at the content source, the amount of data to communicate the supplemental content is reduced.

The generation of padding at the playback device 220 can be implemented through software retrieved from the portable storage medium 222, local storage 228 and/or received from over the network 324 (e.g., through BD-Live™). This software application can be implemented through substantially any relevant programming, such as Java, or any other relevant programming that can run in the playback device environment and that interprets the packet mapping and/or padding designations (e.g., start code) within the stream. Using the mapping and/or padding designations the playback device can determine where to fill out the padding (e.g., based on timing) and how much padding to incorporate. A resulting content stream, after the incorporation of the padding at the playback device, is ready for playback, and in some instances, can be written into local storage ready for playback. In other implementations, such as in some streaming implementations, the padding information may not be actually written into the content stream by the playback device, but instead utilized as timing information. Alternatively, however, some implementations utilize and incorporate the padding within the content stream to comply with clip information at the playback device and/or of the medium, and preserve an integrity between the content stream and a clip information map. Still further, the padding, can in part, be incorporated into the content stream to maintain buffer levels and maintain timing.

Figure 15:
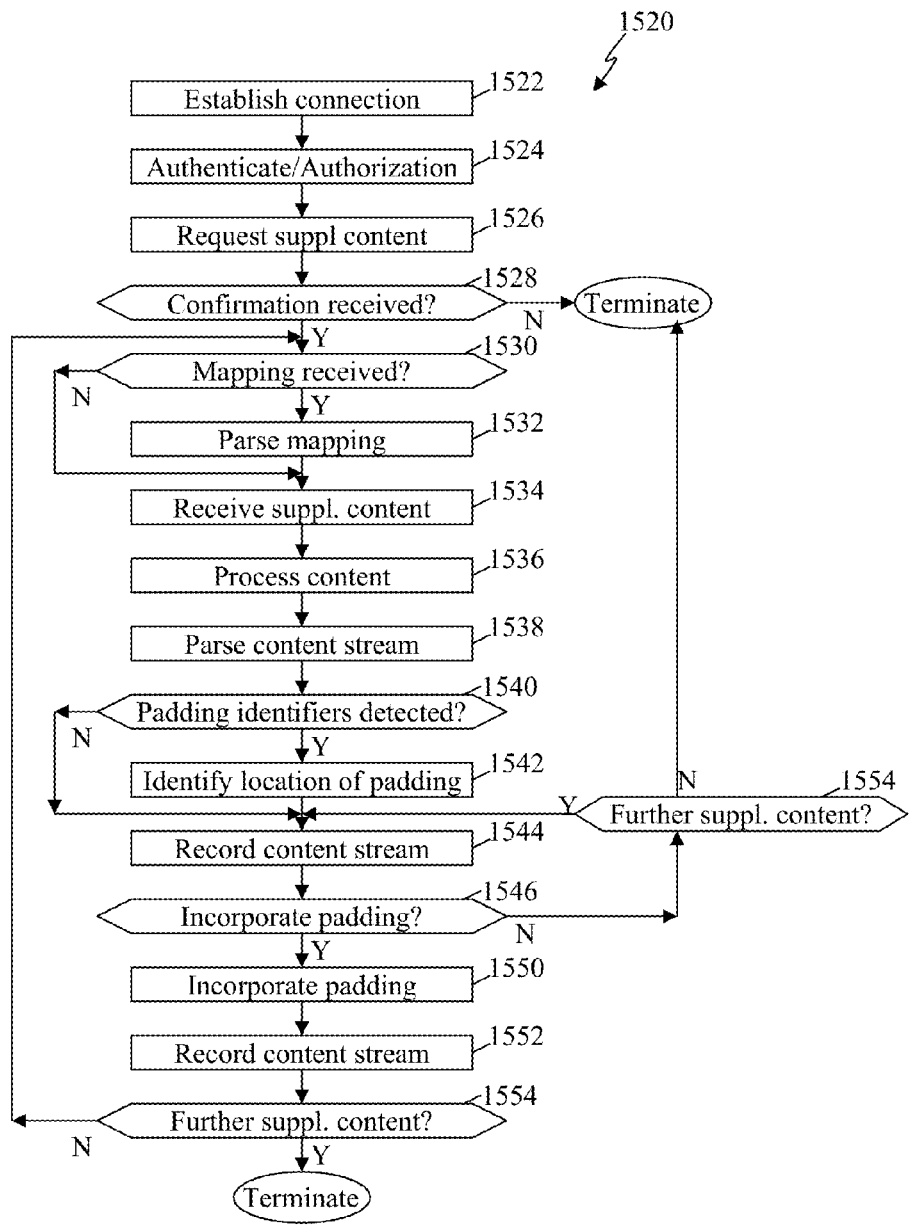
FIG. 15 depicts a simplified flow diagram of a process, implemented through the playback device, of generating padding at the playback device.

FIG. 15 depicts a simplified flow diagram of a process 1520, implemented through the playback device 220, of generating padding at the playback device according to some implementations. In step 1522, communication is established with a source of supplemental content, such as a remote source 326. In step 1524, the playback device 220 authenticates and/or provides authorization of itself and/or of the portable storage medium 222 when requested by the remote source. In step 1526, a request for the supplemental content is forwarded to the remote source 326. This request can include providing an identification of the portable storage medium 222, identifying prior supplemental content, identifying a user and other such information that can be utilized by the content source in identifying supplemental content as described above and further below. In step 1528, it is determined whether a confirmation is received that supplemental content is available and is to be communicated. In those instances where there is no supplemental content the process 1520 terminates.

In step 1530, it is determined whether a packet mapping is received. As described above, in some instances, the packet mapping can be forwarded over the same or a different communication channel. Further, the packet mapping may only be a partial mapping for a subset of the supplemental content. When a packet mapping is not received, the process continues to step 1534. Alternatively, step 1532 is entered where the packet mapping is parsed and an initial location and amount of padding is identified.

In step 1534, supplemental content is received. In step 1536, the supplemental content is initially processed. This initial processing may include some initial decompression, decoding, decryption and/or other such pre-processing. In step 1538, the content stream is parsed. In step 1540 it is determined whether one or more padding identifiers are detected within the stream designating that padding is to be incorporated into the content stream. The padding identifier can be defined, in some instances, as a start code that specifies padding with a defined length, runtime, number of packets, number of bytes or the like.

When the content stream includes a padding identifier, step 1542 is entered to determine the location where the padding is to be incorporated into the content stream and an amount of padding to be incorporated. In step 1544, the playback device begins to locally record the supplemental content stream. In step 1546, the content stream is monitored while writing the supplemental content stream and it is determined whether padding packets or data is to be incorporated at a current location within the supplemental content stream as defined by the packet mapping and/or padding identifier. In those instances where padding is not to be incorporated, the process continues to step 1548 to determine whether additional supplemental content is received and/or is to be recorded locally. In those instances where no further supplemental content is being received the process 1520 terminates.

When further content is received or to be recorded the process returns to step 1544 to continue recording the content stream. When it is determined in step 1540 that padding is to be incorporated at an identified location within the supplemental content stream, step 1550 is entered where the playback device 220 generates the specified one or more padding packets and/or padding data, and incorporates the padding into the supplemental content stream. In step 1552 the generated padding is record within the content stream, including the padding packets and/or data. The process then continues to step 1554 to determine whether further supplemental content is received and/or is to be recorded locally. In those instances where no further supplemental content is being received the process 1520 terminates. Alternatively, the process returns to step 1530 to again evaluate the packet mapping when available, determine whether additional packet mapping is received for portions of the content not mapped by previous packet mapping, and/or continues to step 1536 to see whether further padding identifiers are specified.

The content stream received at the playback device, in some instances, is effectively a reduced or compressed stream because some or all of the null packets have been removed. The playback device then reinserts the null packets, and thus, needs to know where to insert the null packets. In some instances, a packet mapping identifies locations within the stream where the null packets are to be incorporated. Additionally, when the playback device is inserting more than one null packet, the playback device in some instances identifies timestamps (e.g., ATC timestamps) to be used for each null packet. For example, each null packet can be configured as a source packet, which can be a BD-ROM construct that has an extra four (4) bytes that contains the timestamp. As such, the playback device has to determine or be provided with the timestamp to incorporate the timestamp in the packet to reconstruct a content stream, for example, that complies with the BD Specification.

Figure 16:
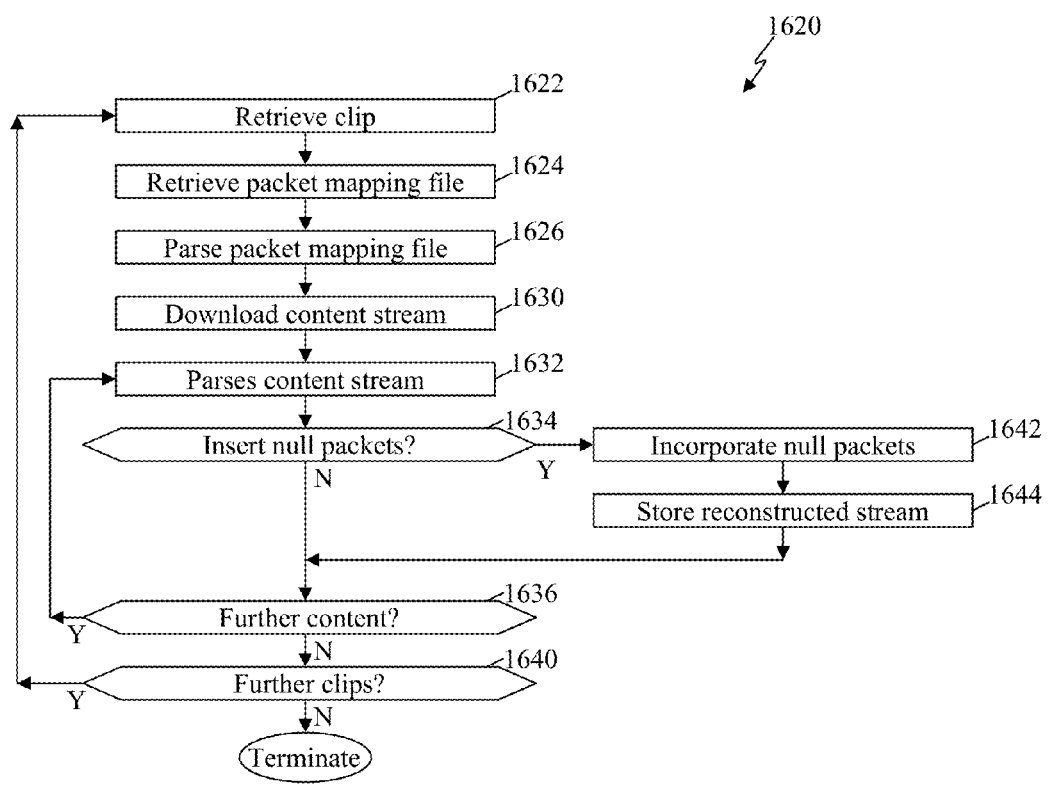
FIG. 16 depicts a simplified flow diagram of a process to incorporate padding into a content stream at the playback device, in according to some implementations, with the use of one or more packet mapping files.

FIG. 16 depicts a simplified flow diagram of a process 1620 to incorporate padding into a content stream at the playback device, in according to some implementations, with the use of one or more packet mapping files, where a packet mapping file can be associated with a single clip or chunk, multiple chunks or an entire content stream. In step 1622, it is determined that a particular clip of content is to be retrieved. For example, it can be determined in step 1622 that the particular clip is to be downloaded in accordance with a clip information file during a progressive download. In step 1624, the playback device 220 retrieves or accesses an associated packet mapping file. This associated packet mapping file can be received from a remote source prior to implementing playback or during the progressive download.

In step 1626, the packet mapping file is parse to identify the locations (e.g., byte regions) where padding is to be inserted, and where appropriate to identify a source packet timestamps (e.g., an ATC timestamp). In step 1630, a playback application downloads of the stream data for the particular clip. In step 1632, the playback application processes, parses and/or evaluates the content stream relative to the packet mapping as the stream is received and buffered. In step 1634, it is determined whether one or more null packets are to be inserted into the content stream based on the byte region being evaluated. In those instances where null packets are not to be incorporated the process 1620 continues to step 1636 to determine whether further content for the particular clip is to be evaluated. In those instances where further content is to be evaluated the process returns to step 1632 to continue to process the content. When it is determined that the clip has been evaluated step 1640 is entered to determine whether the content stream comprises further clips and that further clips are to be downloaded and evaluated. When additional clips are to be retrieved the process returns to step 1622 to retrieve further clips of content. Alternatively, the process 1620 terminates and/or returns to the playlist to continue the playback in accordance with the disc 222.

When it is determined in step 1634 that one or more null packets are to be incorporated into the content stream, step 1642 is entered where the packet mapping file associated with the particular clip is evaluated to determine a number of null packets to be incorporated into the content stream relative to an identified byte region and the relevant number of null packets are incorporated into the content stream. In some instances an ATC timestamp is additionally set in accordance with the parsed packet map producing a reconstructed stream for the particular clip. Additionally or alternatively, the null data can be extracted from a null template stream and incorporated into the content stream as described below. In step 1644, the reconstructed content stream is written to local storage on the playback device. The process 1620 then continues to step 1636 to determine whether further content for the particular clip is to be evaluated.

In some instances, the packet mapping file defines regions of bytes into which padding is to be incorporated. Further, the packet mapping file defines a number of null packets to be incorporated within the region. The null packet data can, in some implementations, be constant and held in memory as a constant on the playback device to be readily copied and incorporated into the content stream. Below is a partial sample of an example packet mapping file according to some implementations.

```
<?xml version="1.0" encoding="utf-8" ?>
- <paddingMap aacs="false" atcDelta="846" numBlocks="454">
    <null pos="66432" count="250" atc="314627436" />
    <null pos="66624" count="25" atc="315651096" />
    <null pos="67008" count="345" atc="315757692" />
```

-continued

```
<null pos="199104" count="27" atc="328685418" />
<null pos="208128" count="32" atc="330848640" />
<null pos="211008" count="30" atc="331983126" />
<null pos="216192" count="25" atc="333130302" />
<null pos="219456" count="28" atc="334243638" />
<null pos="224640" count="25" atc="335391660" />
<null pos="225024" count="43" atc="336439008" />
<null pos="226944" count="43" atc="337592952" />
<null pos="268416" count="21" atc="343282302" />
<null pos="270912" count="32" atc="344361798" />
<null pos="273984" count="36" atc="345470904" />
<null pos="276672" count="31" atc="346618926" />
<null pos="280128" count="34" atc="347732262" />
<null pos="283200" count="29" atc="348879438" />
<null pos="287232" count="63" atc="349997004" />
<null pos="295104" count="56" atc="352278666" />
<null pos="301056" count="9" atc="354492648" />
<null pos="301248" count="52" atc="354530718" />
.
.
.
<null pos="2839872" count="37" atc="13841972" />
<null pos="2842752" count="37" atc="14989148" />
<null pos="2845440" count="31" atc="16119404" />
<null pos="2848704" count="69" atc="17258120" />
<null pos="2852928" count="5" atc="19489022" />
<null pos="2853888" count="64" atc="19527092" />
<null pos="2857920" count="35" atc="21732614" />
<null pos="2861568" count="33" atc="22867946" />
<null pos="2863488" count="35" atc="23984666" />
<null pos="2866368" count="42" atc="25103078" />
<null pos="2868288" count="30" atc="26258714" />
<null pos="2871360" count="69" atc="27359360" />
<null pos="2877120" count="77" atc="29619872" />
</paddingMap>
```

In this example, the packet mapping file is defined in accordance with an XML format. It is noted, however, that the packet mapping file can be implemented in substantially any relevant format that can be parsed by the playback devices to accurately identify where the null data is to be incorporated and an amount of null data to incorporate, such as text file or other parsable formats. Similarly, the arrangement, layout or organization of the packet mapping file can be varied from the above example to substantially any arrangement that allow accurate extraction of the relevant information to incorporate the padding.

Additionally, in this example, the "null pos" parameter defines a position within the stream where one or more null packets are to be incorporated. This location or position parameter can define a byte position, a byte number, time codes or other such parameter that can accurately identify a location within the content stream where the one or more null packets are to be added. Further, the position parameter can define a position relative to the clip, the entire content stream or other such relation, for example, the position can define a byte position within the clip. A "count" parameter defines the number of null packets to incorporate at the identified location. In this example, the mapping additionally includes an "atc" parameter that defines a timestamp for a first null packet of the one or more null packets to be incorporated at the identified position. In some instances, a single timestamp is identified for the one or more null packets and the timestamp for each successive null pack of the "count" is incremented according to a known timing, for example, based on the timing of a packet. In some instances, this known timing is defined. In the example packet mapping above, the known timing is defined by the "atcDelta" parameter, which in this example defines a timing of 846. As such, in this example, each successive packet added has a timestamp equal to the prior timestamp plus the known period (846 in this example).

As a specific example, the first entry of the example packet mapping file above defines that 250 null packets are to be added at byte position 66432, and that the timestamp for the first null packet of the 250 null packets is 314627436 (which in this example is based on a 27 MHz clock cycle). A second null packet would then, in this example, have a timestamp of 314628282 (i.e., 314627436+846). The output result would be a fully reconstructed stream that could then be written to local storage.

Still further, the padding can be incorporated by the playback device without the packet mapping file using alternative schemes to define where to incorporate padding and how much padding to incorporate. For example, an alternative scheme defines a new private extension start code at the transport stream layer to carry the packet mapping data, which in some instances is essentially the same as in the example packet mapping file above. In yet other implementations, a convention (protocol) is established between a server or source 326 and the playback device 220 where a predefined set of the clip, such as the opening bytes of a stream clip are defined and known to be packet mapping data. The playback device then parsed these opening bytes first to extract the packet mapping data. Data that follows the packet mapping data in the opening bytes is then the actual stream data with the padding removed. Still other embodiments can implement the scheme as a true run length encoding algorithm using a symbolic scheme. This may be very general and may also be processor intensive on the playback device side.

In some embodiments, the null data is grouped instead of being distributed over a clip. The positioning of the null packets can be moved so that null packets are grouped together, and in some instances grouped together as much as possible within the confines of the buffer model and T-STD delay constraints of the transport stream. This grouping provides, in some instances, better data compression for download.

Within a transport stream that utilizes start codes, some embodiments utilize a defined start code or newly defined extension start code at the transport stream layer that is detected by the playback device notifying the playback device that null packets are to be incorporated. A playback device can include some pre-processing of the content stream to detect the defined start code and then identify the amount of null data to be incorporated. A data can define the amount of null data or number of null packets to incorporate, which can include similar information as specified in the example mapping file above. Alternately, a convention or protocol can be defined between a content source 326 and a playback device 220, where one or more opening bytes of a stream clip are known to be packet mapping data. The playback device parses the one or more opening bytes to extract the packet mapping data. Data that follows the opening bytes is then the actual content stream data with the padding removed. This allows padding to be incorporated by the playback device to be defined within the content stream. Additionally or alternatively, some embodiments may employ run length encoding algorithm using a symbolic scheme by evaluating the content to identify repeated patterns of null packets, and encoding based on the identified repeated patterns.

Some embodiments additional group padding or packets to improve compression. During encoding, the content stream is processed to optimize the grouping of the null packets with defined constraints. These constraints can include encoding the content stream to comply with a buffer model of an intended playback device, transport standard target delay (T-STD) constraints and other such constraints and limitations of the transport stream and playback device that may limit the amount of grouping of the null packets. By grouping the null packets a better data compression for download may be obtained.

In many instances, the content received from the remote source 326 is encrypted or other protection is applied to the content. Further, many standards require that the content played back in association with a medium be encrypted or otherwise protected. This protection often must additionally be maintained for supplemental content received from a remote source and written to local storage before playback, and thus, the supplemental content is often in an encrypted or otherwise protected state when received and recorded to the playback device. As a result, in some implementations the incorporation of the padding packets and/or padding data into the supplemental content stream at the playback device includes incorporated null packets that are encrypted or otherwise protected in accordance with the content stream and/or encrypting or otherwise applying some protection scheme to the padding packets and/or data to correspond with the supplemental content stream. A playback device 220, however, may not have or may not have access to the encryption keys. Similarly, with some protection or encryption techniques variables may be utilized, such as timestamps, as part of the encryption key or other protections. For example, the Blu-ray Standard dictates the use of Advanced Access Content System (AACS).

Again, the BD format specification defines a stream where the 188 byte packets of the MPEG2 13818-1 Transport Stream are augmented with 4 byte headers containing: two copy protection indicator bits, and 32 bit ATC timestamp. The combined 192 bytes is termed by the BD specification as a source packet. The packets are then further organized into groups of 32 to form an aligned unit. The AACS copy protection applied in accordance with BD proscribes that encryption should be applied using the AES 128 algorithm with a chained block cipher option (CBC). The chaining mechanism creates a dependency of AES 128 bit block "n" on block "n–1". As a result, block "n–1" typically needs to be decrypted before block "n" can be decrypted.

This encryption algorithm is to be applied to the aligned units independently. Further, the first 16 bytes of the aligned unit are to be left unencrypted. The encryption key or "block" key is created by encrypting the first 16 bytes of the aligned unit using AES 128 with a CPS unit key (or title key). The result is the block key for which the first 16 bytes of the aligned unit acted as a seed. The remaining 16 byte (128 bit) blocks of the aligned unit are then encrypted with the block key.

As such, the encrypted result cannot be predicted because each source packet contains an ATC time stamp that is changing from packet to packet. Even if every block of the aligned unit is padding data the encrypted result typically cannot be predicted (and therefore signal) because each source packet contains the ATC time stamp, again which is changing from packet to packet (marking time). The encryption algorithm is strong so there is almost no discernible correlation between the unencrypted aligned unit of padding and the encrypted output. As such, the playback device may be unable to effectively incorporate padding packets and/or data into a content stream that could accurately be played back.

Some embodiments provide for encrypted content while still allowing padding to be incorporated into the content stream at the playback device 220 by employing a null template stream. The null template stream contains null data configured in accordance with the playlist 120 that is to be accessed by and utilized at the playback device 220 in playing back content. Further, the null template stream can be conformed, and chunked when appropriate, to directly correspond with and align with a content stream. As such, the playback device can extract one or more null packets and/or aligned units from the null template stream and insert the extracted one or more null packets or aligned units back into the content stream as dictated by, for example, the packet mapping file or other such padding designations.

In generating the null template stream, the aligned units would correspond and align with aligned units of an expected content stream when the null template stream and the content stream are conformed and/or chunked in accordance with the same clip template and/or chunk schedule. As such, null packets or aligned units extracted from the null template stream and inserted into a content stream comply with the content stream and can result in a fully compliant content stream to be played back by the playback device.

In some embodiments, the null template stream is generated by creating a null content stream that comprises null packets, and typically is full of null packets with no substantive content (e.g., no video or audio content). The null content stream can be further chunked and conformed into aligned units and encrypted or otherwise protected in accordance with a protection scheme to be utilized in protecting the actual content steam that is to be supplied to and played back by the playback device in accordance with the playlist 120. The conformed and chunked null content stream produces the null template stream.

For example, a null content stream can be conformed through the conformer 862 in association with a template (e.g., template transport stream 848). Similarly, the conformed null content stream can be chunked in accordance with a chunk schedule resulting in the null template stream that will correspond with a content stream that is conformed and converted when the same template and chunk map is applied. The null template stream, however, will comprise a series of null packets and/or aligned units that can be extracted and inserted into a content stream while maintaining timing and complying with protection schemes applied to the content stream.

Again, prior to forwarding the content stream to the playback device the content source can pull the null aligned units or packets from the content stream reducing the amount of data that is to be transferred. Aligned units and/or packets of the null template stream will correspond with the null aligned units or packets pulled from the content stream and can be reinserted by the playback device in accordance with the packet mapping into the content stream to reconstruct the content stream including the null data. This null template stream preserves the integrity of the content stream, such as preserving ATC timestamp values, the system packet positions and the like, providing a reconstructed content stream that can be compliant with a given standard.

A single null template stream can be utilized for any number of content streams when the content streams are processed in accordance with the same clip template and the null template stream. Subsequent content streams can reuse the null template stream to incorporate null packets where needed.

In some implementations the null template stream is repeated in accordance with the playlist. This allows the null template stream to be kept at a size that is more readily downloaded and/or occupies less memory. In instances where the content is relatively long a corresponding null template stream would similarly be long. A long null template stream may be inhibitive, for example, in supplying it to a playback device due to download times. By repeating a single null template stream the size of the null template stream can be limited while allowing its use with content streams of substantially any length. Further, in repeating the use of the null template stream in the same playlist, the playlist can continue with substantially any length while the playlist is conformed according to the relatively short repeating null template stream. Additionally, a relatively short null template stream could be readily merged directly into local storage or loaded into memory of the playback device 220.

Further, the repeated use of a null template stream within a single playlist can accommodate multiple different configurations for cooperating the content stream. For example, the repeating of a null template stream can be utilized with both "connection condition 6" and "connection condition 5" as defined in accordance with the Blu-ray standard. Both conditions are meant for seamless connections between PlayItems, which in some instance are aligned units, where connection condition 5 defines a discontinuous stream played back seamlessly, while with connection condition 6 the stream is continuous and both an arrival time clock and system time clock are continuous. Because the aligned units connected through a connection condition 5 are discontinuous, the two connected aligned units can be treated as independent streams, where timing is effectively reset between aligned units. In utilizing a connection condition 5, a relatively short null template stream that is reused from one connection boundary to the next can continuously be used in an on going basis. In some instances, the length of a null template stream can be equivalent to a longest clean break to clean break segment of a content stream, which could comprise one or more chunks.

In some implementations, the null template stream can be configured to define a single chunk, or in some instances a single GOP. Repeating a null template stream for each chunk can reduce processing overhead because processing would not have to look up which part of the null template stream is being used because it would be known as the byte positions would be the same from chunk to chunk.

Figure 17:
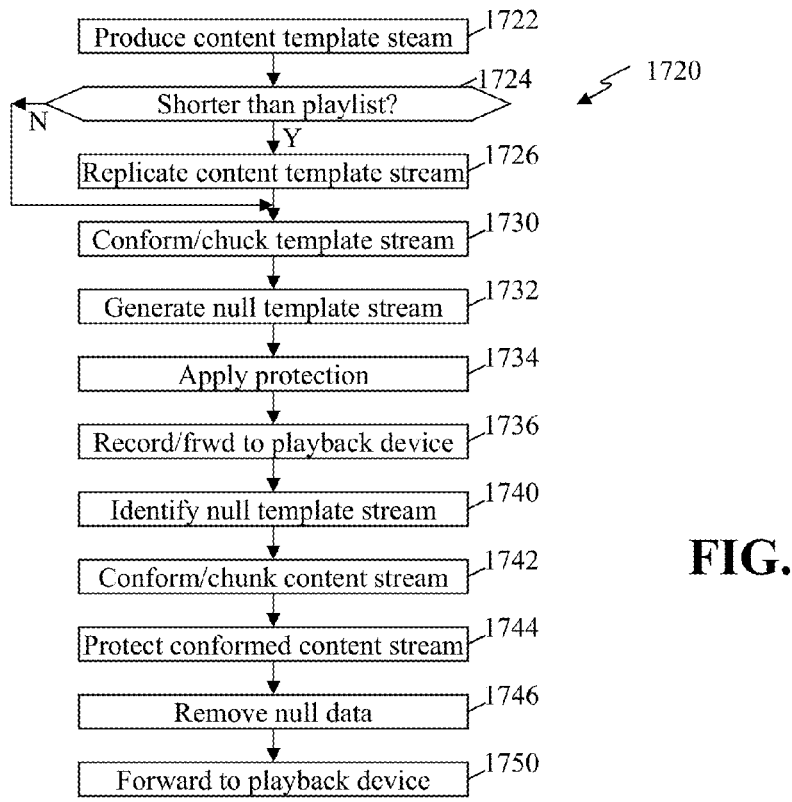
FIG. 17 depicts a simplified flow diagram of a process implemented by a source provider in producing a null template stream that can be utilized by a playback device in incorporating null data into a content stream.

FIG. 17 depicts a simplified flow diagram of a process 1720, implemented by a source that produces the portable storage medium 222 or a content source (e.g., server 326), in producing a null template stream that can be utilized by a playback device 220 in incorporating null data into a content stream. In step 1722, a server side content template stream is produced by chunking and conforming a representative content stream. In some embodiments, the representative content can include a representative audio, video and/or other relevant content that is representative of content to be later forwarded to a playback device to be played back in cooperation with the portable storage medium 222, while in other embodiments, the representative content can be the actual content intended to be forwarded to the playback device. In still other embodiments, the representative content can be substantially any content that is similar to the content intended to be forwarded to the playback device. The server side content template stream, in some instances, is produced with attempts to optimize the compression while complying with buffer models and/or other constraints, by in part grouping the audio and video packets together within the constraints of the specification and expected playback device parameters to increase the likelihood of large numbers of sequential null packets.

Again, in some instances, the server side content template stream can be generated as a relatively short content stream, and further can be limited to a single chunk. In step 1724 it is determined whether the server side content template stream is shorter than a selected playlist (e.g., a playlist on an associated portable storage medium 222). In some embodiments, the server side content template stream can additionally or alternatively be compared with a length of a content stream that is to actually be forwarded to a playback device or a length of an anticipated content stream. In those instances where the server side content template stream is not shorter the process 1720 advances to step 1730. Alternatively, step 1726 is entered where the server side content template stream is replicated a number of times and concatenated producing a single concatenated server side content template stream such that the single concatenated server side content template stream has a length that at least equals or is longer than the playlist (and/or content stream where appropriate). In step 1730, the server side content template stream or concatenated server side content template stream is then processed to conform and chuck the server side content template stream. In some instances, for example where connection condition 5 connections are applied, the conformer 862 can compensate for the timing between repeated server side content models, for example, by resetting a timing between each connections. From the perspective of the conformer 862, the concatenated server side content model looks like a single long server side content template stream, but the long server side content template stream may be composed of a series of short server side content template stream.

In step 1732, a null template stream is created using the server side content template stream as a base and replacing the video and audio packets within the server content template stream with null packets and retaining the system packets (and/or other header, overhead or other such packets). As a result, the null template stream contains system packets in appropriate positioning and aligned units that contain null data. In step 1734, the null template stream is protected, such as encrypted, AACS encrypted or otherwise protected using the same protection scheme that is to be applied to an actual content stream. In step 1736, the null template stream is recorded to a portable storage medium 222, or otherwise forwarded (e.g., downloaded, progressive downloaded or the like) to the playback device 220. As a result, the encrypted null template stream resides at the playback device 220, where the encrypted null template stream corresponds with a content stream to be received at the playback device, allowing the playback device to extract packets and/or aligned units of null data from the encrypted null template stream to be inserted into corresponding positions within the content stream as dictated by a null packet mapping or other designations as described above. One or more null template streams can be maintained and/or used by a playback device. In some instances, however, a single null template stream can be utilizes with multiple different content streams, where the different content streams to be supplied to the playback device are processed to conform to the null template stream available at the playback device.

Still referring to FIG. 17, in step 1740, an appropriate null template stream is indentified. Again, a content stream is to be conformed so that it corresponds with the null template stream at the playback device 220. For example, the playback device can provide the content source with an identification of a null template stream retained at the playback device, the content source can select a null template stream based on one or more parameters (e.g., the content stream to be processed) or other such identification. In step 1742, the content source conforms and chunks a content stream in accordance with the server side content template stream, and thus, the null template stream.

In step 1744, the conformed content stream is protected applying the same protection scheme applied to the corresponding the null template stream. In step 1746, the null packets and/or null packet aligned units are removed from the content stream, and a null packet mapping file is generated or other null designations are incorporated into the content stream. In step 1750, the compressed content stream is forward to the playback device (e.g., downloaded, progressive downloaded, streamed or otherwise delivered). The resulting content stream corresponds with the null template stream at the playback device such that null packets or aligned units removed from the content stream can readily be reinserted from the null template stream by the playback device 220. It is noted that one or more steps of the process 1720 can be performed by different sources. For example a first content source can produce the null template stream (e.g., a source that produces and distributes portable storage mediums 222), while an alternative source can perform steps 1740-1750 in conforming, protecting and distributing a content stream that conforms with the server side content model.

Figure 18:
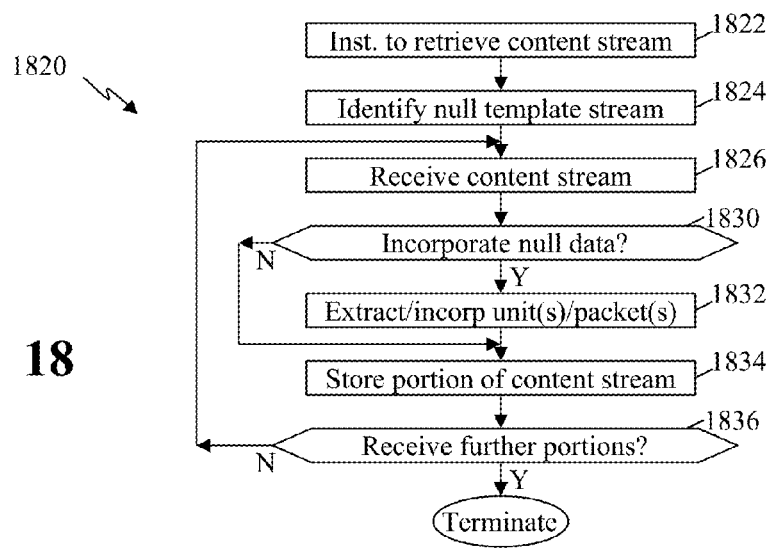
FIG. 18 depicts a simplified flow diagram implemented by a playback device in incorporating null packets into a content stream in accordance with some embodiments.

FIG. 18 depicts a simplified flow diagram 1820, implemented by a playback device 220, to incorporate null packets into a content stream in accordance with some embodiments. In step 1822, the playback device 220 detects that a content stream is to be received from a remote source. In step 1824, the playback device identifies a null template stream to be coordinated with a content stream. In some instances, the content source provides a null template stream identifier. Alternatively, the playback device can supply to a content source an identification of a null template stream stored at and/or accessible by the playback device. In yet other instances, the playback device 220 receives the null template stream from the content source, which is typically received prior to receiving some or all of the content stream, but could be received after receiving some or all of the content stream.

In step 1826, the playback device receives at least a portion of the content stream. In step 1830, the playback device determines whether null data is to be incorporated into the content stream. Again, this determination can be based on a packet mapping, null data designations or other such indications where null data is to be incorporated. When null data is not to be incorporated, the process advances to step 1834 where the portion of the content stream is stored. Alternatively, when null data is to be incorporated step 1832 is entered where one or more aligned units and/or packets are extracted from the null template stream and incorporated into the content stream as defined by the packet mapping and/or other designation. The process then moves to step 1834 to store the portion of the content stream including the incorporated null data. In step 1836, it is determined whether further portions of the content stream are received. When further portions of the content stream are received the process returns to step 1826 to process the received portion of the content stream. Alternatively, the process terminates.

As such, the playback device reconstructs the full stream by inserting aligned units or packets of null data for appropriate positions from the null template stream according to the null packet mapping or other designations. Further, the aligned units or packets inserted by the playback device can be pre-AACS encrypted (or other such protection can be applied), and thus, have correct ATC timestamps and system packets. The resulting constructed stream can therefore be fully compliant with a give standard and/or protection scheme. This allows the integrity of the protection scheme to be maintained and enhancing the entropy associated with the protection.

Alternatively, a default encryption key can be utilized during portions of the content stream where padding is to be implemented by the playback device, where the playback device has or is provided with the default encryption key for those portions to allow the playback device to encrypt and incorporate the padding. In other implementations one or more packets (e.g., clumps of 32 transport packets) can be pre-encrypted, for example with a known or predefined encryption key, and provided to the playback device allowing the playback device to incorporate a specified number of the one or more pre-encrypted packets where appropriate. Additionally in this implementation, the content source can identify those portions of the content stream where padding is to be incorporated by the playback device and these identified portions can be encrypted according to the predefined encryption. In yet other implementations, the content source disables or does not apply protection to those portions or packets of the supplemental content where padding packets and/or data is to be incorporated by the playback device.

Other alternative schemes can be employed, however, many of these alternatives may not be fully compliant with a give standard (for example, not using encryption for a portion of the content and using a default key would not be fully compliant with the Blu-ray Standard). These non-compliant schemes, however, may allow the playback device to incorporate the padding packets and/or data where the resulting supplemental content written by the playback device 220 to local storage (e.g., storage 228 or 229) could then be effectively played back by the playback device without inducing errors. Many playback devices often do not verify that a content stream is fully compliant with a give standard, specification or protocol.

As introduced above, some embodiments additionally allow for stream switching. The use of clip templates that conform to clip information at the playback device 220 (e.g., defined on a portable storage medium 222 or communicated to the playback device) additionally allows some embodiments to switch from one content stream to another without adversely affecting the playback and without requiring the playback device to reboot, restart, implement an update (e.g., an update to the virtual file system (VFS)) or other such updates. For example, a single clip template is utilized to encode a single content stream at different bit rates. Typically, a playback device can only playback a single content stream that is exclusively configured according to the clip information defined on the portable storage medium. Further, a playback device typically only gets one chance, prior to playing back content, to set up the stream that is to be played back in accordance with the clip information defined on the portable storage medium or otherwise received prior to setup. In order to switch from one stream to another stream, the playback device would ordinarily have to go through a reboot, restart and/or an additional virtual file system update, which would interfere with the playback.

By utilizing a single clip template scheme and conforming model, the content stream can be encoded multiple times applying different encoding rates or parameters for each encoding. The playback device can then switch between these various content streams without the need for a virtual file system update or a restart because the clip information is the same for each content stream. As a result, a playback device 220 and/or a content provider 326 can select the best possible playback experience for a playback device, by identifying the highest possible bit rate for that playback device, which may be limited for example by the bandwidth of the connection to the playback device (e.g., cable, DSL, modem, wireless, etc.), and thus, select an encoding bit rate that corresponds to the maximum available bit rate to the playback device. This allows the playback device and/or source provider to adaptively switch the input video stream conforming to the same clip template depending on an actual connection. Additionally when multiple clip templates are defined on the portable storage medium, the playback device and/or the content source can select the clip template that will satisfy the highest possible bit rate, and then allow for switching during playback between the content streams that have been conformed into that selected clip template adaptively depending on varying conditions, such as an actual connection and/or variations on the connection.

To allow for this content stream switching, a number of streams are prepared in advance, when the content is pre-recorded, or prepared simultaneously or substantially simultaneously if the content is to be played back live or substantially live. These pluralities of prepared streams all conform to the same clip template, and then the playback device and/or content source can switch between the streams to achieve a desired playback experience.

The switching between streams allows a transition between a single content that has been encoded at two or more different bit rates, or switching between different content. For example, a communication bandwidth may change during a transfer of the supplemental content stream from an initial bandwidth determination. As a result, the playback device may be unable to effectively receive and decode the content stream or may be able to receive a higher bit rate content stream. By encoding the content stream using a single clip template but at varying bit rates and/or applying varying parameters, a content source may switch between content streams without adversely affecting playback.

Similarly, by encoding two or more different content streams according to the same clip template, playback can be switched between these different content streams. Because the playback device is already accessing and utilizing the relevant clip information that is applicable to both streams, the streams can be switched without a restart, reboot, updating the VFS and the like. This can provide something similar to a channel switch in response to input from a user, the playback device and/or as dictated by the content source and/or content provider. Additionally, with live content, as introduced above, multiple encoders can be employed to encode at different rates. The playback device, in some instances, can adaptively instruct the content source to select an appropriately encoded stream and/or have the stream conformed to the clip template on the fly.

In some implementations when switching between streams, the playback device can identify a clip file at a point along the stream where a switch is to occur and notify the content source 326 supplying the supplemental content of the identified clip file allowing the content source to retrieve the relevant portions of the new content stream. Typically, this selected and identified clip file is to be played back at some time in the future so that there is sufficient time to receive the new content stream from the content source and prepare it for playback. Other timing and conditions can also be communicated between the playback device and the content source to coordinate the switch.

Alternatively or additionally, a playback device 220 can have the functionality and/or logic, either stored locally or retrieved from the portable storage medium 222, to select, retrieve and/or switch between streams encoded at different rates. The playback device 220 determines its current download performance conditions and based on that determination further determines whether it needs to select a lower or higher bit rate or could improve performance by selecting a lower or higher bit rate. Upon identifying a stream or determining that a switch to a different stream should be implemented, the playback device 220 can notify the content source requesting the appropriate stream. In some instances, the playback device constructs an appropriate reference (e.g., URL) from which to start downloading the selected stream clip. In some instances, the playback device can request a listing of potential streams, their relevant encoding rates or other parameters, and corresponding reference from which to retrieve the content. In some embodiments, the playback device 220 queries a web service API to retrieve a list of stream resources and associated URLs. Some existing progressive download applications provide a listing of sources, and as such the playback device's query can be enhanced to specify which stream rate is desired. Additionally or alternatively, the results to the query can be enhanced to additionally specify which stream rate is associated with different sources allowing the playback device to select an appropriate reference in accordance with a desired rate.

Figure 19:
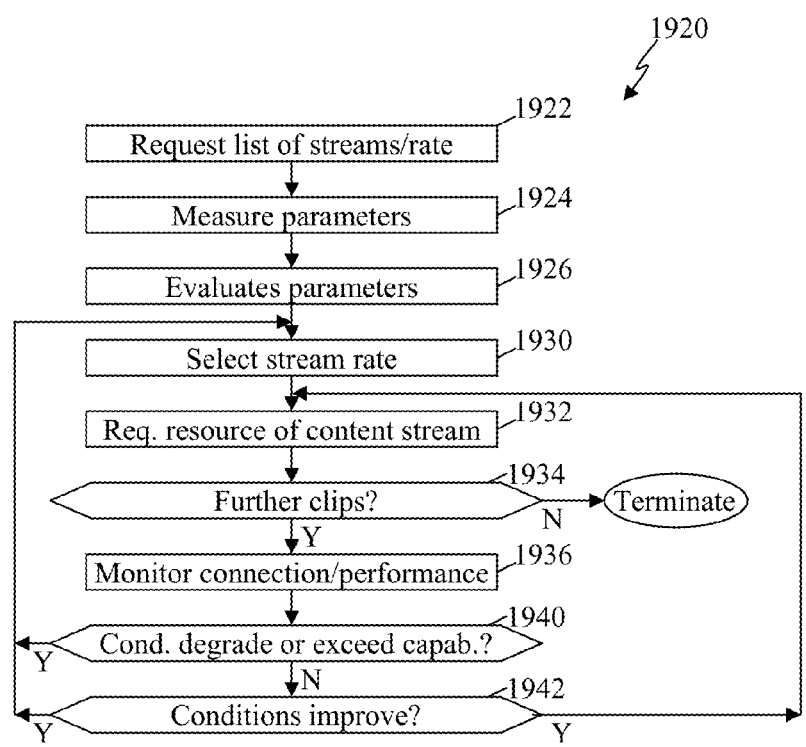
FIG. 19 depicts a simplified flow diagram of a process implemented by a playback device to select a content stream in accordance with a selected rate and to switch to a subsequent stream having a different rate.

FIG. 19 depicts a simplified flow diagram of a process 1920 implemented by a playback device 220 to select a content stream in accordance with a selected rate and to switch to a subsequent stream having a different rate. In step 1922, a playback device 220 requests a list of available streams and associated rate. In some instances, the available streams in this context are the conceptual full length streams that are not chunked but represent the different rates. In step 1924, the playback device measures parameters, such as connection speed or bandwidth and download (or streaming) performance and other such parameters. In step, 1926, the playback device evaluates the determined connection speed along with the capabilities of the playback device (e.g., buffer capabilities, processing capabilities and the like). In step 1930, the playback device 220 selects, based on the evaluation in step 1926 (or in steps 1940 or 1942 as described below), an appropriate stream rate. In step 1932, the playback device requests the resource for a clip or chunk of the selected content stream having the identified rate.

In step 1934, it is determined whether further clips are to be retrieved. In those instances where further clips are not to be retrieved the process terminates and/or returns to the play list upon download of the current clip. When further clips are to be retrieved (e.g., downloaded or streamed), step 1936 is entered where the playback device 220 continues to monitor connection speed and download performance while receiving the clip. In step 1940, it is determined whether conditions degrade and/or the playback device is incapable of keeping pace with the currently selected content stream (e.g., a buffer and/or cache begin to fill or exceeds a threshold level). When conditions have not degraded when a subsequent clip is to be requested, the process advances to step 1942. Alternatively, in those instances where conditions have degraded the process returns to 1930 to identify a content stream that has a lower rate corresponding with the degraded conditions to select upon selection of a subsequent clip.

In step 1942, it is determined whether conditions improve and/or the playback device is capable of processing content at a higher rate (e.g., a buffer and/or cache begin to empty or fall below a threshold level). When conditions have not improved, the process 1920 returns to step 1932 to continue requesting a subsequent clip in accordance with the prior selected rate. Alternatively, when conditions have improved, the process returns to step 1930 to identify a content stream that has a higher rate corresponding with the improved conditions for one or more subsequent clips. As a result, the playback device 220 is capable of monitoring connection conditions and downloading performances, and uses these results to control rate selection for future clips of content to provide an adaptive stream switching system and functionality.

As described above, some playback devices are incapable of receiving actual streamed content. This may be due to limitations of the playback device (e.g., limited buffer size), limitations due to the playback device conforming to a standard or protocol, or other such factors or combinations of factors. For example, according to some standards, such as the Blu-ray Disc Standard, a playback device cannot accept streamed content, and instead, has to receive all of the supplemental content or an entire clip of supplemental content prior to initiating playback, and further typically has to have all of the clip information for the supplemental content (including clip information for all clips when the supplemental content is broken into multiple clips) prior to initiating playback of content from the medium 222 and/or the supplemental content. Again, some present embodiments break down the supplemental content into clips or segments 1126 and allow a clip or segment to be fully received so that the playback device 220 can initiate playback of the received clip while one or more subsequent clips are being received. In providing clips of supplemental content to a playback device, some embodiments attempt to reduce and/or eliminate delays in initiating playback of supplemental content at the playback device by providing initial clips of supplemental content that are relatively small in data size and/or short in playback duration.

Figure 20:
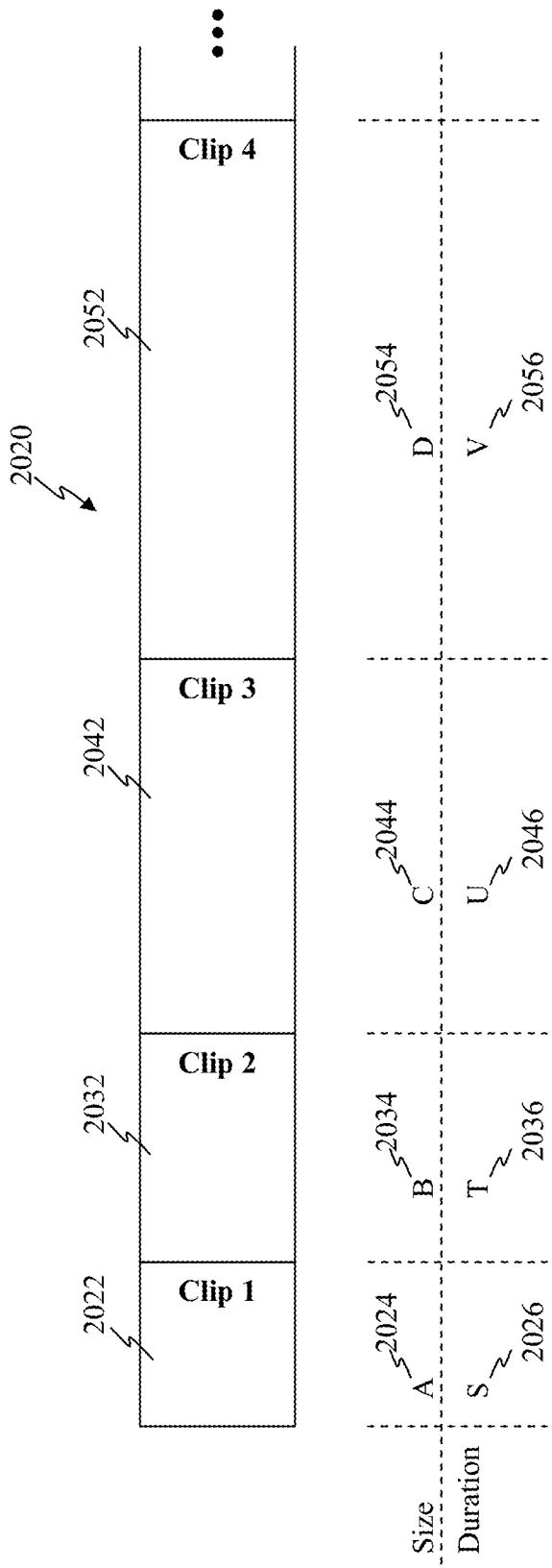
FIG. 20 depicts a simplified graphical representation of a clip template that is employed in defining clip information and segmenting of supplemental content to be forwarded, for example from a server over the Internet to a playback device.

FIG. 20 depicts a simplified graphical representation of a portion of a clip template 2020 that is employed in defining clip information and segmenting of supplemental content 452 to be forwarded, for example from a server 326 over the Internet 324, to a playback device 220. A first clip 2022 is defined to generate a clip of supplemental content having a first data size 2024 and first duration 2026. In some instances, the data size 2024 is representative of the supplemental content of a clip as well as other overhead data where needed (e.g., packaging, protection, error correction and the like). A second sequential clip 2032 is defined following the first clip 2022. This second clip 2032 is defined to generate a clip of supplemental content having a second data size 2036 that is greater than or equal to the first data size 2024 of the first clip 2022, and a second duration 2038 that is greater than or equal to the first duration 2026 of the first clip 2022. Similarly, a third sequential clip 2042 is defined with a data size 2044 and duration 2046 that are greater than or equal to the data size 2036 and duration 2038, respectively, of the second clip 2032. Subsequent clips can continue this pattern of equivalent or progressively increasing data size and/or durations. For example, a fourth clip 2052 can define a data size 2054 and duration 2056 that are equal to or greater than the data size 2044 and duration 2046 of the third clip. The clips of supplemental content generated in accordance with the clip template 2020 are prepared such that physical size and duration (or runtime) of successive clips progressively increase on a clip by clip basis.

The data size and duration can continue to be increased for substantially any number of successive clips. Typically, the data size and/or duration are limited by the buffer size of the playback device 220 and/or other such factors. Similarly, there may be an optimal data size and/or duration for providing the continued playback of the supplemental content. As such, the data size and/or duration of subsequent clips may become constant. For example, a fifth and successive clips may have data sizes and/or durations that are substantially equal. The number of clips that continue to increase in data size and/or duration can depend on numerous factors, such as data transmission rates, playback device capabilities (e.g., decoding, decryption, buffer size, processing and other such processing capabilities), amount of data processing need at the playback device, signal quality, user preferences, and other such factors. For example, the sizes and durations of clips may be based on speed and stability of typical network downloads, proximity in presentation time to common seek points, acceptable latency in starting playback from a give seek point, overhead associated with initiating and handling downloads, and other relevant factors. Similarly, the amount of increase in data size and/or duration between successive clips can also depend on numerous factors, such as data transmission rates, playback device capabilities, amount of data processing need at the playback device, signal quality, user preferences and other such factors.

By defining the first clip 2022 with a relatively small data size and relatively short duration, a first clip of supplemental content conforming to the first clip 2022 of the template 2020 can be fully received and processed by the playback device 220 (e.g., decryption when needed, decoding, evaluation of the clip information and rendering) within a relatively short time. This relatively short response time allows the playback device 220 to begin playing back the first clip of supplemental content with limited or no delay. While the first clip of supplemental content is being played back, a second clip generated in accordance with the second clip 2032 of the template 2020 is being received and processed at the playback device 220. In some instances, the second clip is fully received and processed prior to the termination of the playback of the first clip of supplemental content such that the playback device can immediately and seamlessly begin playing back the second clip upon fully playing back the first clip. Similarly, a third clip of supplemental content generated in accordance with the third clip 2042 of the template 2020 can be received and processed by the playback device 220 prior to completing the playback of the second clip, again allowing seamless transition and playback of the third clip. This provides a streamed appearance to the content during playback, and in particular provides the streamed appearance when the playback device is not capable (whether functionally or due to conformity to a protocol or standard) of receiving actual streamed content.

Figure 21:
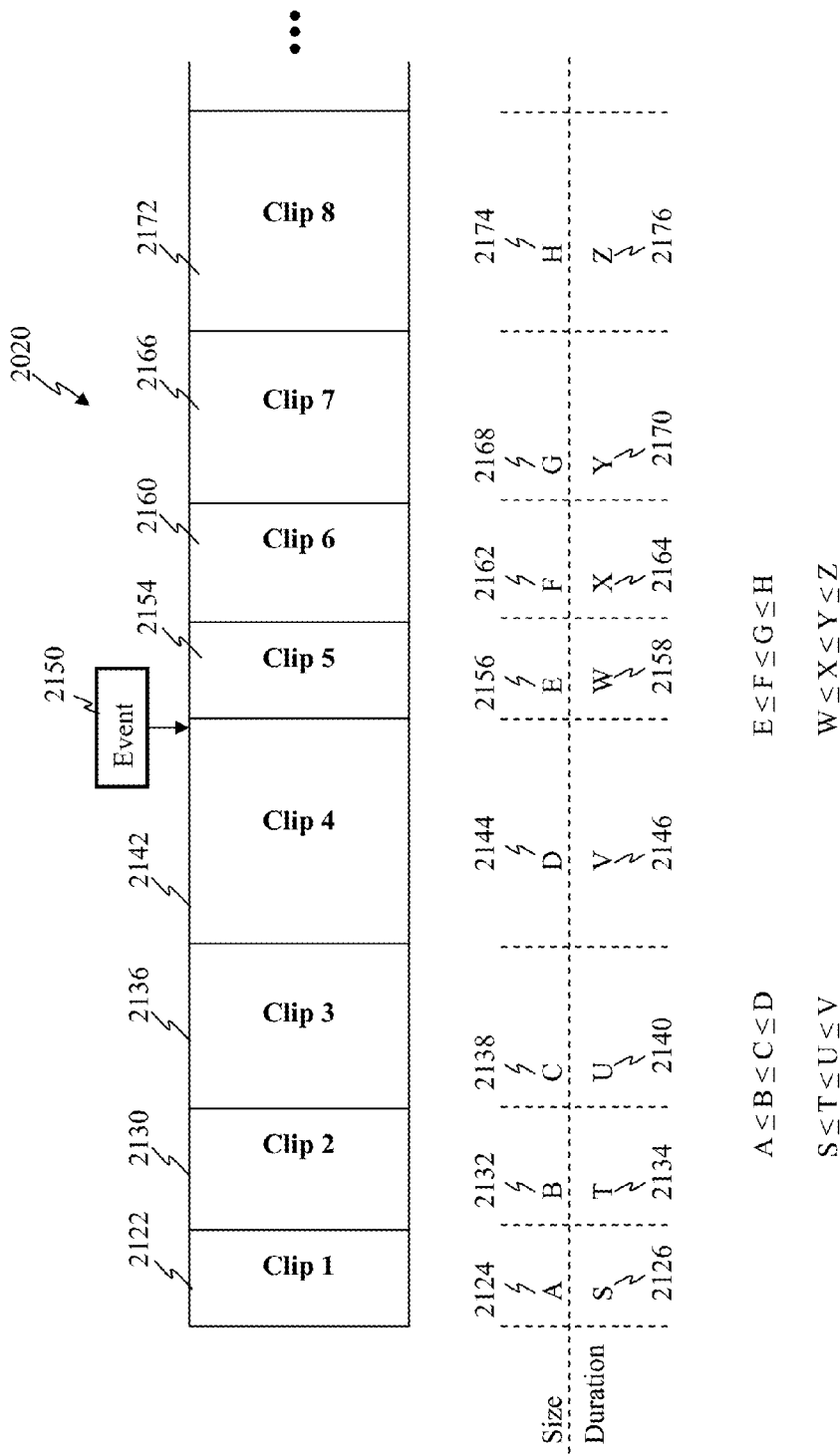
FIG. 21 depicts a simplified graphical representation of a clip template that can be employed in generating clip information and segmenting supplemental content to be forwarded, for example from a remote data storage over the Internet, to a playback device.

FIG. 21 depicts a simplified graphical representation of a clip template 2120 according to some embodiments that can be employed in generating clip information and segmenting supplemental content to be forwarded, for example from a remote data storage 328 over the Internet 324, to a playback device 220. A first clip 2122 of the clip template 2120 is initially generated and/or defined with a first data size 2124 and/or first playback duration 2126. A plurality of subsequent clips defined and/or generated with successively increasing data sizes and/or progressively increasing playback durations. For example, second, third and fourth clips, 2130, 2136 and 2142 each are defined and/or generated with successively increasing data sizes 2132, 2138, 2144, respectively, with progressively increasing playback durations 2134, 2140, 2146, respectively, as described with respect to FIG. 20. Substantially any number of sequential clips with progressively increasing data sizes and/or playback durations can be utilized. In some instances, however, the data size and/or clip information become constant.

Further shown in FIG. 21 is the detection of an event, flag or trigger 2150. This trigger 2150 can be substantially any trigger that indicates a change of status, change of playback location, a selection of one of a plurality of playback paths, a selection of a menu option, detected error in transmission and/or other such triggers. For example, a trigger 2150 can be an action by the user requesting a change in playback of the supplemental content, such as a request to advance the playback of the supplemental content to a subsequent chapter point, advance forward a predefined duration of playback time within the supplemental content or other such user actions.

The trigger 2150 defines a transition or adjustment to the clip template 2120, according to some embodiments, such that a subsequent fifth clip 2154 of the clip template 2120 following the detection of the trigger 2150 has a reduced or relatively small defined data size 2156 and/or duration 2158. For example, the data size 2156 and/or duration 2158 can be less than the data size 2144 and/or duration 2146, respectively, of the fourth clip 2142. In some instances, the data size 2156 and/or duration 2158 of the fifth clip 2154 are approximately equal with the data size 2124 and/or duration 2126, respectively, of the first clip 2122.

Because of the change of status, the fifth clip 2154 is generated with a reduced data size 2156 and/or duration 2158 so that the clip of supplemental content generated in accordance with the fifth clip 2154 of the clip template 2120 is received relatively quickly following the event 2150 and processed at the playback device 220, allowing the playback device 220 to continue playback of the supplemental content with reduced delays following the event 2150. Clips following the adjusted fifth clip 2154 can continue, in some implementations, to successively increase in size and duration as described above. For example, a sixth clip 2160 can define a data size 2162 and/or duration 2164 that is greater than or equal to the data size 2156 and duration 2158 of the fifth clip 2154; a seventh clip 2166 can define a data size 2168 and/or duration 2170 that is greater than or equal to the data size 2162 and duration 2164 of the sixth clip 2160; and an eighth clip 2172 can define a data size 2174 and/or duration 2176 that is greater than or equal to the data size 2168 and duration 2170 of the seventh clip 2166. Subsequent clips following the eighth clip 2172 can similarly have data sizes and/or durations that are greater than or equal to those data sizes and durations of prior clips. Again, factors may be such that the clip sizes and/or durations become substantially constant for subsequent clips.

Figure 22:
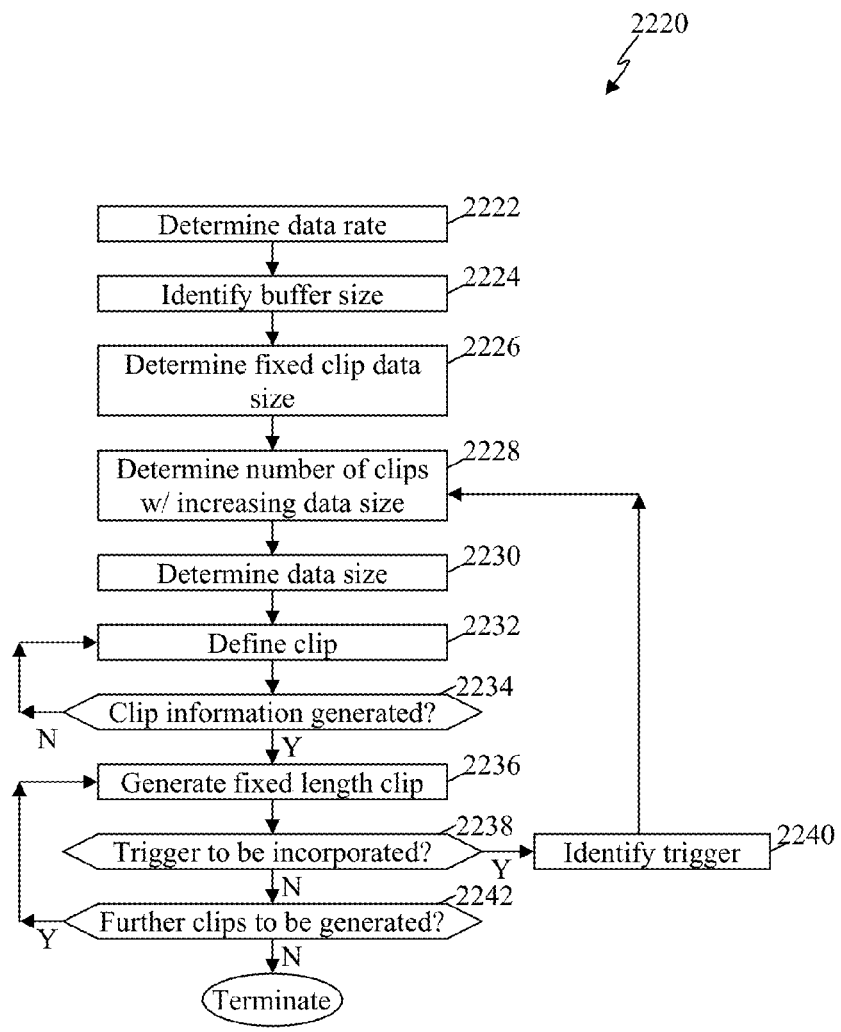
FIG. 22 depicts a simplified block diagram of a process according to some embodiments to generate a clip template that can be used in processing and/or generation of clips of supplemental content according to some embodiments.

FIG. 22 depicts a simplified block diagram of a process 2220 according to some embodiments to generate a clip template, e.g., template 1124, 2020, 2120, that can be used in processing and/or generation of clips of supplemental content according to some embodiments. In step 2222, a data rate and/or rate of transmission is selected, identified and/or determined. Again as described above, the rates can depend on many factors including the communication link bandwidth, processing capabilities of the playback device and other such factors. In step 2224, a buffer size of the playback device is identified (e.g., extracted from the request for the additional content). In step 2226, a desired fixed clip data size and/or duration is determined for clips following a number of clips having progressively increased data sizes and/or playback durations. This fixed size again can dependent on, but is not limited to, buffer size, the processing capabilities of the playback device, communication bandwidth, and other such factors.

In step 2228, a number of clips of supplemental content having progressively increasing data size is determined based at least on the data and/or transmission rates and the buffer size of the playback device. Typically, the number of clips with progressively increasing data size and/or durations attempts to provide a rapid initial playback of the supplemental content and continued playback of the supplemental content without delays, pauses or freezes frames due to buffering and/or processing.

In step 2230, a data size or playback duration is determined for each of the number of clips determined in step 2228 to have progressively increasing data sized and/or durations. Again as described above, the data size and/or duration can depend on one or more factors such as, but not limited to, playback device processing capabilities, communication bandwidth, and other such factors. In step 2232, a clip is defined having the data size and/or duration determined in step 2230, and clip information for the first clip is generated. In some instances, a dummy or hypothetical content stream is encoded and/or multiplexed in accordance with the defined clip. Clipping or chunking of content strategies is based, in some embodiments, on selecting a suitable trade off between content presentation quality and download speeds. Once the clipping strategy has been selected it is typically fixed by the place holders unless the place holders are updated prior initiating downloading of the supplemental content. Further, alignment of download supplemental content can be maintained, in some instances, by a file naming strategy, such as incrementing file numbers. The file name numbering can be defined such that they match the place holder clip information file name numbering (e.g., 10000.clpi, 10001.clpi, 10002.clpi . . . , correspond with 10000.m2ts, 10001.m2ts, 10002.m2ts . . . , respectively).

In step 2234, it is determined whether clip information has been generated in accordance with each clip having progressively increased data sizes and/or durations. When the progressively increased clips are not all defined, the process returns to step 2232. Alternatively, when the clip information has been generated in accordance with each clip having progressively increased data sizes and/or durations the process continues to step 2236.

In step 2236, one or more clips are defined having the fixed clip data size and/or duration and the clip information is generated. In step 2238, it is determined whether a trigger 2150 is to be incorporated. In those instances where a trigger is to be incorporated the process continues to step 2240 to identify the trigger. The process then returns to step 2228 to determine a number of clips to define having progressively increased data size and/or playback durations taking into consideration the clips previously defined as well as an expected state of playback at the playback device and the trigger detected. The resulting clips of supplemental content correspond with the place holders 128. When a trigger is not to be incorporated, the process 2220 continues to step 2242 to determine whether clips for the entire potential supplemental content have been defined. In those instances where further clips are to be defined, the process 2220 returns to step 2236 to define a subsequent clip and clip information. Alternatively, the process 2220 terminates.

The present embodiments allow variable length supplemental content to be cooperated with a medium that complies with a fix length framework or standard, and can include the playback of supplemental content that does not have a known length including supplemental content that is generated substantially at the time of distribution to one or more playback devices 220 to be played back in cooperation with content recorded on the medium 222. Additionally as described above, the number of clips available in segmenting supplemental content may be limited, for example, by a limited number of clips in a playlist and/or defined for a given medium. As such, supplemental content with an unknown content length may result in a number of clips that would exceed the number of clips within a playlist and/or on a medium.

To accommodate content with unknown lengths, some implementations attempt to utilize clip information with a timing that exceeds, and typically far exceeds, an expected length and/or timing of the actual content stream to be played back in the future in cooperation with the medium 222. Some embodiments additionally or alternatively utilize a replay or repeating playback of clips. Specifically, a defined number of clips can be specified to be repeatedly played back until halted by a command or termination of the supplemental content. As such, a playlist with a limited number of clips can be defined and the supplemental content can be conformed to a template according to a repeating of the number of clips when the supplemental content has a duration that exceeds a single playback sequence of the limited number of clips.

The looping of the clip information can allow the playback of substantially any content with substantially any length. For example, content lasting over 12 or even 48 hours or more could be played back in cooperation with a portable storage medium 222 even though such content would likely exceed the allowable clips in a playlist and/or clips allowed on the portable storage medium. As such, a playlist can be used as a circular back drop with a limited and fixed number of clips, such that during playback when the playback device reaches the end of the clip files the playback device simply returns to a beginning or defined clip file and continue to playback. This looping essentially provides an endless supply of clips. In such an implementation, the supplemental content is similarly conformed in accordance with the limited number of clips. Again, the playlist is used as a circular back drop in conforming the supplemental content to the clip template, and as the content is conformed when the conforming device reaches the end of the clips, the conforming device simply returns to the beginning or a defined clip and continue to conform the supplemental content. As such, the supplemental content can be continuously played back in accordance with the limited number of clips defined on the portable storage medium 222.

The playback is monitored and based on the playback the appropriate clip of actual content is supplied in accordance with the clip information that is being repeated or looped. In some instances, the playback device forwards the playback timing along with the request for a clip of content to the content source, and the content source then utilizes this playback timing to identify the correct clip to be associated with the looped clip. Some embodiments employ one or more algorithms to select the correct content. These algorithms can be implemented at the content source 326, for example, through a web service API to determine an appropriate next clip to be played back. A playback device 220 can forward a request to the source for a next clip, passes up a next clip ID, and in some instances additionally forwards information about playback, for example, an elapsed presentation from zero at that point. The content source utilizes the information provided to look and/or identify an actual clip to be forwarded. For example, the source can identify a URL for the clip from a table which contains presentation time for each clip, player Clip ID and URL. As a further example, a short playlist contains four clips (e.g., clip IDs: 00001, 00002, 00003, 00004). A table can then be accessed to identify a corresponding clip. Table 1 below shows an example of a table of the associate data in a repeating application.

TABLE 1

Example Source Content

| PTS | Clip ID | Resource Path |
|---|---|---|
| 0.0 | 00001 | /titlename/00001.mts |
| 20.0 | 00002 | /titlename/00002.mts |
| 40.0 | 00003 | /titlename/00003.mts |
| 60.0 | 00004 | /titlename/00004.mts |
| 80.0 | 00001 | /titlename/00005.mts |
| 100.0 | 00002 | /titlename/00006.mts |
| 120.0 | 00003 | /titlename/00007.mts |

TABLE 1-continued

Example Source Content

| PTS | Clip ID | Resource Path |
|---|---|---|
| 140.0 | 00004 | /titlename/00008.mts |
| 160.0 | 00001 | /titlename/00009.mts |
| . | | |
| . | | |
| . | | |

The information utilized by the content source (e.g., a table) may additionally identify a server clip ID or other information to coordinate the looped playback. Similarly, an index can be provided and by counting identifiers (e.g., 0001, 0002, 0003, etc.) and looking it up through the index, identify an appropriate content by time region or other such coordination.

The server would identify a corresponding clip of actual content in accordance with the elapsed time of the presentation being greater than or equal to a current entry presentation time stamp (PTS) and less than a next entry PTS. The source can then verify that a clip ID in the entry is the same as that being requested by the playback device 220. If not, the source identifies that an error has occurred (e.g., the table is inconsistent, the playback device calculation of elapsed presentation time is incorrect or other such errors). The source can then take appropriate actions, such as requesting verification from the playback device, issuing an error to the playback device, requesting additional information from a user at the playback device or other such actions.

In some implementations, it is additionally advantage to using a limited number or fewer numbers of clips. For example, a limited number of clips can result in a relatively significant reduction in time needed to write those clips and/or clip information to local storage 228 in setup and/or during the virtual file system processing. Further, fewer clips means managing fewer clips, which in many instances can reduce overhead, improve performance, and can result in a more responsive user experience.

Further, some embodiments always use a restricted number of clips regardless of an expected supplemental content, an amount of supplemental content and/or a playback length of the supplemental content. For example, a fixed number of clips, such 64 clips, can be defined and the playback is set to repeat or loop over these 64 clips until terminated as described above. The content is similarly conformed to these 64 clips in a looping pattern regardless of the length of the supplemental content. This avoids the need to anticipate the length of content, can avoid exceeding number of clips restrictions, may provide for simplified management, improved performance and other results.

To compensate for timing parameters and attempting to ensure sequential playback, including during seeking, rewinding, fast forwarding and the like, a counter and/or an algorithm is employed in some embodiments. For example, a counter can track each return to the beginning clip as the content is conformed and/or played back. A mapping may be provided in advance and/or as the content is delivered defining the counting (e.g., metadata can be provided to prescribe mapping between streams on the content supplier and playlists on the player). This counting enables a correct clip stream data to be pulled down for the right clip information file during conforming, playback and/or seeking. For example, clip streams can be numbered, and modular arithmetic based on the numbering of the file names would be performed during configuring and/or playback.

Figure 23:
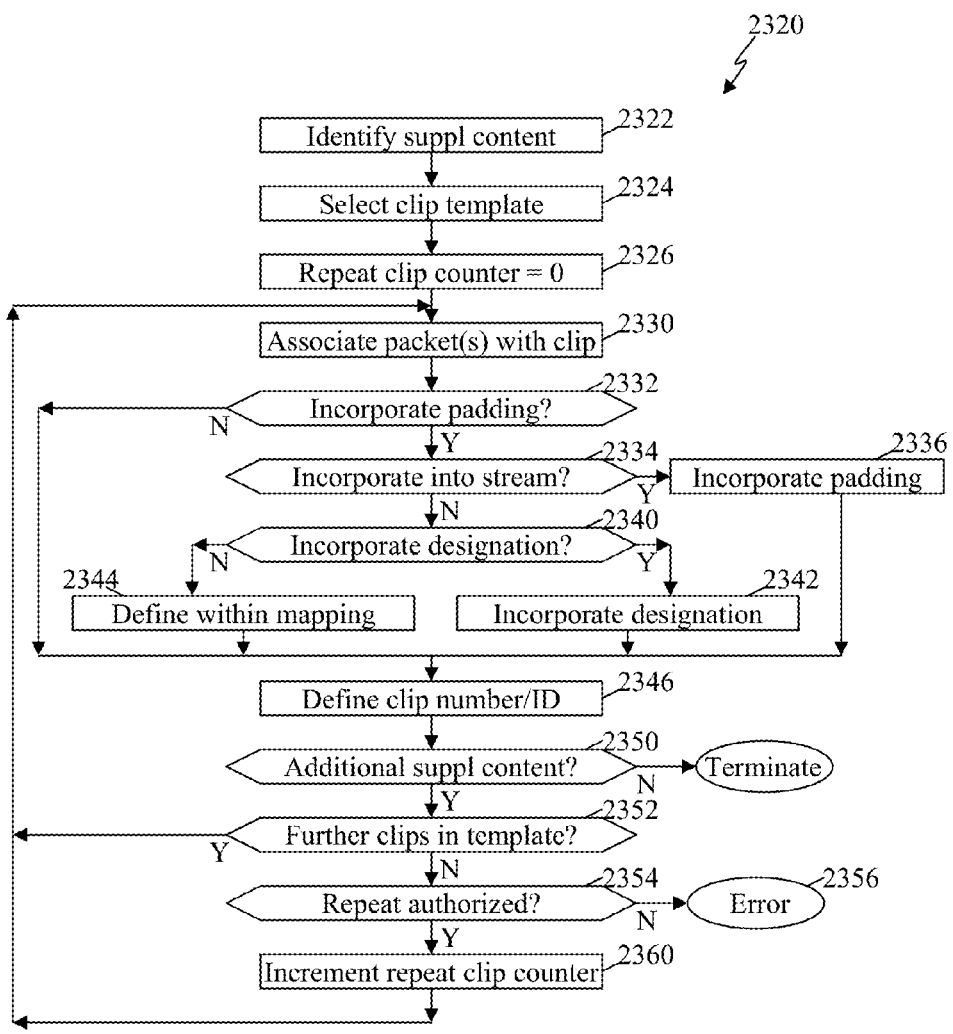
FIG. 23 depicts a simplified flow diagram of a process implemented by a content source or provider in generating clips of a supplemental content stream in accordance with some embodiments.

FIG. 23 depicts a simplified flow diagram of a process 2320 implemented by a content source or provider, e.g., source 326, in generating clips of a supplemental content stream in accordance with some embodiments. The process 2320 can be implemented, for example, as part of step 1232 of process 1220 and/or step 1426 of process 1420. Further, in some implementations some or all of the process 2320 is performed through the conformer 862. In step 2322, supplemental content is identified. In step 2324, a clip template is selected. As described above, the selected clip template corresponds with at least one clip template defined at the playback device, such as recorded on a portable storage medium 222. In step 2326, a repeat clip counter is set to zero. As described above, in some instances a clip template can be used as a circular back drop for the segmenting of the supplemental content when the supplemental content would produce a total number of clips that exceed the number of clips within the clip template and the clip counter defines the number of times the process has looped through the playlist.

In step 2330, one or more packets of the supplemental content are associated with a clip defined in the clip template, e.g., clip template 1124. In step 2332, it is determined whether padding packets and/or padding data should be incorporated into the clip. In those instances where padding should be incorporated step 2334 is entered to determine whether the padding is actually to be incorporated into the clip. As described above, the padding can be left out of the clips such that the padding is actually generated and incorporated into the clip by the playback device. When padding is to be actually incorporated into the clip step 2336 is entered where the amount of padding and location of padding is identified and the padding is incorporated into the clip as determined. Alternatively, when padding is not to be actually incorporated into the clip step 2340 is entered to determine whether a padding designation is to be incorporated into the content stream.

When a padding designation is to be incorporated into the content stream, such as the incorporation of a start code, step 2342 is entered and the padding designation is incorporated. In those instances where padding designation is not to be incorporated into the content stream, step 2344 is entered where padding is defined within a mapping, such as a package mapping file. In some embodiments, padding insertion is modal and set prior to processing the content stream and the padding insertion or designation applies the same scheme while formatting the content stream in accordance with the template. As such, some of the steps of the process 2320 may be removed or skipped. For example, a step can be included that designates whether padding is to be incorporated directly into the stream, defined in a packet mapping or a designation is to be incorporated into the stream, and as such the determination steps 2334 and 2340 can be skipped and the process can proceed directly to the appropriate padding step when padding is to be incorporated.

When it is determined in step 2332 that padding data is not to be incorporated, or following steps 2336, 2342 and 2344, the process 2320 continues to optional step 2346 where the clip is give a clip number or identifier, where the clip number or identifier is associated in part with the current value of the repeat clip count. In step 2350, it is determined whether additional supplemental content is to be incorporated into further clips in accordance with the clip template. In those instances where no further supplemental content is to be clipped the process 2320 terminates. Alternatively, step 2352 is entered to determine whether further clips are defined within the clip template. When further clips are defined the process returns to step 2330 to associate another segment of supplemental content with a subsequent clip defined in the clip template. When no further clips are defined in the template it is determined in step 2354 whether a looping or repeat is authorized. Step 2356 is entered in those instances where a looping or repeat is not authorized and an error is generated and the process terminates or requests alternative action, such as selecting a different clip template, authorizing repeating or other such action. When repeating is authorized, step 2360 is entered where the repeat clip counter is incremented and the process returns to step 2330.

Figure 24:
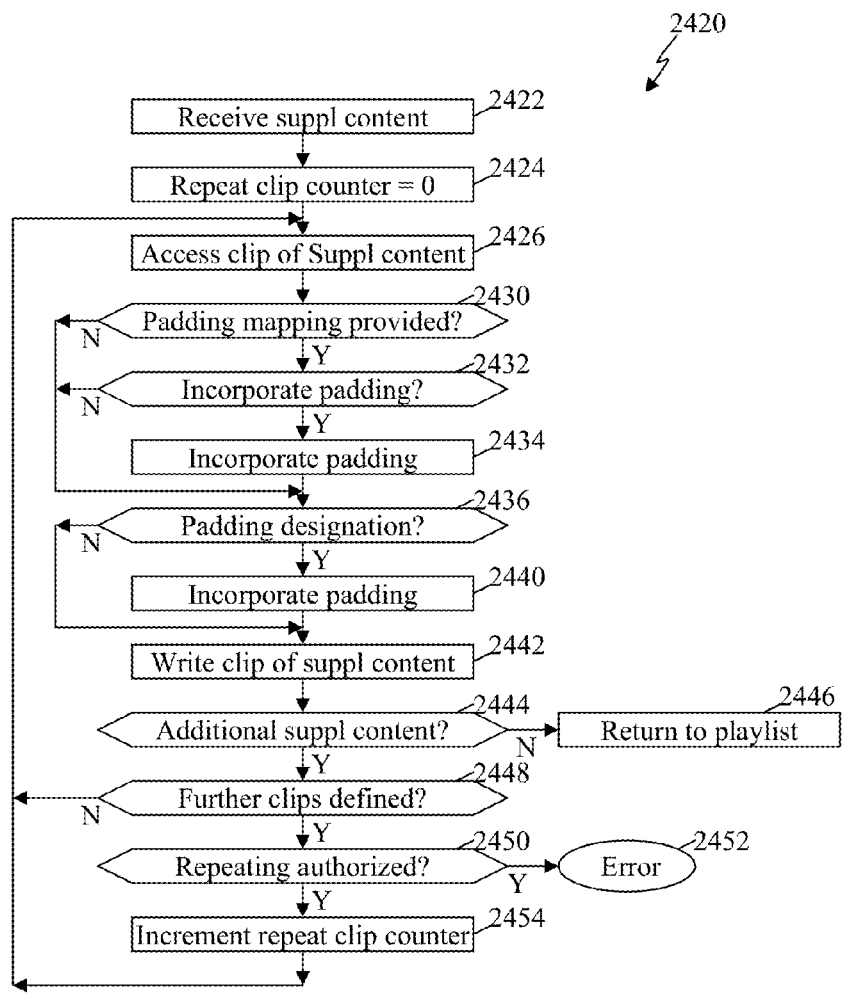
FIG. 24 depicts a simplified flow diagram of a process implemented by a playback device in playing back content.

FIG. 24 depicts a simplified flow diagram of a process 2420 implemented by a playback device 220 in playing back content. In step 2422, supplemental content to be played back is received, for example, supplemental content corresponding to a content place holder 128. In step 2424, a clip repeat counter is set to zero. In step 2426, a clip of supplemental content is accessed in accordance with clip information files. In step 2430 it is determined whether a packet or padding mapping is provided. Step 2432 is entered when a packet mapping is provided where the playback device determines whether padding is to be incorporated into a currently accessed clip of supplemental content. When padding is to be incorporated in accordance with the mapping step 2434 is entered where the padding is added in accordance with the packet mapping.

When it is determined in step 2430 that no padding map is provided and when it is determined in step 2432 that padding is not to be incorporated into a current clip, the process 2420 continues to step 2436 to determine whether a padding designation is specified within the supplemental content stream. When a padding designation is defined within the supplemental content stream step 2440 is entered where padding is added in accordance with the padding designation. In step 2442 the clip of supplemental content information is written to local memory.

In step 2444, it is determined whether additional supplemental content is received for playback in accordance with the clip information 130. In those instances where no further supplemental content is received the process 2420 continues to step 2446 to determine whether playback is terminated, return to playlist or implement other relevant actions. Alternatively, step 2448 is entered to determine whether further clips are defined within the clip information 130 for the current playlist. When no further clips are defined in the clip information, step 2450 is entered to determine whether a looping or repeat is authorized. Step 2452 is entered in those instances where a looping or repeat is not authorized and an error is generated and the process terminates or requests alternative action. When looping or repeating is authorized, step 2454 is entered where the repeat clip counter is incremented and the process returns to step 2426.

As described above, some embodiments provide for the playback of live content in cooperation with a portable storage medium 222. This can include supplemental content of captured live events, performance, production or the like, and this supplemental content of the live event can be distributed to one or more playback devices 220 to provide substantially a live playback of the event, with a relatively small delay. Further, because the supplemental content can be distributed to multiple playback devices, some embodiments further provide for a synchronized playback on multiple playback devices each receiving the supplemental content and further accessing copies of the same content recorded on mediums at each playback device (e.g., a portable storage medium).

In capturing and/or recording content, some embodiments capture the supplemental content in segments or clips. For example, when digitally capturing an event, such as live performance or a director's presentation, and recording multimedia content of the event the supplemental content can be captured in relatively short segments compared with the length of playback of the event.

Figure 25:
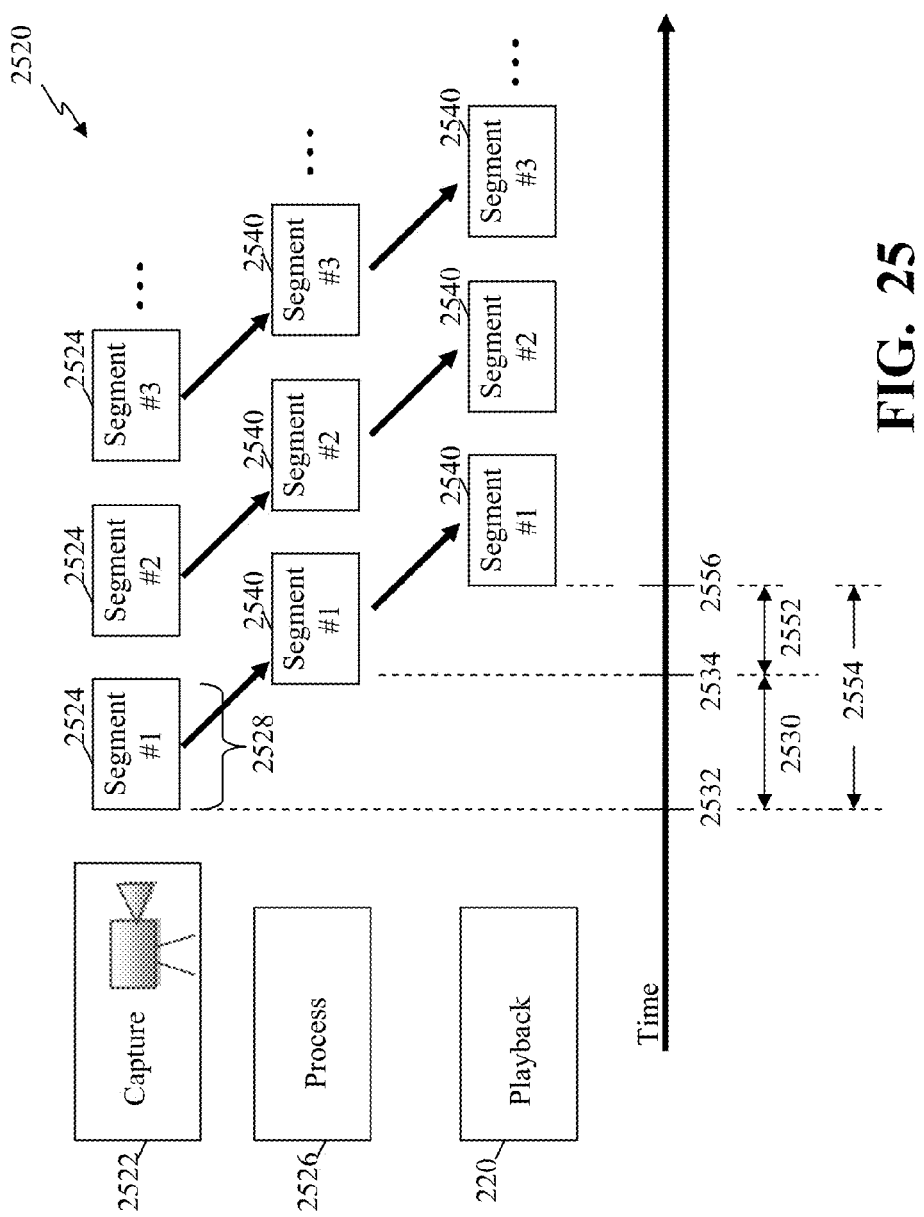
FIG. 25 depicts a simplified block flow diagram of a process of capturing and distributing the content over time as the content is captured, for example, during a live performance or event to be played back in cooperation with a medium, such as a portable storage medium, at a playback device.

FIG. 25 depicts a simplified block flow diagram of a process 2520 of capturing and distributing the content over time as the content is captured, for example, during a live performance or event to be played back in cooperation with a medium, such as a portable storage medium 222, at a playback device 220. A capture device 2522 captures and records digital multimedia content of an event, such as a performance. The capture device 2522 can be a camera, a video camera, an audio recorder, other such devices and/or combinations of such devices. While capturing the content, segments 2524 of content are extracted and forwarded to a processing unit 2526. Each segment 2524 has a duration 2528 or length. The duration 2528 can be the same for each segment 2524 or may be the same for a series of segments, or may vary between segments. Generally, durations 2528 of clips 2524 are configured to match defined and existing placeholders. Further, the durations for the place holders would be based on anticipated network download speeds which imply a start up latency.

In some embodiments, the content is captured and clipping or chunking is performed prior to recording to a network source and/or is performed as part of a down processing element which clips the content according to a clipping strategy. In some embodiments, however, the content can be segmented to clips at the time of capture and/or by the capturing device 2522. In some instances, performing the clipping at a later time after capture, for example as part of a download process, can free up the encoder from trying to create clean breaks between clips which may be inefficient. In some instances, however, a capture device 2522 may create clips that represent contiguous pieces of content on a timeline. Durations of clips are configured to match the existing placeholders. Choices of durations for the place holders could be based on anticipated network download speeds, which imply a start up latency.

Because the capture device 2522 waits to capture the complete segment 2524 prior to forwarding the segment to the processing unit 2526 there is a delay 2530 between an initial time 2532 of starting a capture of a segment 2524 and a time 2534 that the segment is received at the processing unit 2526. This delay 2530 typically includes the duration of the segment 2528 as well as time for the capture device 2522 to capture the segment, perform any relevant formatting and the time to forward the segment to the processing unit 2526.

The processing unit 2526 receives each segment 2524 and processes the segments to produce processed segments 2540 to be forwarded to a playback device 220. In some embodiments, the processing unit 2526 may be part of the capture device 2522, while in other embodiments some or all of the processing unit 2526 is separate from the capture device. The processing unit 2526 may perform substantially any relevant processing in preparing the segment to be forwarded to and played back through a playback device, which can be substantially any relevant playback device, such as playback device 220. For example, the processing performed by the processing unit 2526 can include, encoding, multiplexing (e.g., audio, menu data and content, control functions, programming, and other such content that can be multiplexed with one or more of the segments 2524), encrypting, adding special effects, adding supplemental content and/or metadata, or other such processing or combinations of processing. Further, the processing unit 2526 can employ a clip template 1324 in generating the processed segments 2540 that comply with clip information utilized by the playback device (e.g., as defined on a portable storage medium 222). Upon completing the processing the processed segments 2540 are ready to be forwarded to one or more playback devices 220.

In some instances, the processed segments 2540 are immediately forwarded to one or more playback devices 220, for example, when providing playback of a live performance, production, performance or the like. Due to the processing at the processing unit 2526 and the transfer to the playback device there is an additional delay 2552 in providing the processed segments 2540 to the playback device 220. As a result there is a total delay 2554 between the time of capture (e.g., initial time of capture 2532) and a time 2556 the processed segment 2540 is received at the playback device 220 to be played back.

By capturing segments 2524 of the performance or event and processing the segments 2524 while the event continues to occur, the total delay in playing back the performance or event at the playback device 220 can be significantly reduced and in many instances provides substantially a live playback with minimal delays of seconds. In some instances, the majority of the total delay 2554 is dependent on the duration or length of the captured segment 2524. For example, when an event is a one and a half hour event, with segments having durations of about 5-20 seconds, or minutes, the resulting delay 2554 is fractions of a percent of the total duration of the event.

Further in some instances, the durations 2528 of the segments 2524 can be dependent on a clip template. For example, each segment 2524 can have a duration that corresponds with anticipated clip durations based on a clip template. In other instances, however, the segments 2124 can be further broken down by the processing unit 2526 to comply with a selected clip template. The processing unit 2526 can include buffering to buffer one or more segments 2524. This buffering can be used, for example, when the one or more segments 2524 have durations 2528 shorter than a processing delay 2552.

Additionally or alternatively, some embodiments include multiple processing units 2526 and/or multiprocessing can be performed so that segments 2524 can have durations shorter than the processing delay 2552 while limiting or avoiding a backlog of captured segments 2524 awaiting processing. It is further noted, the processing delay 2552 may vary from segment to segment. As a result, buffering can be employed allowing for variations in the processing delay 2552 and/or the segment durations 2528 may similarly be varied at the capture device 2522.

In determining durations of segments, in some embodiments, the application controlling the capture device has access to a segment schedule. It is noted that the duration of the segment can vary and the selection of duration can depend on many factors, and further is typically a balance between quality and implementation. It is noted, for example, that longer duration segments may be some what more efficient than relatively short durations from a network point of view. Additionally, longer duration segments would provide better video quality for a similar bit rate because there would be more opportunity to take advantage of inter-frame compression across GOP(GOVU) boundaries.

Shorter durations, however, may also have the advantage of reducing latencies and reducing a potential drop out time if there is a problem in transmission or conversion for a give segment or clip. If a relatively long duration segment gets lost or fail then a large drop out occurs that would likely be noticeable. Should a drop-out occur with shorter duration segments, it may be notices but likely would not be catastrophic. Shorter durations would additional take into consideration the increased numbers of boundary conditions between the increased numbers of segments. Further, when the duration is being managed at the encoder end, the encoder is typically not aware of the format compliance issues. As such, the encoder may perform clean-break encoding between segments, which may include closing out the stream following the encoding of the segment. Further, the closing out of the stream may interfere or prevent taking advantage of inter-frame compression across a clip boundary, extra padding may have to be included, and/or processing may have to include evaluating the content so that the clip ended with a complete audio unit.

As described above, the capture device 2522 of FIG. 25 can be substantially any device capable of capturing content to be forwarded to a playback device. Similarly, the content captured can be substantially any content, such as images, video, audio, graphics, text, and other such content and/or combinations of content. In some instances, the content can include multiple types of content, such as video and audio content. Still further, the processing unit 2526 can receive multiple inputs of segment data, and can cooperate and/or multiplex these multiple inputs of data into the processed segments 2540. For example, the processing unit 2526 may receive video segments from a video camera, while receiving audio segments from an audio recording device. The processing unit can then multiplex the video segments with the audio segments with corresponding timing information and/or other such information to accurately coordinate the playback of the audio with the video.

In cooperating content from multiple sources the processing unit 2526 will monitor the timing and synchronize the multiple sources, for example, maintain the synchronization between the audio content and the video content. A loss of synchronization, for example due to master clocks providing timing to each source device being different, could result in drift. In some instances, this can be addressed by utilizing sources that utilize the same master clock or apply some adaptive conversion. Further, the processing unit in multiplexing the content has to honor start up offsets. Still further, compensation may have to be provided in the event of drop outs or dropped samples from one source or the other.

Figure 26:
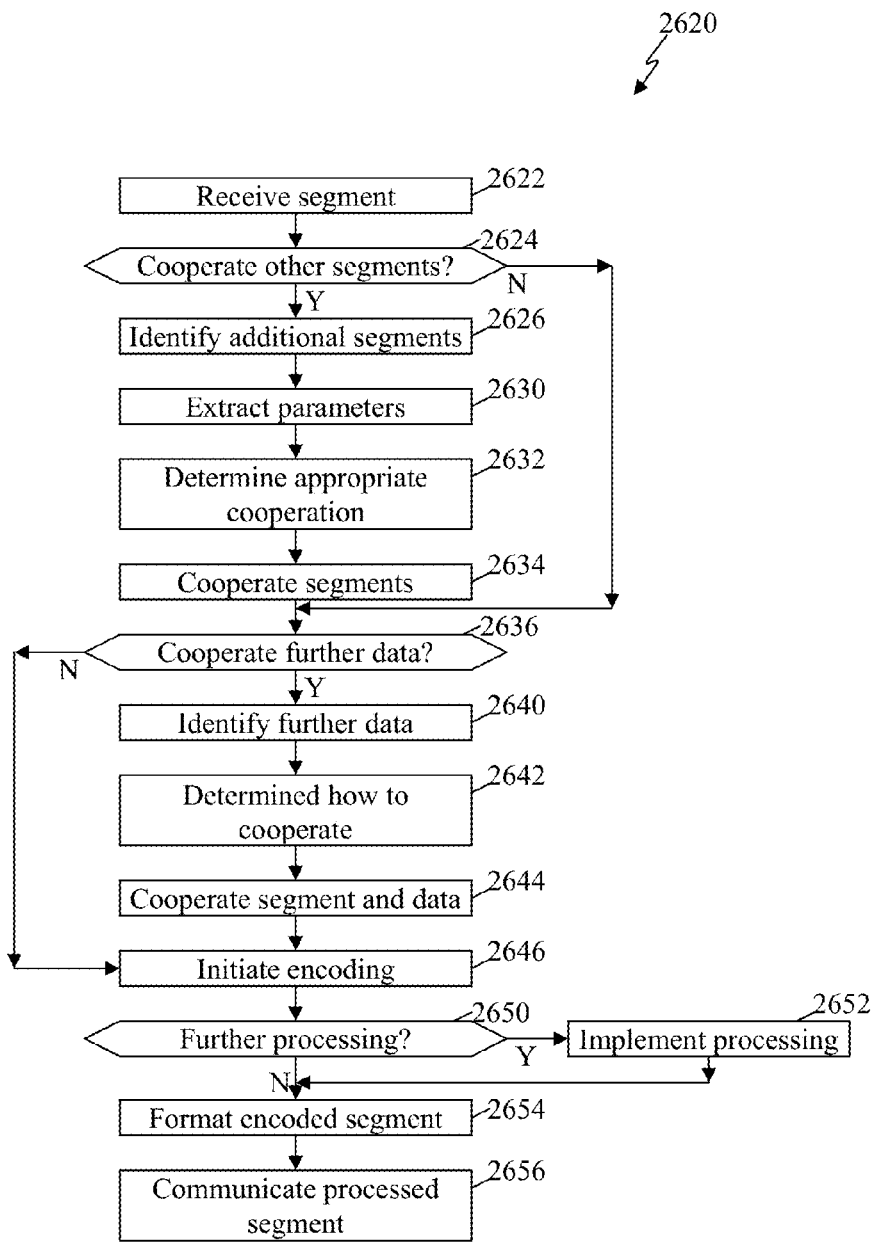
FIG. 26 depicts a simplified flow diagram of a process according to some embodiments that is implemented by the processing unit in processing segments of content from one or more sources.

FIG. 26 depicts a simplified flow diagram of a process 2620 according to some embodiments that is implemented by the processing unit 2526 in processing segments 2524 of content from one or more sources (e.g., capture device 2522). In step 2622, a segment of content is received at the processing unit 2526. For example, a segment of video data can be received. In step 2624, it is determined whether one or more other segments of other content are to be cooperated and/or synchronized with the received segment. This can include multiplexing content or other such cooperation of content. Further, the other content can include segments of content previously received and/or segments of content simultaneously received, and often are received from a separate source. For example, separate audio segments may be received from an audio capturing device while video segments are received from a video capturing device. In those instances where the received segment is not to be cooperated the process 2620 skips to step 2636.

Alternatively, in those instances where the received segment is to be cooperated with one or more other segments of content step 2626 is entered to identify that one or more additional segments of content to be cooperated. In step 2630, parameters, such as timing, frame number and/or other such information are extracted from the received segment and/or the one or more other segments. In step 2632, an appropriate cooperation of the received segment and the one or more other segments is determined, for example based in part on the extracted timing. In step 2634, the received segment and the one or more other segments are cooperated.

In step 2636, it is determined whether further data, such as but not limited to menus, graphics, special effects, programming, text, sub-titles, data and the like are to be cooperated with the received segment. When further data or other content is to be cooperated the process 2620 continues to step 2640 to identify the further data to be cooperated. In step 2642 it is determined how the further data is to be cooperated. In step 2644 the received segment and further data are cooperated.

Step 2646 is entered following step 2644 and when it is determined in step 2636 that further data is not to be cooperated, where the process 2620 initiates encoding of the received segment, as well as any other content and/or further data cooperated with the received content. The encoding typically utilizes a clip template so that the encoded content conforms to an expected clip information on a portable storage medium. As described above, the content can be encoded multiple times applying different clip templates and/or applying different encoding rates depending on requesting playback devices and/or playback devices expected to request the content. Furthermore, the encoding can incorporate padding packets and/or data into the content stream as described above, and/or the encoding can identify where padding is later to be incorporated by the playback device and create a padding packet mapping and/or add padding identifiers designating where padding packets and/or data is to be incorporated into the stream and how much padding is to be added. In step 2650 it is determined whether the encoded content is to be protected (e.g., encrypted) or otherwise processed. In those instances where further processing and/or protection are to occur step 2652 is entered to implement the processing. In step 2654, the encoded segment is formatted for communication, such as packaging, incorporating header information, packet addressing and the like producing the processed segment 2540. In step 2656 the processed segment 2540 is then communicated to the playback device 220 and/or stored for later communication.

The timeline representation shown in FIG. 25 and the process 2620 of FIG. 26 can be applied in many situations, including live presentations, performances and other such live events. Similarly, segmenting the content at the capture device 2522 can be employed without an intention of immediately forwarding the processed segments 2540 and clip information. Instead, the processed segment 2540 can be stored to be forwarded to a requesting playback device at a later time. Alternatively, the content can be capture, and then segmented.

Figure 27:
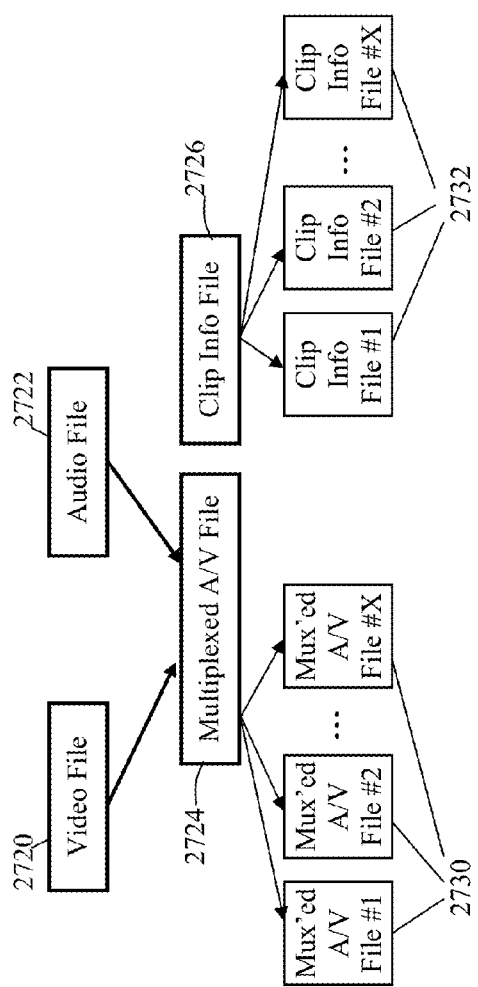
FIG. 27 is a simplified block diagram of a data flow process for processing supplemental content according to some embodiments in generating clips of content and clip information corresponding to the generated clips of supplemental content.

FIG. 27 is a simplified block diagram of a data flow process for processing supplemental content 2720 and 2722 according to some embodiments in generating clips of content and clip information corresponding to the generated clips of supplemental content. The content 2720 and 2722 can include, for example, video content 2720 and audio content 2722. Typically, the video content 2720 is provided in a video file. In some instances, however, the video content may be one or more files of recorded video content. Similarly, the audio content 2722 can include one or more files of recorded audio content. The video content 2720 and audio content 2722 are multiplexed together to create multiplexed A/V content 2724. In some instances, the video content 2720 and audio content 2722 are encode prior to multiplexing, while in other instances the video and audio content are encoded after multiplexing. The multiplexed A/V content 2724 is then evaluated and clip information 2726 is generated corresponding to the multiplexed A/V content 2724. In some instances, the content is configured such that the packets containing the start of a GOP (GOVU) have their first payload data byte starting with the GOP (GOVU) start code sequence. This can reduce the parsing load on the incoming stream. Entry point data can be relied upon to identify appropriate segment boundaries and packet replacement in the conformer is simplified.

The multiplexed A/V content 2724 is further processed and segmented into processed segments of A/V content 2730. Additionally, the clip information 2726 is segmented and/or clip information corresponding to the appropriate segment is generated to provide segmented clip information 2732. The clip information segmentation decisions are made before the A/V content is segmented. This is done, in some embodiments, on the basis of a segment schedule and the entry point data, and additionally on format specific requirements, such as BD-ROM requirements of meeting the aligned unit padding rules. For example, when a progressive playlist is defined with connection condition 6 (implying that the sequence of clips are intended to be treated as a contiguous stream) a clip may be defined to include an integer number of 6144 byte aligned units which corresponds to 32 192 byte source packets, each containing 188 byte transport packets. The arrival time stamp is embedded in the first 4 bytes of the 232 byte packet. As another example, connection condition 5 can also be used but just implies clean break encoding is employed, which may be slightly less efficient.

When introducing aligned unit padding, the time stamp increments from packet to packet at no higher rate than the signaled transport stream mux rate. So when selecting clip boundaries, sufficient room, from an arrival time stamp point of view, has to be provided to insert the padding packets to finish out a previous clip to an aligned unit without overlapping the start of the next clip. If there is not enough room, processing shifts to the next entry point and again determines whether there is enough room to insert padding.

The processed segments of A/V content 2730 and the segmented clip information 2732 can be stored (e.g., at a server or remote storage 328, in external memory 229 or internal memory 228 of a playback device 220 when the content is user generated content, or other such storage) for later distribution to a playback device 220 or distributed to one or more playback devices 220.

In some embodiments, the process is implemented multiple times with varying parameters and/or based on different clip templates to create different sets of segments 2730 and corresponding clip information 2732. For example, a first set of segments of content and corresponding clip information can be generated to be used with a playback device with a fast communication link, and in some instances having fast and complex processing capabilities. A second set of segments of content and clip information can be generated based on a playback device having a medium speed communication link. A third set of segments of content and clip information can be generated based on a playback device having a relatively slow communication link.

Figure 28:
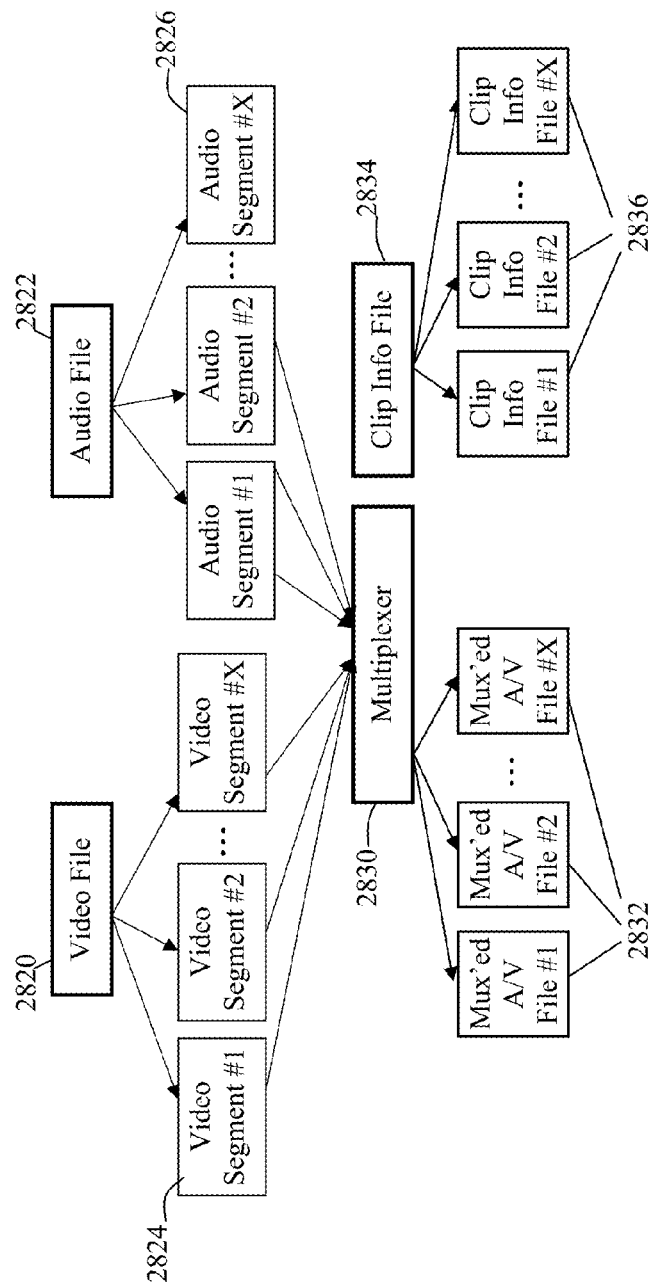
FIG. 28 depicts a simplified block diagram representation of a data flow in segmenting content according to some embodiments.

FIG. 28 depicts a simplified block diagram representation of a data flow in segmenting content 2820 and 2822 according to some embodiments. In some instances, the video content 2820 is encoded in a single file, and similarly the audio content 2822 is encoded in a single file. In the data flow of FIG. 28, the video content 2820 is initially broken down into a plurality of segments of video content 2824 having playback durations that are fractions of the durations of a playback duration of the video content 2820. The size or duration of the video segments 2824 can be dictated by a clip template or based on playback and/or communication link parameters.

Further, the size and/or playback durations can vary between segments. For example, initial segments can be smaller in size and/or have shorter playback durations, such as those described above with reference to FIGS. 20 and 21. Similarly, audio content 2822 is broken down into a plurality of audio segments 2826. Typically, the audio segments 2826 correspond with the video segments 2824. The size and/or playback duration of the audio segments 2826 can depend on the size and/or playback duration of a corresponding video segment 2824 (it is noted, however, that the video content may alternatively be segmented based on the size and/or playback duration of audio segments 2826).

The video segments 2824 and audio segments 2826 are then multiplexed through a multiplexer 2830 to create segments of multiplexed A/V content 2832. The segments of multiplexed A/V content 2832 are further evaluated to generate segmented clip information 2836 that correspond to each segment of multiplexed A/V content 2832. Prior to being forwarded to a playback device, the segments of A/V content 2832 are typically packaged with their corresponding segmented clip information 2836, formatted and/or wrapped for transmission to a playback device. In some embodiments, clip information files may be advantageously packaged together, as they are typically only a few hundred bytes long. A zip format, simple concatenation or the like could be used. A single file could then be broken apart on the player. Further, a single file may improve the efficiency of the network transfer.

Figure 29:
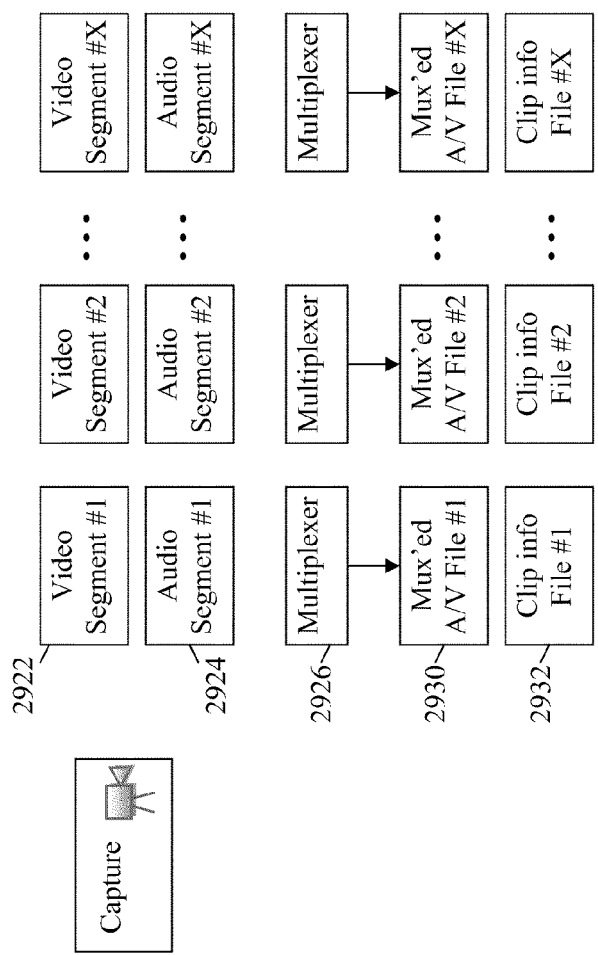
FIG. 29 depicts a simplified block diagram of a data flow for generating segments of content to be forwarded to a playback device. In this flow the content is segmented as it is captured.

FIG. 29 depicts a simplified block diagram of a data flow for generating segments of content to be forwarded to a playback device. In this flow the content is segmented as it is captured. This data flow can be employed in some embodiments with the processes described above with reference to FIGS. 25 and 26. A sequence of video segments 2922 of an event, presentation, performance or the like are generated and outputted by a video capturing device (e.g., device 2522) as the video capturing device captures the content. Similarly, a sequence of audio segments 2924 can additionally or alternatively be generated as an audio capturing device captures the audio content. Typically, the captured content is encoded such that each segment of video content 2922 and each segment of audio content 2924 are encoded segments. Each video segment 2922 is multiplexed by a multiplexor 2926 with its corresponding audio segment 2924 to produce segments of A/V content 2930. Each segment of A/V content 2930 is further analyzed and/or evaluated to generate clip information 2932 for each segment of A/V content 2930. As a result, the segments of A/V content 2930 and corresponding clip information 2932 are generated as the content is captured. This application, in some instances, can be useful at least with the capture of events that a distributor wants to distribute prior to the termination or completion of the event being or captured recorded.

Figure 30:
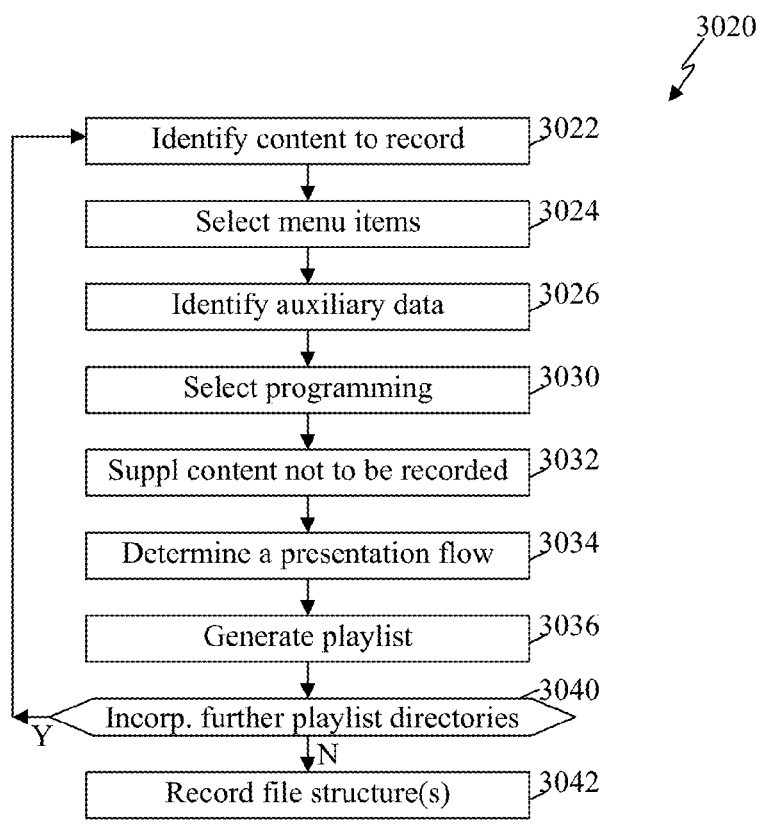
FIG. 30 depicts a simplified flow diagram of a process of configuring and recording content to a portable storage medium to be utilized with a playback device that conforms to a fixed length content framework.

FIG. 30 depicts a simplified flow diagram of a process 3020 of configuring and recording content to a portable storage medium 222 to be utilized with a playback device 220 that conforms to a fixed length content framework to playback content from the portable storage medium along with supplemental content accessed from a secondary storage medium, where the supplemental content is unknown at the time the portable storage medium 222 is configured. In step 3022, content to be recorded to the portable storage medium is identified. This can include substantially any content, such as but not limited to, multimedia content, textual data and/or other such content. In step 3024, menu items and other relevant user interface controls are selected to be incorporated onto the medium 222. In optional step 3026, auxiliary data and content 138 (e.g., sound data, graphics and the like) to be incorporated onto the medium 222 are identified. In step 3030 programming to be included on the medium is selected.

In step 3032, it is identified that supplemental content not to be recorded to the portable storage medium 222 is to be associated with the portable storage medium. In step 3034, a presentation flow for the content, menus and the like to be recorded to the medium and supplemental content is determined. This includes defining ordering of playback of content files and/or supplemental content, when and/or how menus are activated, reactions to user issued commands, and other such coordination. The process 3020 then continues to step 3036 where a playlist 122 is generated incorporating the playlist files 124 and place holders 128.

In step 3040 it is determined whether further playlist directories and/or clip information directories are to be generated. As described above, in some instances a medium 222 may include multiple playlists based on different characteristics and/or playback device capabilities. In those instances where further playlist directories and/or clip information directories are to be generated the process returns to step 3022. Alternatively, the process continues to step 3042 where one or more file structures are defined and recorded to the portable storage medium 222. This includes establishing the playlist directory 122, clip information listing or directory 126 and stream directory 132, and recording the playlist files 124, content place holders 128, clip information files 130, content files 134 corresponding to the playlist files 124, menus 136, programming 142 and the like onto the medium. In some embodiments, it can be implemented at least in part by defining a media image.

The present embodiments, provide methods, systems, code, applications, software and data structures stored on computer readable mediums that allow variable length supplemental content not recorded on a portable storage medium to be played back through a playback device in cooperation with the portable storage medium accessed by the playback device that complies with a fixed length framework. In part some embodiments provide this variable length playback by defining a playback duration on the medium for supplemental content, where the defined duration is greater than an expected actual duration of potential supplemental content that, at the time the medium is configured may be unknown and/or not even generated. Upon later playback of the supplemental content, the playback device detects an actual completion of playback of the accessed supplemental content to override the duration designated on the medium 222 to terminate the playback relative to a selected place holder 128 and return control to a user interface or further continue playback relative to the playlist 122. In some instances, the portable storage medium 222 may not actually include content to be played back. Instead, the medium 222 can simply be a container with a playlist to designate the playback of supplemental content, and with programming 142 to provide for the cooperation and/or accommodation of variable length content.

Content creators and/or distributors, such as movie studios and the like, can distribute portable storage mediums with multimedia content recorded on the mediums, while allowing playback of dynamic current and up-to-date supplemental content at the time of playback relative to the distributed medium. Further, the supplemental content is not restricted to content known or even available at the time of generating and distributing the mediums. Instead, the supplemental content can be created after the mediums are distributed. Furthermore, the supplemental content can be live content captured during the playback relative to the medium. Similarly, the ability to provide playback with dynamic, variable length content allow mediums, for example movie disks, to allow supplemental content, including in some instances user generated content, to be cooperated with playback of movie. Similarly, users can interact during playback with content recorded on a medium, such as playing back user generated content (e.g., delivered as a picture in picture) in synchronization with feature A/V content recorded on the medium. In some instances, a user generated content stream can be recorded and then a selection process is implemented to select an appropriate template to be is used in the encoding of the user content (e.g., video content). The user content is further mapped to be used in cooperation with the storage medium 222

Further, the content owner or distributor can make a movie or part of movie available over the Internet, for example, a relatively blank disc (i.e., relatively little multimedia content recorded on the disc) can be used as an initiation point to access and acquire the content from a studio, through the studio's or other authorized distributor's web site. Similarly, the content owner or distributor can make enhancements, special features, added content and the like available to users having a particular portable storage medium, and/or users who have paid for rights to obtain access to the enhancements, special features, added content and the like. This can provide the content owners and distributors with additional avenues for revenue and/or marketing.

The portable storage medium can be generated and distributed without knowing what actual supplemental content is going to be played back in association with the medium. Further, the ability to playback non-fixed length content through a playback device that conforms with a fixed length framework allows users to participate in live hosted events. For example, a movie studio can host a session, in association with one or more specific mediums, to allow users to participate and synchronize their playback devices through a network connection, where the network connection supplies supplemental content and controls and synchronizes playback of content from the medium and the supplemental content. As a further example, a director can provide to users accessing a particular web site or sites a live a guided tour through a movie. During this director's tour, content from mediums at the users' playback devices can be played back in response to instructions from the director as well as providing playback of supplemental content from the director, such as audio commentary, additional video distributed over the Internet during the live presentation and other such supplemental content. In some embodiments, the distribution of control commands issued by the director can be delayed, or commands can include timing so that the playback at the users' devices (including the playback of live content, which will be received at the playback device with at least some minor delay, as described in some embodiments above) maintain a synchronization with the director.

The supplemental content made available to the user can be substantially any content and can be generated at any time prior to and/or during playback. The replicated portable storage medium can contain information that allows playback devices to pull information from a remote source or server and be utilized by the playback device, for example while implementing programming recorded on the medium, to control a user interface. For example, the programming can cause the playback device to poll a server for content and generate a listing, which may be in the form of a user interface, of content and/or types of content (textual data, graphical data) designated by the server that are available, where control is returned to the user to make a selection. Alternatively, the playback device can generate a user interface listing of content and/or types of content available and then returns control to user to make a selection. It is noted that the communication between the playback device and the remote source can be through substantially any relevant communication method and/or protocol. For example, some embodiments may provide communication to be driven off a metadata format, such as XML documents, predefined scheme or rule set of how this communication happens.

Further in some embodiments, the portable storage medium 222 can be a container or shell that complies with fixed length standards, but does not include any content or only a minimal amount of content, and instead is used as a key or access to other supplemental content retrieved from a separate storage medium (e.g., received from a remote storage device) that is played back through the playback device.

In some instances, the medium 222 provides a place holder that can be utilized to playback substantially any relevant content. Further, one or more predefined clip templates can be defined on the medium 222 or provided to the playback device 322 prior to activating playback. As a result, substantially any content can be cooperated with that medium as long as the content is formatted in accordance with one of define clip templates and the corresponding clip information. There is so much content in the world, it would be impossible to download all the possible clip informations such that it would be local and referenced by a playback device. Some present embodiments, however, defines general containers or clip templates into which content can be defined such that the content can be downloaded in accordance with the defined containers, and specific content information generally does not have to be downloaded.

Further, because the playback device has access to the container or the one or more defined clip templates and/or clip information, users can gain access to supplemental content that is not even available at the time playback is initiated. For example, when playing back content relative to a disc conforming to a fixed length framework, and even after a playback device is updated with updated supplemental content, a third party may record additional supplemental content (e.g., commentary) to be live transcoded and downloaded. This additional supplemental content can be received and played back through the playback device without requiring the playback device to be shut down or rebooted, and instead the additional supplemental content can be accessed and played back when the additional supplemental content is formatted in accordance with a clip template and/or clip information available to the playback device.

Additionally, the present embodiments reduce the local storage requirements for playback devices 322 and/or storage mediums 222. If there were a thousand different clips, a user would have to download each of the clip information for a thousand clips. Instead, some embodiments provide for the generic clip information or template so that substantially any content can be made to conform with the one or more clip informations or predefined templates. Further, the templates or frameworks are defined not only fixed time when recorded to the medium, but can be made available at an update.

The present embodiments provide methods, systems, processes, applications, portable storage mediums to allow playback of supplemental content. Further, at least some of these embodiments allow the playback of supplemental content in cooperation with content recorded on a portable storage medium, and in some instances where the content on the portable storage medium is read only and substantially fixed. Some of these embodiments provide methods for use in providing supplemental content to be played back with a portable storage medium through a playback device that conforms to a fixed length content framework. Additionally or alternatively, some embodiments provide methods for use in generating clips of supplemental content to be played back, through a playback device that conforms to a fixed length content framework, in accordance with a portable storage medium directly accessed by the playback device. Further, some embodiments provide methods of providing playback of content in association with a portable storage medium.

In some embodiments, methods provide supplemental content to be played back with a portable storage medium through a playback device that conforms to a fixed length content framework. These methods receive a request for supplemental content from a playback device, identify the supplemental content, determine parameters regarding at least one or more capabilities of the playback device, select one series of clips of supplemental content from a plurality of series of clips of supplemental content generated prior to receiving the request, where the selected one of the series of clips of supplemental content correspond with the one or more of the determined parameters relative to the capabilities of the playback device, and forward supplemental content clips to the requesting playback device. In some instances, determining the parameters comprises receiving an identification of a clip template dictating clip information recorded on the portable storage medium, and selecting the one series of clips of supplemental content comprises selecting the one series of clips of supplemental content such that the selected on series correspond to the identified clip template.

Additionally or alternatively, some embodiment provide methods of generating a clip template adapted to be used in segmenting supplemental content not recorded on a portable storage medium and to be played back through a playback device in cooperation with a portable storage medium directly accessed by the playback device. At least some of these methods identify playback device parameters; determine a fixed clip data size relative to the identified playback device parameters; determine, based at least in part on the identified playback device parameters, a number of clips to have data sizes that progressively increase in data size with each successive, sequential clip relative to a playback sequence, such that each successive, sequential clip has a data size greater than a data size of an immediately subsequent clip; and define a series of a plurality of clips such that a first plurality of sequential clips, relative to the playback sequence, have successively increasing data sizes and a second plurality of sequential clips following the first plurality of clips, relative to the playback sequence, have data sizes at most equal to the fixed clip data size. In some instances, a data size of a first clip of the first plurality of clips relative to the playback sequence has a data size that is less than the data sizes of the remaining clips of the first plurality of clips and is less than the fixed data size. Further, the methods can additionally determine that a trigger event is to be defined relative to a second clip; identify a third plurality of sequential clips including the second clip; and define data sizes of each clip of the third plurality of clips to be progressively larger, where a data size of the second clip is less than a data size of an immediately subsequent clip relative to the playback sequence. In some instances, the trigger event is a trigger to change chapters relative to content configured in accordance with the defined clip template. Additionally, the identifying the parameters can comprises identifying a data rate; and identifying an anticipated buffer size of a playback device, such that the fixed data size and a data size of the first clip of the first plurality of sequential clips are dependent on the data rate and the anticipated buffer size.

Some embodiments additionally or alternatively provide one or more data structures recorded on a computer readable medium that dictates formatting of multimedia content as the multimedia content is formatted. The one or more data structures can include a plurality of clips; a designated event trigger associated with a first clip of the plurality of clips; the first clip associated with the event trigger having a data size that is less than an immediately preceding clip, relative to a playback sequence; and a first plurality of sequential clips immediately subsequent to the first clip, relative to a playback sequence, having data sizes that are progressively larger. In some instances, can include a second plurality of sequential clips immediately subsequent to the first plurality of sequential clips, relative to a playback sequence, having data sizes that are substantially constant. Further, the data size of the second plurality of clips can be equal to a data size of a second clip of the first plurality of clips, where the second clip immediately precedes, relative to a playback sequence, the second plurality of clips.

Additionally, some embodiments provide methods of playing back content in cooperation through a playback device that complies with a fixed length content framework. These methods can detect access to medium; access a playlist recorded on a portable storage medium; initiate playback of content relative to the portable storage medium; detect a place holder specified in the playlist; identify access to a source other than the portable storage medium for supplemental content associated with the detected place holder; access the source; receive supplemental content after the initiating of the playback, where the supplemental content has a playback duration that is less than playback duration designated in the playlist and associated with the identified place holder; initiate playback of the supplemental content; detect that the playback of the supplemental content has completed; override the playback duration designated in the playlist and associated with the place holder; and return control of playback relative to the playlist. In some instances, accessing the playlist comprises: identifying playback parameters of at least playback device directly accessing the portable storage medium; detecting that there are multiple playlists are defined on the portable storage medium; and selecting the playlist of the plurality of playlists based on the identified playback parameters. Further, some embodiments request details of the supplemental content from the source; and receive metadata exclusively associated with the supplemental content that in part defines an actual playback duration of the supplemental content that is less than the playback duration designated in the playlist and associated with the identified place holder. Additionally, some embodiments receive metadata exclusively associated with the supplemental content; and detect a command within the metadata to stop playback relative to the supplemental content designating the completion of the playback of the supplemental content.

Methods of providing playback of content in association with a portable storage medium are provided in accordance with some embodiments. These method comprises: accessing, by a playback device configured to comply to a fixed length content framework, a first playlist of a file structure stored on a portable storage medium directly accessed by the playback device; initiating playback of content relative to the portable storage medium; detecting a place holder defined within the first playlist relative to accessing supplemental content that is not stored on the portable storage medium that has a first playback duration; retrieving clip information recorded on the portable storage medium for the place holder and extracting a second playback duration designated in the clip information for the place holder where the second playback duration is greater than the first playback duration; retrieving at least a portion of the supplemental content after the initiating playback of the content relative to the portable storage medium; initiating playback of at least the portion of supplemental content; detecting the completion of playback of the supplemental content; terminating the playback of the supplemental content; and returning playback control relative to the first playlist. These methods can, in some instances, additionally retrieve metadata exclusively associated with the supplemental content, where the metadata defines the first playback duration of the supplemental content; the detecting the completion of the playback of the supplemental content can comprises detecting, during playback of the supplemental content, that the first playback duration has been reached; and overriding the second playback duration in response to detecting that the first playback duration has been reached. Further, some embodiments accessing the portable storage medium, identifying that a plurality of playlists are defined on the portable storage medium; identify at least playback device parameters; and select the first playlist of the plurality of playlists where the first playlist corresponds with the identified playback device parameters, and implementing the accessing to the playlist in response to selecting the playlist. In some instances, the initiating playback of at least the portion of supplemental content comprises initiating playback of at least the portion of the supplemental content as the supplemental content is received.

Furthermore, some embodiments provide methods of distributing portable storage mediums that are configured to conform to fixed length content framework. These methods can comprise: generating a playlist; recording the playlist to a portable storage medium; and recording content to the portable storage medium associated with the playlist; wherein the generating the playlist comprises: incorporating one or more content designator into the playlist; identifying content files such that each content designator corresponds with one of the content files; incorporating one or more place holders indicating supplemental content not recorded on the portable storage medium and accessed from a secondary source at a time of playback, such that the supplemental content is to be played back in relation to the portable storage medium; and incorporating clip information for each content file and the one or more place holders, where the clip information for the one or more place holders designates a playback duration that is greater than the expected supplemental content to be played back in cooperation with the portable storage medium.

Still further embodiments provide methods of supplying supplemental content to be played back through a playback device relative to a portable storage medium directly accessed by the playback device. These methods can receive, from over a distributed communication network, a request for supplemental content; identify the supplemental content; determine whether the supplemental content is to be streamed over the distributed communication network to the playback device; identify, in response to determining that the supplemental content is not to be streamed, a predefined clip template defined prior to receiving the request; break the supplemental content into clips of supplemental content in accordance with the identified predefined clip template; and transfer over the distributed communication network the clips of supplemental content that conform to the selected clip template. In some instances, the breaking the supplemental content into clips comprises incorporating null data into one or more of the clips of supplemental content such that the supplemental content within the clips complies with placement within the respective clips. Additionally, these methods can issue a media stop command to the playback device such that the playback device terminates playback relative to the supplemental content and returns control to the playback device relative to a playlist recorded on a portable storage medium directly accessed by the playback device, where the playlist instructed the playback device to obtain the supplemental content. Further, the playlist, recorded on the portable storage medium prior to receiving the request, can additionally comprise clip information designating a playback duration relative to the supplemental content, and the issuing the media stop command comprises issuing the media stop command prior to playback at the playback device reaching the playback duration specified in the clip information relative to the supplemental content.

While the invention herein disclosed has been described by means of specific embodiments and applications thereof, numerous modifications and variations could be made thereto by those skilled in the art without departing from the scope of the invention set forth in the claims.

What is claimed is:

1. A method for use in providing supplemental content to be played back with a portable storage medium through a playback device that conforms to a fixed length content framework, the method comprising:
   receiving, over a network, a request for supplemental content from a playback device;
   identifying the supplemental content;
   retrieving supplemental content;
   accessing a predefined clip template defined prior to receiving the request, where the clip template defines multiple clips and where a first plurality of clips of the multiple clips are defined to generate clips of the supplemental content that progressively increase in size;
   processing the supplemental content and generating a plurality of clips of supplemental content in accordance with the clip template, such that the plurality of clips of supplemental content have a playback length that is a fraction of a playback length of the supplemental content; and
   forwarding the plurality of clips of supplemental content to the requesting playback device.

2. The method as recited in claim 1 wherein the retrieving the supplemental content comprises retrieving the supplemental content as it is generated.

3. The method of claim 2, wherein the retrieving the supplemental content as it is generated comprises retrieving multimedia content from a capturing device as the capturing device captures and records a live event with an unknown playback duration.

4. The method of claim 1, wherein the accessing a predefined template comprises:
   determining parameters regarding at least one or more capabilities of the playback device; and
   selecting the predefined clip template from a plurality of predefined clip templates defined prior to receiving the request.

5. The method of claim 4, wherein the predefined clip template is defined prior to content being recorded to the portable storage medium.

6. The method of claim 1, wherein the accessing a predefined template comprises:
   receiving an identification of clip information recorded on the portable storage medium accessed by the playback device; and
   selecting the predefined clip template from a plurality of predefined clip templates, defined prior to receiving the request, based on the clip information.

7. The method of claim 6, wherein the predefined clip template directly corresponds with clip information recorded on the portable storage medium.

8. The method of claim 1, wherein the generating the clips of supplemental content comprises incorporating null data into a plurality of the clips of supplemental content such that the clips of supplemental content comply with the selected clip template.

9. The method of claim 8, further comprising;
   compressing the supplemental content comprising removing packets of null data incorporated into the clips of supplemental content prior to forwarding the plurality of clips of supplemental content to the requesting playback device.

10. The method of claim 1, wherein the generating the clips of supplemental content comprises incorporating padding data into a plurality of the clips of supplemental content such that the clips of supplemental content comply with clip information recorded on the portable storage medium and associated with the supplemental content.

* * * * *

UNITED STATES PATENT AND TRADEMARK OFFICE
CERTIFICATE OF CORRECTION

| | | |
|---|---|---|
| PATENT NO. | : 8,842,967 B2 | Page 1 of 1 |
| APPLICATION NO. | : 12/479474 | |
| DATED | : September 23, 2014 | |
| INVENTOR(S) | : McDermott et al. | |

It is certified that error appears in the above-identified patent and that said Letters Patent is hereby corrected as shown below:

On the title page item (57), column 2, ABSTRACT, line 1, delete "embodiments" and insert --embodiments,--.

Signed and Sealed this
Seventeenth Day of March, 2015

Michelle K. Lee
*Director of the United States Patent and Trademark Office*